US 6,690,952 B2

(12) United States Patent
Nishimori et al.

(10) Patent No.: US 6,690,952 B2
(45) Date of Patent: Feb. 10, 2004

(54) ADAPTIVE ARRAY ANTENNA TRANSCEIVER APPARATUS

(75) Inventors: Kentaro Nishimori, Yokosuka (JP); Keizo Cho, Yokohama (JP); Yasushi Takatori, Yokohama (JP); Toshikazu Hori, Miura (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 506 days.

(21) Appl. No.: 09/737,972

(22) Filed: Dec. 14, 2000

(65) Prior Publication Data

US 2001/0005685 A1 Jun. 28, 2001

(30) Foreign Application Priority Data

Dec. 15, 1999 (JP) .......................................... 11-355995
Dec. 22, 1999 (JP) .......................................... 11-365352
Apr. 14, 2000 (JP) ...................................... P2000-113316

(51) Int. Cl.$^7$ ................................................ H04B 1/38
(52) U.S. Cl. .................... 455/562.1; 455/424; 342/174; 342/368
(58) Field of Search ................................ 455/403, 423, 455/424, 59, 560, 561, 562.1; 342/165, 173, 174, 359, 360, 368

(56) References Cited

U.S. PATENT DOCUMENTS

| 5,530,449 | A |   | 6/1996  | Wachs et al. |
| 5,940,032 | A |   | 8/1999  | Passmann et al. |
| 6,480,153 | B1 | * | 11/2002 | Jung et al. .................. 342/368 |
| 6,556,845 | B1 | * | 4/2003  | Ide et al. ................. 455/562.1 |

FOREIGN PATENT DOCUMENTS

JP           5-136622         6/1993

OTHER PUBLICATIONS

Nioshimori, et al., "An Automatic Calibration Method of Adaptive Array for FDD Systems", The Institute of Electronics, Information and Communication Engineers; Technical Report of IEICE, pp. 17–22 (Jan. 21, 2000).

Nishimori, et al., "Automatic Calibration Method of Adaptive Array Considering Antenna Characteristics for FDD Systems", The Institute of Electronics, Information and Communication Engineers; Technical Report of IEICE, pp. 139–144 (Feb. 17, 2000).

Nishimori, et al., "Automatic Calibration Method of Adaptive Array Considering the Frequency Difference between Transmitter and Receiver", The Institute of Electronics, Information and Communication Engineers; Proceedings of the 2000 IEICE General Conference, B–1–172, p. 172 (Mar. 7, 2000).

(List continued on next page.)

Primary Examiner—Quochien Vuong
(74) Attorney, Agent, or Firm—Thelen Reid & Priest LLP

(57) ABSTRACT

An adaptive array antenna transceiver apparatus provides: a local signal generator 24 that outputs a signal having a frequency that corresponds to the difference between the reception frequency and the transmitting frequency; a coupler 15 that separates and extracts a part of the signals from the output of the transmitters 13; a switch 21 that selects the signal output from any one of the transmitters 13; a frequency converter 22 that converts the frequency of the signal selected by the switch 21; and a switch 23 that inputs signals output by the frequency converter 22 and selectively outputs them to any one of the plurality of paths. The transceiver further provides a switch 16 that selectively inputs a reception signal from a said antenna elements or a signal from said second switch into each of said receivers; and a calibration control processor 25 that controls the connection state of said switches 16, 21, 23, inputs the amplitude and phase values obtained at the receivers 14, and finds the calibration value of each of the branches of the array antenna.

30 Claims, 34 Drawing Sheets

OTHER PUBLICATIONS

Nishimori, et al., "Automatic Calibration Method of Adaptive Array for FDD Systems", 2000 IEEE Antennas and Propagation Society International Symposium, vol. 2, pp. 910–913 (Jul. 16, 2000).

Nishimori, et al., "Automatic Calibration Method of Adaptive Array Considering Antenna Characteristics for FDD Systems", The Institute of Electronics, Information and Communication Engineers; Proceedings of the 2000 International Symposium on Antennas and Propagation, vol. 3, pp. 919–922 (Aug. 21, 2000).

Nishimori, et al., "Automatic Calibration Method of Adaptive Array Considering Variation Characteristics on Antennas and Transceivers", The Institute of Electronics, Information, and Communication Engineers; Proceedings of the 2000 Communication Society Conference of IEICE, B-1-104, p. 104 (Sep. 7, 2000).

Monzingo, et al., "Introduction of Adaptive Array", A Wiley Interscience Publication, John Wiley & Sons (1980).

Ohgane, et al., A Implementation of a CMA Adaptive Array for Transactions on Vehicular Technology, vol. 42, No. 3, pp. 282–288 (Aug. 1993).

Litva, et al., "Digital Beamforming in Wireless Communications", Artech House Publishers (1996).

Steyscal, et al., "Digital Beamforming for Radar Systems,", Microwave Journal, vol. 32, No. 1, pp. 121–136.

Mano, et al., "A Method for Measuring Amplitude and Phase of Each Radiating Element of a Phased Array Antenna", Proceedings of IEICE (B), vol. J–65–B, No. 5, pp. 555–560.

Aumann, et al., "Phased Array Antenna Calibration and Pattern Prediction Using Mutual Coupling Measurements", IEEE Transactions on Antennas and Propagation, vol. 37, No. 7, pp. 844–850 (Jul. 1989).

* cited by examiner

ADAPTIVE ARRAY ANTENNA TRANSCEIVER APPARATUS

BACKGROUND OF THE INVENTION

1. Field of the Invention

The present invention relates to an adaptive array antenna transceiver apparatus that carries out transceiving a wireless signal using an adaptive array antenna, and in particular, in a communication system using a signals having different frequencies for transmission and reception, such as the FDD (Frequency Division Duplex) systems, relates to an adaptive array antenna transceiver apparatus for automatically calibrating the amplitude and phase differences between branches of the antenna for the respective transmitter and receiver.

This application is based on patent applications No. Hei-11-355995, Hei 11-365352, and 2000-113316 filed in Japan, the contents of which are incorporated herein by reference.

2. Description of the Related Art

Accompanying the rapid increasing use of mobile communication systems such as cellular telephones and PHS (Personal Handyphone System), it has become necessary to secure communication channels for as many subscribers as possible in a limited frequency band.

In order to do this, using a method of allocating as necessary a particular channel (multichannel access method) for multiple subscribers in mobile communications is the currently the main practice.

In the present mobile communication systems represented by cellular systems or PHS, for example, the TDMA (Time Division Multiple Access) is mainly used as the multichannel access method. Among these, the FDD system is used to enlarge the transmission area in GSM (Global System for Mobile Communications) and PDC (Personal Digital Cellular Telecommunication System), represented by cellular telephone systems.

However, in order to increase the efficiency of the use of the frequencies in a wireless area, it is necessary to decrease the influence of interference from adjacent cells. As technologies for decreasing the interference, the adaptive array antenna is known. This type of technology is disclosed in Citation 1, Monzingo et al., *Introduction to Adaptive Arrays*, John Willy and Sons, New York, 1980.

In an adaptive array antenna, an array antenna is formed by a plurality of antenna elements arranged in an array. In addition, the radiation pattern of the array antenna is controlled by weighting the amplitude and phase with respect to an input signal for each of the branches of the array antenna. This means that the null direction of the radiation pattern of the array antenna is formed in the direction of the interference, and thus the influence if the interference is decreased.

An apparatus combining an adaptive array antenna and an FDD system is formed as shown in FIG. 34.

In recent years, considering the ease and flexibility of control, the general method for the control of the amplitude and phase necessary for adaptive arrays is realized by digital signal processing, using a processor such as a DSP (Digital Signal Processor), in the baseband. This is disclosed in T. Ohgane, et al., "Implementation of a CMA Adaptive array for high speed GMSK transmission in mobile communications", *IEEE Trans.*, Vol. 42, No. 3, pp. 282–288, August, 1993.

Therefore, in the case of realizing an adaptive array antenna by control of the baseband, a transmitter and receiver are necessary for each antenna of the array antenna. For the transmitter and receiver using this type of adaptive array antenna, ideally the amplitudes and phases between each of the branches are equal. However, in practice due to individual differences in high frequency circuits and cables of the electrical amplifiers, etc., fluctuations of the temperature characteristics of the installation location, etc., frequently the amplitudes and phases between branches are different.

Due to the influence of this type of difference in amplitude and phase, in the radiation pattern of an adaptive array antenna, a shrinking in the null direction and a bulging of the side lobe occurs with respect to the ideal radiation pattern, and this becomes a factor causing deterioration of the inherent interference suppression characteristics of the adaptive array antenna. This is disclosed for example in Citation 3, J. Litva et al., *Digital Beamforming in Wireless Communications*, Artech House Publishers, 1996.

An example of this phenomenon is explained referring to FIG. 31 and FIG. 32. FIG. 31 shows the structure of the array antenna and the radiation pattern, and FIG. 32 shows the relationship of the amplitude and phase error to the null depth. That is, using as a reference the case in which the amplitude and phase shown in FIG. 31 are given as ideal conditions for each of three array antenna elements arranged in a circle shown in FIG. 31, the null depth of the radiation pattern in the case that the amplitude and phase of each element deviates from the ideal conditions is shown in FIG. 32.

Under the ideal conditions, a radiation pattern having a null direction at 180° is formed, as shown in FIG. 32, and the depth of the null direction is becomes very large. However, in the case that the amplitude and phase of each element deviates from the ideal conditions serving as the reference, the radiation pattern of the array antenna deteriorates, and the depth in the null direction as shown in FIG. 32 decreases depending on the amplitude error and the phase error.

Therefore, in order to make the radiation pattern of the transmission and the radiation pattern in the reception of the adaptive array antenna agree when using an FDD system having a transmission frequency and reception frequency that are different, technology for calibrating the amplitude and phase between each of the branches of the array antenna becomes necessary. In addition, in the case that the adaptive array antenna in the FDD system is used, because the frequency of transmission and reception are different, the weighting coefficient for each element of the adaptive array antenna required during reception cannot be applied during transmission as-is.

Therefore, normally in order to determine that weighting coefficient of the adaptive array antenna during transmission, it is necessary to estimate the direction of the desired signal and the interference signal using some kind of technology that estimates the incoming direction during reception, and the radiation pattern is controlled by determining the weighting coefficient during transmission using this information about direction. Thus, in order to use an adaptive array in an FDD system, respectively carrying out individual calibration during reception and during transmission is necessary.

Conventionally, in the case of calibrating the amplitude and phase of each of the transmitters and receivers, a reference signal for calibration output by an oscillator built into the apparatus is used. This type of technology is disclosed, for example, in Citation 4, H. Steyscal et al., "Digital Beamforming for Radars", in Microwave Journal, vol. 32, no. 1, pp. 122–136.

The calibration circuit for such a conventional example is shown in FIG. 33. The calibration procedure in the case of using the calibration circuit shown in FIG. 33 is as follows:

(1) A reference signal from a reference signal oscillator is sent as a common signal to each of the branches to the receivers of each of the branches via a coupler having a branching means. The calibration value for each receiver is found using the value obtained at the receiver of each of the branches and the reference value. The value of a particular branch determined in advance and detected by the receiver is used as this reference value.

(2) The signal output from the transmitter is sent to the receiver via an attenuator, and the calibration value for all transmitters and receivers is found for each of the branches using the value obtained for each of the branches and the reference value. The reference value used here is the value obtained by the receiver of the branch serving as the reference when the calibration value of the receiver is found in step 1 above.

(3) The calibration value of the receiver found in step 1 above is subtracted from the calibration value for all transmitters and receivers found in step 2 above, and the calibration value for each transmitter is found.

In the above manner, by using the calibration circuit in FIG. 33, the amplitude and phase between each of the branches of the array antenna in the apparatus can be calibrated.

However, because the frequencies of the transmitter and receiver differ in the case of an FDD system, the receiver cannot measure the signal output from the transmitter, and thus even if a calibration circuit such as that shown in FIG. 33 is used, the procedure in step 2 above cannot be carried out. Therefore, in the case of using the conventional calibration circuit, only calibration of the receiver can be carried out, and the problem occurs that the amplitude error and phase error on the transmitter side cannot be cancelled. In addition, the conventional calibration circuit realizes calibration between apparatuses, and cannot carry out calibration between antenna elements.

In contrast, in the case of calibrating the amplitude and phase between each of the branches of the array antenna apparatus so as to include the variation in the amplitude and phase of the antenna elements, a method is used wherein a signal arriving from a distant field is received or a signal transmitted from an array antenna at a distance field is received, and the phase is rotated in sequence using a phase shifter for each of the branches. This technology is disclosed, for example, in Citation 5, Mano and Kataki, "Amplitude and phase measurement method for elements of a phased array antenna", *Proceedings of the Electronic Communication Symposium* (B), vol. J-65-B, no. 5, pp. 555–560 [in Japanese].

However, in mobile communication, for example, the base stations are not necessarily arranged in a regular pattern, and each base station is placed at positions to cancel the blind zones in a communication area and at positions suitably determined depending on increasing traffic. In the case of using an element field vector rotation method described above at each base station for mobile communication, the base station and the standard station must satisfy line-of-site conditions. Therefore, in an environment such as mobile communications, calibrating the amplitude and phase between each of the branches of an array antenna as far as possible within the apparatus itself is preferable.

In addition, a method that carries out calibration of the antenna and the transmitters and receivers connected thereto by transmitting and receiving a signal between the antenna elements of the array antenna is disclosed, for example, in Citation 6, H. M. Aumann et al., "Phased Array Antenna Calibration and Pattern Prediction Using Mutual Coupling Measurements", *IEEE Trans.* on AP-37, no. 7, pp. 844–850, July 1989.

Citation 6 will be explained referring to FIGS. 35A and 35B. In this method, as shown in FIG. 35A, each of the antenna elements is arranged so as to form, for example, a hexagon, and at the same time are arranged so as to be equally spaced when the adjacent antennal elements are viewed from a reference element (in this case, denoted #m). In this case, the mutual coupling between the adjacent antenna elements viewed from the reference element can be treated as identical. Under this condition, by transmitting and receiving a signal between the adjacent antennal elements and the reference element, as shown in FIG. 35B, the differences between amplitude and phase between the transmitters and the receivers can be compensated.

However, many times the arrangement of the antenna elements in practice is a straight line or circle, and in these actual arrangements, equalizing the mutual coupling between the used antennas is difficult. In addition, in order to apply this method, all of the elements must satisfy the conditions described above, and a plurality of antennas for calibration is necessary. In the case of using this method in an FDD system, because the transmitting and receiving frequencies are different, there is the problem that a signal cannot be simply transmitted and received between adjacent antennas.

SUMMARY OF THE INVENTION

An object of the present invention is to provide an adaptive array antenna transceiver apparatus that can separately and simply calibrate, in an array antenna apparatus, both the transmitters and receivers of an apparatus that includes the antenna power source even in the case that the transmitting frequency and the reception frequency of the array antenna are different.

In order to attain this objective, in an adaptive array transceiver apparatus providing an array antenna comprising a plurality of antenna elements, transmitters and receivers in the same number as the antenna elements of the array antenna, a transmitter/receiver common-use device connecting the respective transmitters and receivers to each of the antenna elements, and a radiation pattern control processor that controls the radiation pattern of the array antenna by synthesizing the output of the plurality of receivers by weighting the amplitude and phase with respect to a signal input from each respective antenna element to the plurality of receivers, and at the same time the reception frequency of the receivers is different from the transmitting frequency of the transmitters, the present invention provides a local signal generator that outputs a signal having a frequency that corresponds to the difference between the reception frequency of the receivers and the transmitting frequency of the transmitters, a branching device that separates and extracts a part of the signals from the output of the plurality of transmitters, a first switch that selects the signal output from any one of the plurality of transmitters, a frequency converter that converts the frequency of the signal selected by the first switch by using the signal output by the local signal generator, a second switch that inputs signals output by the frequency converter and selectively outputs them to any one of the plurality of paths corresponding to the plurality of receivers, a third switch that selectively inputs into each of the receivers a reception signal from the antenna elements and a signal from the second switch, and a calibration control circuit that controls the connection state of the first switch, the second switch, and the third switch, inputs the amplitude and phase values obtained at the receivers, and finds the calibration value of each of the branches of the array antenna.

In this first aspect of the adaptive array antenna transceiver apparatus, the signals output by any one of the plurality of transmitters is extracted by a branching device (for example a coupler), selected by the first switch, and input to the frequency converter. The frequency converter converts the frequency of the signal selected by the first switch using a signal output by the local signal generator.

In addition, the frequency of the signal output by the local signal generator corresponds to the difference between the reception frequency of the receivers and the transmission frequency of the transmitters. For example, in the case that the transmission frequency of the transmitter is f1 and the reception frequency of the receiver is f2, and there is a relationship f1>f2, the frequency of the signal output by the local signal generator becomes f1–f2. Therefore, when a signal having a frequency f1 output from the transmitter is input into a frequency converter, a signal having a frequency f2 is obtained at the output of the frequency converter. The frequency f2 of this signal is the same as reception frequency f2 of the receivers, and thus if this signal is input into each of the receivers, the amplitude and phase of the signal can be measured at these receivers.

The second switch inputs the signal output by the frequency converter and selectively outputs it to any one of a plurality of paths corresponding to the plurality of receivers. The third switch selectively inputs into each receiver the reception signal from the antenna elements and the signals from the second switch.

Therefore, by switching the first switch, the second switch, and the third switch, the transmission signal from the transmitter provided on any one of the branches of the array antenna can be input into the transmitter of any one of the branches after it matches the frequency.

The calibration control circuit carries out the control of the first switch, the second switch, and the third switch. In addition, the calibration control circuit inputs the amplitude and phase values obtained at the receivers and finds the calibration value for each of the branches of the antenna.

According to the first aspect of the adaptive array antenna transceiver apparatus, even in the case that the reception frequency of the receiver and the transmission frequency of the transmitter are different, the amplitude and phase values can be measured by inputting the signal output by the transmitter into the receiver, and thus calibration of the transmitter can be carried out without calibrating the receiver.

In addition, in the present invention, in the first aspect of the adaptive array antenna transceiver apparatus, the calibration control circuit selects in sequence the signals output from the respective plurality of transmitters by the first switch, and at the same time, controls the second switch and the third switch, inputs the signal that has been frequency converted by the frequency converter into the receiver of the particular branch assigned in advance to serve as a reference, and calculates, as the calibration value of the transmission system of each of the branches, a amplitude and phase ration between the plurality of values measured at the transceiver of each branches and the values measured at the transceiver of the particular branch assigned in advance to serve as the reference.

The components of the transmitter, the components of the receiver, and the components dependent temperature characteristics are included in the amplitude and phase values that are obtained by detecting the signal output by the transmitter at the receiver. Because the ratio of the amplitude and phase values obtained by measuring the signals from the transmitter of each of the branches at a particular receiver to the amplitude and phase values obtained by measuring a signal from the transmitter of the branch serving as the reference is found, the components of the common receivers and the components of the temperature characteristics are offset in the amplitude and phase values of each of the branches are cancelled, and the components of the amplitude and phase values of only the transmitters can be obtained as calibration values.

In addition, in the present invention, in the first aspect of the adaptive antenna transceiver apparatus, the calibration circuit selects a signal output by the transmitter of a particular branch assigned in advance to serve as a reference, and at the same time, by controlling the second switch and the third switch, the signals that have been frequency converted by the frequency converter are input in sequence into the receiver of each of the branches, and calculates, as the calibration value of the reception system of each of the branches, a amplitude and phase ration between the plurality of values measured at the receiver of each branches and the values measured at the receiver of the particular branch assigned in advance to serve as the reference.

The component of the transmitter, the component of the receiver, and the components dependent on the temperature characteristics are included in the amplitude and phase values obtained by detecting the signal output by a transmitter at a receiver. Because the ratio of the amplitude and phase values obtained by measuring the ratio of the amplitude and phase values obtained by measuring the signals from a particular transmitter to the amplitude and phase values measured at the receiver of the branch serving as the reference is found, the components of the common transmitters and the components of the temperature characteristics are cancelled in the amplitude and phase values of each of the branches, and the components of the amplitude and phase values of only the receiver are obtained as the calibration values.

Furthermore, in an adaptive array transceiver apparatus providing an array antenna comprising a plurality of antenna elements of the array antenna, transmitters and receivers in the same number as the antenna elements of the array antenna, transmitter/receiver common-use devices connecting the respective transmitters and receivers to each of the antenna elements, and a radiation pattern control calculation circuit that controls the radiation pattern of the array antenna by synthesizing the output of the plurality of receivers by weighting the amplitude and phase with respect to the signals input from each of the respective antenna elements to the plurality of receivers, and at the same time the reception frequency of the receivers is different from the transmitting frequency of the signal applied to the antenna elements from the transmitter, the present invention provides a local signal generator that outputs a signal having a frequency that corresponds to the difference between the reception frequency and the transmitting frequency, a first frequency converter that converts the frequency of the signal having the same frequency as the reception frequency output from each of the plurality of transmitters using a signal output by the local signal generator, a first branching device that separates and extracts a part of the signals from the output of the plurality of transmitters after conversion by the first frequency converter, a second branching device that separates and extracts a part of a signal from the output of one transmitter before conversion by the first frequency converter, a first switch that selects one signal input by any one of the plurality of transmitters into the first branching device, a second frequency converter that converts the frequency of the signal selected by the first switch by using the signal output by the local signal generator, a second switch that inputs signals output by the second branching device and selectively outputs them to one of the plurality of paths corresponding to the plurality of receivers, a third switch that selectively inputs into each of the receivers a reception signal from the antenna elements, a signal from the second switch, and a signal from the second frequency converter, and a calibration control circuit that controls the connection state of the first switch, the second switch, and the third switch, inputs the amplitude and phase values obtained at the receivers, and finds the calibration value of each of the branches of the array antenna.

In the second aspect of the adaptive transceiver apparatus, the frequency of the signal output by each of the transmitters is identical to the reception frequency of the receivers, but the signals output by each of the transmitters are frequency converted by the first frequency converter and applied to the antenna elements as transmission signals. Thus, like the first aspect, the transmission frequency and the reception frequency of the receivers are different.

The first branching device separates and extracts a part of the transmission signal after conversion by the first frequency converter. The first switch selects a signal (the signal after conversion by the first frequency converter) from the transmitter of any one of the branches, and inputs this to the second frequency converter. The second frequency converter converts the frequency of the signal selected by the first switch using the signal output by the local signal generator.

In addition, the frequency of the signal output by the local signal generator corresponds to the difference between the reception frequency of the receiver and the transmission frequency. For example, in the case that the transmission frequency of the signal applied to the antenna elements is f1, the reception frequency of the receiver is f2, and the relationship between these frequencies is f1>f2, the frequency of the signal output by the local signal generator becomes f1−f2.

Therefore, when the signal that is input from the transmitter, passes through the first frequency converter, and has the frequency f1, is input into the second frequency converter, a signal having a frequency of f2 is obtained at the output of the second frequency converter. The frequency f2 of this signal is identical to the frequency f2 of the reception frequency of the receiver, and thus, if this signal is input into each receiver, the amplitude and phase at the receiver can be measured.

In this example, the frequency of the signal output from each of the transmitters is identical to the reception frequency of the receivers, and thus in the case that the signal from the transmitter is extracted before passing through the first frequency converter, the amplitude and phase values at the receiver can be measured without converting the frequency of this signal.

Thus, the second switch extracts from the output of the transmitter of one branch the signal before conversion by the first frequency converter using the second branching device, and selectively outputs this to one of the plurality of paths corresponding to the plurality of receivers. The third switch selectively inputs into each receiver the reception signal from the antenna elements, the signal from the second switch, and the signal from the second frequency converter.

Therefore, by switching the first switch, the second switch, and the third switch, the transmission signal from the transmitter provided on any one of the branches of the array antenna can be input into the receiver of any one of the branches after it matches the frequency.

The calibration control circuit carries out the control of the first switch, the second switch, and the third switch. In addition, the calibration control circuit inputs the amplitude and phase values obtained at the receiver and finds the calibration value of each of the branches of the array antenna.

In addition, the second aspect of the adaptive array antenna transceiver apparatus can carry out calibration of the transmitter without calibrating the receiver because the amplitude and phase values can be measured by inputting the signals output by the transmitter to the receiver even in the case that the reception frequency and the transmitting frequency are different.

In addition, in the present invention, in the second aspect of the adaptive array antenna transceiver apparatus, the calibration control circuit selects in sequence signals output from each of the plurality of transmitters using the first switch, and at the same time, controls the second switch and the third switch, inputs into the receiver of a particular branch assigned in advance to serve as a reference signal a signal that has been frequency converted by the second frequency converter, and calculates as the calibration value of the transmitter system of each of the branches the ratio of the plurality of the amplitude and phase values measured for the respective signals from the transmitters of each of the branches to the amplitude and phase values measured for the signal from the transmitter of a particular branch assigned in advance to serve as a reference.

The component of the transmitter, the component of the receiver, and the components of the temperature characteristics are included in the amplitude and phase values obtained by detecting the signal output by the transmitter at the receiver. The ratio of the amplitude and phase values obtained by measuring the signal from the transmitter of each of the branches at a particular receiver and the amplitude and phase values obtained by measuring the signal from the transmitter of the branch that serves as the reference, and thus the components of the common receivers and the components dependent on temperature characteristics are cancelled in the amplitude and phase values of each of the branches, and the component of the amplitude and phase values of only the transmitter is obtained as the calibration value.

In addition, in the present invention, in the second aspect of adaptive array antenna transceiver apparatus, the calibration control circuit extracts the signals output by the transmitter of a particular branch assigned in advance to serve as the reference using the second branching device, inputs these in sequence to the receivers of each of the branches via the second switch and the third switch, and calculates as the calibration value of the reception system of each of the branches the ratio of the plurality of amplitude and phase values measured at the respective receivers of each of the branches and the amplitude and phase values measured at the receiver of the particular branch assigned in advance to serve as the reference.

The component of the transmitter, the component of the receiver, and the components of the temperature characteristics are included in the amplitude and phase values obtained by detecting the signal output by the transmitter at the receiver. The ratio of the amplitude and phase values obtained by measuring the signal from the particular transmitter at the receiver of each of the branches and the amplitude and phase values measured at the receiver of the branch that serves as the reference is found, and thus the component of the common transmitters and the components dependent on the temperature characteristics are cancelled in the amplitude and phase values of each of the branches, and the component of the amplitude and phase values of only the receiver is obtained as the calibration value.

Furthermore, in an adaptive array transceiver apparatus providing an array antenna comprising a plurality of antenna elements, transmitters and receivers in the same number as the antenna elements of the array antenna, transmitter/receiver common-use devices connecting the respective transmitters and receivers to each of the antenna elements, and a radiation pattern control calculation circuit that controls the radiation pattern of the array antenna by synthesizing the output of the plurality of receivers by weighting the amplitude and phase with respect to a signal input from each respective antenna element to the plurality of receivers, and at the same time the reception frequency of the receivers is different from the transmitting frequency of the transmitters, the present invention provides a local signal generator that outputs a signal having a frequency that corresponds to the difference between the reception frequency of the receivers and the transmitting frequency of the transmitters, a branching device that separates and extracts a part of the signals from the plurality respective of transmitters, a plurality of first switches that inputs and selects one of the output signals of the respective branching devices from two adjacent branches in the arrangement of the branches of the array antenna determined in advance, a frequency converter that converts the frequency of the signal selected by the first switch by using the signal output by the local signal generator, a plurality of second switches that input signals output by the frequency converter for each of the plurality of branches of the array antenna and selectively outputs this to one of the two branches adjacent to each other, a third switch that selects one of the reception signals from the antenna element of the relevant branch, a signal from the second switch included in the relevant branch, and a signal from the second switch included in the adjacent branch and inputs it into one of the receivers, and a calibration control circuit that controls the connection state of the first switch, the second switch, and the third switch, inputs the amplitude and phase values obtained at the receiver, and finds the calibration value of each of the branches of the array antenna.

In a third aspect of the adaptive array antenna, a first switch inputs the output signals of said branching device respectively from two branches that are adjacent to each other, and selects one of them. Moreover, the two branches that are adjacent in this case do not necessarily conform to the actual arrangement of the antenna elements, and the arrangement of the branches that the first switch selects can be determined arbitrarily.

The frequency converter converts the frequencies of the signal selected by the first switch in each of the branches using the signal that the local signal generator outputs.

In addition, the frequency of the signal output by the local signal generator corresponds to the difference between the reception frequency of the receiver and the transmission frequency of the transmitter. For example, in the case that the transmission frequency of the transmitter is f1, the reception frequency of the receiver is f2, and the relationship therebetween is (f1>f2), then the frequency of the signal output by the local signal generator is (f1−f2). Therefore, when the signal output from the receiver and having a frequency of f1 is input into the frequency converter, a signal having a frequency of f2 is obtained at the output of the frequency converter. The frequency f2 of this signal is the same as the reception frequency f2 of the receivers, and thus if this signal is input into each of the receivers, the amplitude and phase of the signal can be measured at these receivers.

The second switch inputs a signal output by the frequency converter for the respective plurality of branches of the array antenna, and selectively outputs it to one of the paths among the two branches that are adjacent to each other.

For the respective plurality of branches of the array antenna, the third switch selects among the reception signals from the antenna elements of the relevant branch, the second switch belonging to the relevant branch, or the signal from the second switch belonging to the adjacent branch, and inputs them into one receiver.

Therefore, by switching the first switch, the second switch, and the third switch, the transmission signal from the transmitter provided on any one of the branches of the array antenna can be input into the receiver of any one of the branches after it matches the frequency.

The calibration control circuit carries out the control of the first switch, the second switch, and the third switch. In addition, the calibration control circuit inputs the amplitude and phase values obtained at the receiver and finds the calibration value for each of the branches of the antenna.

According to the third aspect of the adaptive array antenna transceiver apparatus, even in the case that the reception frequency of the receiver and the transmission frequency of the transmitter are different, the signal output by the transmitter is input into the receiver, and the amplitude and phase values can be measured, and thus not only calibration of the receiver, but calibration of the transmitter can be carried out.

In addition, in the third aspect of the adaptive array transceiver apparatus, the calibration control circuit alternately selects by the first switch the signals output by the transmitters of two adjacent branches at each of the adjacent branches, and at the same time, controls the second switch and the third switch, inputs the signal frequency converted by the frequency converter into one receiver assigned in advance among the two branches, finds as the first ratio the ratio of the respectively measured values of the amplitude and phase for the signals from the transmitters of the two branches, and at the same time, for branches other than the branch assigned in advance to serve as the reference, the first ratio found at the relevant branch is calibrated using the first ratio found at the other branches, and the calibration value of the transmitting system of each of the branches is calculated.

The signals from the transmitters of two adjacent branches are alternately selected by the first switch and input into the receiver common to one branch, and thereby the two amplitude and phase values are obtained. The ratio for these two amplitudes and phase values serves as the first ratio. The first ratio is found at each of the respective adjacent branches.

However, amplitude and phase value components related to the transmitter of the two branches are included in the first ratio found between two adjacent branches. Thus, for branches other than that assigned in advance to serve as the reference, the first ratio found at the relevant branch is calibrated using the first ratio found from the other branches.

By this calibration, the first ratio of each of the branches is unified with the ratio of the amplitude and phase values of the transmitter of the relevant branch with respect to the amplitude and phase value components of the transmitter of a particular branch assigned to serve as a reference. Therefore, the first ratio of each of the branches can be used as a calibration value for the amplitude and phase value components of each of the transmitters.

In addition, in the present invention, in the third aspect of the adaptive array antenna transceiver apparatus, the calibration control circuit selects the signal output by the one transmitter assigned in advance among two adjacent branches for each adjacent branch by the first switch, and at the same time, controls the second switch and the third switch, alternately inputs the signal that has been frequency converted by the frequency converter into each of the receivers of the two adjacent branches, and finds as a first ratio the ratio of a plurality of amplitude and phase values respectively measured at the receivers of two adjacent branches, and at the same time, for branches other than that assigned in advance to serve as the reference, the first ratio found at the relevant branch is calibrated using the first ratio found at the other branches, and the calibration value of the receiving system of each of the branches is calculated.

For each of two adjacent branches, the signal from one of the receivers is alternately selected at the second switch and input into one of the receivers, and thereby two amplitude and phase values are obtained. The ratio of these two amplitude and phase values serves as the first ratio. The first ratio is found for each of the respective adjacent branches.

Amplitude and phase value components related to the receivers of the two branches are included in the first ratio found between two adjacent branches. Thus, for branches other than that assigned in advance to serve as the reference, the first ratio found at the relevant branch is calibrated using the first ratio found at the other branches.

By this calibration, the first ratio of each of the branches is unified with the ratio of the amplitude and phase values of the receiver of the relevant branch with respect to the amplitude and phase value components of the receiver of the particular branch assigned to serve as the reference. Therefore, the first ratio of each of the branches can be used as a calibration value for the amplitude and phase value components of each of the receivers.

In addition, in an adaptive array antenna transceiver apparatus providing an array antenna formed by N antenna elements, N is an integral number and shows three or more; N transmitters and receivers; a transmitter/receiver common-use device that connects the respective transmitters and receivers to each of the antenna elements; and a radiation pattern control processor that controls the radiation pattern of the array antenna by synthesizing the output of the plurality of receivers by weighting the amplitude and phase with respect to a signal input from each of the respective antenna elements into the plurality of receivers, and at the same time the reception frequency of the array antenna to be used in communication and from the transmitting frequency is different, a fourth aspect of an adaptive array antenna transceiver apparatus provides N transmitters for which the frequency of the transmission signal is identical to the reception frequency of the array antenna; a first frequency converter that converts the frequency of signals transmitted by each of the N transmitters to the transmission frequency of the array antenna; N branching devices that extract a signal from the output of each of the N transmitters before conversion by the first frequency converter; N receivers for which the frequency of the reception signal is identical to the reception frequency of the array antenna; a second frequency converter that converts a signal having a frequency identical to the transmission frequency of the array antenna to a frequency identical to the reception frequency of the array antenna; an output of the first frequency converter; an input of the receiver; N first transmitter/receiver common-use devices provided between each of the antenna elements; N second transmitter/receiver common-use devices provided between, the output of the branching device, the input of the second frequency converter, and each of the antenna elements; at least one additional antenna that can be connected to any one of the N transmitters or the N receivers; a first switch provided on each of the antenna elements that connects either one of the antenna elements or the additional antenna to either one of the first transmitter/receiver common-use device or the second transmitter/receiver common-use device; a second switch provided on each receiver and connected to the input of the receivers and selectively inputs into the receivers either one of the reception signals from the first transmitter/receiver common-use device or the reception signals output by the second frequency converter; a third switch that connects the additional antenna to any one of the first switches; and a calibration control circuit that controls the first switch, second switch, and third switch, and at the same time finds the calibration value of the amplitude and phase between branches of the array antenna based on the amplitude and phase values obtained from each of the receivers.

In the fourth aspect of the adaptive array antenna transceiver apparatus, by controlling the first switch, second switch, and third switch, the circuits of three branches are selected, and a signal transmitted from each of two branches can be received by the one common branch or the signal transmitted from the one common branch can be received by each of the two remaining branches.

In addition, a signal can be transmitted or received using the additional antenna for the common branch.

The additional antenna is disposed at a predetermined position, and by receiving at the one common branch a signal transmitted from two branches via the additional antenna, the relative amplitude and phase values that include the transmitting part 115 and antenna elements of the two branches can be found as the calibration value.

In addition, by receiving the signal transmitted from the one common branch at the two respective branches via the additional antenna, the relative amplitude and phase values that includes the reception part and the antenna elements of the two branches can be found as the calibration value.

Because the reception frequency and transmission frequency of the array antenna used for communication are different, the frequency of the signal transmitted from the array antenna is different from the reception frequency of the receiver, but the receiver can obtain the reception signal having a receivable frequency due to the second frequency converter which is provided at the receiving side.

In addition, in the fourth aspect of the adaptive array transceiver apparatus, the calibration control circuit controls the first switch, second switch, and third switch, and selects from among the N transmitters the first transmitter or the second transmitter respectively included in branches of two antenna elements that have equal distances from the additional antenna, and at the same time, selects from among the N receivers one calibration receiver included in a branch differing from that of the first transmitter and the second transmitter, connects the third switch to one calibration receiver included in a branch differing from that of the first transmitter and second transmitter, transmits the signal that is the signal transmitted by the first transmitter and frequency converted by the first frequency converter from the antenna element of the branch included in the first transmitter, inputs the output that is the signal from the first transmitter received by the additional antenna and frequency converted by the second frequency converter into the calibration receiver, and detects a first measured value obtained at the calibration receiver, transmits the signal that is the signal transmitted from the second transmitter and frequency converted by the first frequency converter from the antenna element included in the second transmitter, inputs the output that is the signal from the second transmitter and received by the additional antenna and frequency converted by the second frequency converter into the calibration receiver and detects the second measured value obtained at the calibration receiver, calculates the ratio of the second measured value and the first measured value to serve as the first calibration value, finds the first calibration value for the respective plurality of branches based on the first measured value and the second measured value measured by switching in sequence the selection of the first transmitter an the second transmitter, and for branches other than the reference branch assigned in advance, calibrates the first calibration value of the relevant branch using the first calibration value obtained at the other branches, and calculates the relative value with respect to the reference branch as the first calibration value.

In the fourth aspect of the adaptive array antenna transceiver apparatus, the calibration control circuit controls the first switch, second switch, and third switch, and selects from among the N transmitters a first transmitter and the second transmitter included in the respective branches of two antenna elements that have equal distances from the additional antenna, and at the same time, selects from among the N receivers one calibration receiver included in a branch different from that of the first transmitter and second transmitter.

In addition, the calibration control circuit transmits the signal that is the signal transmitted from the first transmitter and frequency converted by the first frequency converter from the antenna element of the branch included in the first transmitter, inputs the output that is the signal from the first transmitter received by the additional antenna and frequency converted by the second frequency converter into the calibration receiver, and detects the first measured value obtained at the calibration receiver.

Furthermore, the calibration control circuit transmits the signal that is the signal transmitted by the second transmitter and frequency converted by the first frequency converter from the antenna element of the branch included in the second transmitter, inputs the output that is the signal from the second transmitter received by the additional antenna and frequency converted by the second frequency converter into the calibration receiver, and detects a second measured value obtained at the calibration receiver.

In addition, the calibration control circuit calculates as the first calibration value the ratio of the second measured value and the first measured value, and finds the respective first calibration values for the plurality of branches based on the respective first measured value and the second measured value by switching in sequence the selection of the first transmitter and the second transmitter. In addition, for branches other than the reference branch assigned in advance, the first calibration value of the relevant branch is calibrated using the first calibration value obtained at the other branches, and the first calibration value is calculated as a relative value with respect to the reference branch.

In the above-described fourth aspect of the adaptive array antenna transceiver apparatus, even in the case that there are many antenna elements in the array antenna, the calibration value for the amplitude and phase values of the transmitter that includes the transmitters and antenna elements of the respective branches can be found as a relative value with respect to a particular reference branch.

In addition, in the fourth aspect of the adaptive array transceiver apparatus, the calibration control circuit controls the first switch, second switch, and third switch, and selects from among the N transmitters the first transmitter or the second transmitter respectively included in branches of two antenna elements that have equal distances from the additional antenna, and at the same time, selects from among N transmitters one calibration transmitter included in a branch different from that of the first receiver and the second receiver, transmits the signal output by the calibration transmitter from the additional antenna via the branching device, the second transmitter/receiver common-use device, the first switch, and the third switch, inputs the signal from the calibration transmitter received by the antenna element of the branches included in the first receiver into the first receiver and detects the first measured value obtained at the first receiver, inputs the signal from the calibration transmitter received by the antenna element of the branch included in the second receiver into the second receiver and detects a second measured value obtained at the second receiver, calculates the ratio of the second measurement value and the first measurement value as the first calibration value, finds the first calibration values of the respective plurality of branches based on the first measured value and the second measured value respectively measured by switching in sequence the selection of the first receiver and second receiver, calibrates the fist calibration value of the relevant branch using the first calibration value obtained at the other branches, and calculates the first calibration value as a relative value with respect to the reference branch.

In the fourth aspect of the adaptive array antenna transceiver apparatus, the calibration control circuit controls the first switch, second switch, and third switch, and selects from among N receivers the first receiver and second receiver respectively included in branches of two antenna elements that have equal distances from the additional antenna, and at the same time, selects from among N transmitters one calibration transmitter included in a branch different from that of the first receiver and the second receiver.

In addition, the calibration control circuit transmits a signal output by the calibration transmitter from the additional antenna via a branching device, a second transmitter/receiver common-use device, a first switch and third switch, inputs the signal from the calibration transmitter received by the antenna element of the branch included in the first transmitter into the first receiver, and detects the first measured value obtained at the first receiver.

Furthermore, the calibration control circuit inputs a signal from the calibration transmitter received by the antenna element of a branch included in the second receiver into the second receiver, and detects the second measured value obtained at the second receiver.

In addition, the calibration control circuit calculates the ratio of the second measured value and the first measured value as the first calibration value, and finds the first calibration value for the respective plurality of branches based on the respective first measured value and the second measured value by measured by respectively switching in sequence the first receiver and the second receiver. In addition, for branches other than the reference branch assigned in advance, the calibration control circuit calibrates the first calibration value for the relevant branch using the first calibration value obtained at the other branches, and calculates the first calibration value as a relative value with respect to the reference branch.

In the above-described fourth aspect of the adaptive array antenna transceiver apparatus, even in the case that there are many antenna elements in the array antenna, the calibration value of the amplitude and phase values of the reception part that includes the receiver and antenna elements of the respective branches can be found as a relative value with respect to a particular reference branch.

In addition, in the fourth aspect of the adaptive array antenna transceiver apparatus, the present invention disposes N antenna elements at an equal distance on one straight line, and at the same time, disposes an additional antenna at a position at the middle of two antenna elements.

In the case that the antenna elements of the array antenna are disposed in a line, by placing the additional antenna at a position at the middle of the two selected antenna elements, the distances between the two respective antenna elements can be made equal.

By making the respective distances between the additional antenna and the two antenna elements equal, the calibration value can be found such that the influence of transmission loss between the antenna elements and the additional antenna does not appear.

Moreover, in the case that the calibration value is found for each of three or more branches, the position of the one additional antenna can be modified depending on the arrangement of the selected branches, or a plurality of additional antennas can be disposed in advance at positions at the middle thereof and then the plurality of additional antennas switched by a switch.

In addition, in the fourth aspect of the adaptive array antenna transceiver apparatus, the present invention disposes N antenna elements at equal distances on a circle, and at the same time, disposes the additional antenna at the center position of the circle.

In the case that the antenna elements of the array antenna are disposed arranged on a circle, by disposing the additional antenna at the middle position of this circle, the distances between all the respective antenna elements and the additional antenna can be made equal.

In addition, in an adaptive array antenna transceiver apparatus providing an array antenna formed by N antenna elements, N is an integral number and shows two or more; N transmitters and receivers; a transmitter/receiver common-use device that connects the respective transmitters and receivers to each of the antenna elements; and a radiation pattern control processor that controls the radiation pattern of the array antenna by synthesizing the output of the plurality of receivers by weighting the amplitude and phase with respect to a signal input from each respective antenna element into the plurality of receivers, and at the same time the reception frequency of array antenna to be used in communication and the transmitting frequency are different, a fifth aspect of an adaptive array antenna transceiver apparatus provides N transmitters for which the frequency of the transmission signal is identical to the reception frequency of the array antenna; a first frequency converter that converts the frequency of signals transmitted by each of the N transmitters to the transmission frequency of the array antenna; N first branching devices that extract a signal from the output of each of the N transmitters before conversion by the first frequency converter; N second branching devices that extract a signal form the first frequency converter after conversion at each of the branches of the array antenna; N receivers for which the frequency of the reception signal is identical to the reception frequency of the array antenna; a second frequency converter that converts a signal having a frequency identical to the transmission frequency of the array antenna to a frequency identical to the reception frequency of the array antenna; N first transmitter/receiver common-use devices provided between the output of the first frequency converter, the input of the receiver, and each of the antenna elements; an output of the branching device; an input of the second frequency converter; N second transmitter/receiver common-use device provided between each of the antenna elements; at least one additional antenna that can be connected to any one of the N transmitters or the N receivers; a first switch provided on each of the antenna elements that connects either one of the antenna elements or the additional antenna to either one of the first transmitter/receiver common-use device or the second transmitter/receiver common-use device; a second switch that connects the output of the first branching device included in the reference branch assigned in advance to the input of the receiver in any one branch; a third switch that connects any one of the outputs of the N second branching devices included in each of the branches to the input of the second frequency converter included in the reference branch; the output of a third switch; a fourth switch that connects any one of the second circulators included in the reference branch to the input of the second frequency converter included in the reference branch; a fifth switch that, in each of the branches, selects any one of the reception signals from the first transmitter/receiver common-use device, the signal output by the second frequency converter, or the signal from the transmitter output by the second switch, and applies it to the input of a receiver; a sixth switch that connects the additional antenna to any one of the first switches; and a calibration control circuit that controls the first switch, second switch, third switch, fourth switch, fifth switch, and sixth switch, and at the same time finds the amplitude and phase calibration values between branches based on the amplitude and phase values obtained from each receiver.

In the fifth aspect of the adaptive array antenna transceiver apparatus, by controlling the first switch, second switch, third switch, fourth switch, fifth switch, and sixth switch, the transmitting and receiving of signals can be carried out between a reference branch and one selected branch without interposing an antenna element.

This means that in the case of measuring the calibration value of a receiver, the signal output by the first frequency converter of the reference branch and the selected branch is selectively input into the receiver of the reference branch via the second branching device, the third switch, the fourth switch, the second frequency converter, and the fifth switch, and thus for the respective reference branch and the selected branch, the amplitude and phase values of the transmitter can be measured at the receiver of the reference branch. Therefore, a calibration value of a receiver that does not include the antenna can be found as a relative value with respect to the reference branch.

In addition, in the case that the calibration value of the receiver is measured, the signal that is output by the transmitter of the reference branch passes the first branching device and the second switch, then passes the reference branch and the selected branch of the fifth switch, and is then input into the receiver of each of the branches, and thus the signal from the transmitter of the reference branch can be measured at the receivers of the reference branch and the selected branch without interposing an antenna element. Therefore, a calibration value of a receiver that does not include the antenna can be found as a relative value with respect to the reference branch.

In addition, in an adaptive array antenna transceiver apparatus that provides an array antenna formed by N antenna elements, N is an integral number and shows two or more; N transmitters and receivers, a first transmitter/receiver common-use device that respectively connects the transmitter and receiver to each of the antenna elements, and a radiation pattern control processor that controls the radiation pattern of the array antenna by synthesizing the output of the plurality of receivers by weighting the amplitude and phase with respect to a signal input from each respective antenna element to the plurality of receivers, and at the same time, the reception frequency and the transmission frequency of the array antenna used in communication are different, and the frequency of the signal output by each of the transmitters is f1 and the reception frequency of each of the receivers is f2, a sixth aspect of an adaptive array antenna transceiver apparatus provides at least one additional antenna disposed at a position such that the distance between at least two antenna elements of the array antenna is equal; a second transmitter/receiver common-use device connected to the additional antenna; at least one first frequency converter that converts the signal having a frequency of f1 output from one transmitter to the frequency f2 and inputs it into the second transmitter/receiver common-use device, and at the same time converts the signal having a frequency of f1 input from the second transmitter/receiver common-use device to a frequency f2 and outputs it; at least one branching device that inputs into the frequency converter the signal extracted from at least one output of the N transmitters; at least one first switch that connects the input of at least one of the N receivers to any one of the first transmitter/receiver common-use devices and frequency transformers; and a calibration control circuit that controls the first switch and finds the amplitude and phase calibration values between branches of the array antenna based on the amplitude and phase values obtained from each of the receivers.

In the sixth aspect of the adaptive array antenna transceiver apparatus, by carrying out transceiving of a signal between the antenna elements of each of the branches using the additional antenna, the amplitude and phase values of each of the branches can be detected.

Because the frequency f1 of the signal output by each of the transmitters and the received frequency f2 at each of the receivers are different, the signal transmitted by the transmitter cannot be detected as-is at the receiver. However, because the signal having frequency f1 output by the transmitter during calibration is converted to a signal having frequency f2 by a frequency converter before being transmitted from the additional antenna or after being received by the additional antenna, the receiver can detect this signal.

By switching the first switch, the signal received by the additional antenna and the signal received by the antenna elements of the array antenna are selected and can be input into the receiver.

In addition, in the sixth aspect of the adaptive array antenna transceiver apparatus, a second switch that connects the branching devices to the respective output of the N transmitters, connects the first switch to the respective inputs of the N receivers, and furthermore, selectively connects any one of the branching devices connected to the N transmitters to the input of the frequency converter, and the third switch that selectively connects the output of the frequency converter to any one of the first switches connected to the N receivers are provided.

In the sixth aspect of the adaptive array antenna transceiver apparatus, the signal output by the respective N transmitters can be selectively input into the frequency converters and frequency converted. In addition, the signal having a frequency f2 output from the frequency converter can be selectively input into the receiver of any branch.

Thus, calibration can be carried out without using either the antenna elements of the array antenna or the additional antenna.

In addition, in the sixth aspect of the adaptive array antenna transceiver apparatus, the calibration control circuit controls the first switch, connects the output of the frequency converter to the input of the one receiver assigned to the selected calibration receiver from among the N receivers, selects in sequence one of the N transmitters to be a calibration transmitter and transmits the signal from the calibration transmitter, inputs the signal transmitter from the calibration transmitter and transmitted via the first transmitter/receiver common-use device and the antenna element connected thereto to the calibration receiver via the additional antenna, the second circulator, the frequency converter, and the first switch, and finds the amplitude and phase calibration values between branches of the array antenna based on the measured values detected at the calibration receiver for the signal transmitted from the calibration transmitter of the respective branch.

In the sixth aspect of the adaptive array antenna transceiver apparatus, the signals from the calibration transmitters selected in sequence can be transmitted by control of the calibration control circuit. These signals are transmitted via the first circulator and the antenna elements connected thereto, and received at the additional antenna. The signal output from the additional antenna is input into the calibration receiver via the second transmitter/receiver common-use device, the frequency converter, and the first switch.

Therefore, the signals transmitted from the calibration transmitters of the respective branches can be detected at the calibration receiver via the antenna.

In addition, in the sixth aspect of the adaptive antenna array transceiver apparatus, in the present invention, the calibration control circuit controls the first switch, connects the input of the receiver connected thereto to the first transmitter/receiver common-use device, assigns one of the N transmitters to be a calibration transmitter and transmits the signal from the calibration transmitter, selects in sequence one of the N receivers to be the calibration receiver, inputs a signal transmitted from the calibration transmitter and transmitted from the additional antenna through the branching device, a frequency converter, and a second transmitter/receiver common-use device, and finds the amplitude and phase calibration values between branches of the array antenna based on the measured values detected at the calibration receivers of the respective branches.

In a sixth aspect of the adaptive array transceiver apparatus, by the control of the control circuit, the signal transmitted from the calibration transmitter passes through the branching device, the frequency converter, and the second transmitter/receiver common-use device, and is transmitted from the additional antenna. This signal is input into the respective calibration receivers via the antenna elements of the branch and the first circulator selected in sequence.

Therefore, the signal transmitted from the first calibration transmitter can be detected at the respective calibration receivers via the path passing through the antenna of each of the branches.

In addition, in the sixth aspect of the adaptive array antenna transceiver apparatus, in the present invention, the calibration control circuit controls the first switch, connects the output of the frequency converter to the input of the one receiver among the N receivers assigned to be the calibration receiver, selects in sequence as a calibration transmitter one of the N transmitters and transmits the signal from the selected calibration transmitter, splits the signal transmitted from the calibration transmitter by the branching device and inputs the result into the frequency converter via the second switch, applies the signal output by the frequency converter to the input of the calibration receiver via the third switch and the first switch, and finds the amplitude and phase calibration values between the branches of the array antenna based on the measured values detected by the calibration receiver for the signal transmitted from the calibration transmitter for the respective branches.

In the sixth aspect of the adaptive array antenna transceiver apparatus described above, by controlling the calibration control circuit, respective signals are transmitted from the calibration transmitters selected in frequency. These signals are split by a branching device and input into the frequency converter via the second switch. The signal output from the frequency converter is applied to the input of the calibration receiver via the third switch and the first switch.

Therefore, the signals transmitted from the calibration transmitters of the respective branches can be detected at the calibration receiver via the path not passing through the antenna.

In addition, in the sixth aspect of the adaptive array antenna transceiver apparatus, the present invention is characterized in the calibration control circuit assigning one of the N transmitters to be the calibration transmitter and transmitting a signal from that calibration transmitter, selecting in sequence one of the N receivers to be the calibration receiver, splitting signals transmitted from the calibration transmitter by a branching device and applying them to the input of the frequency converter via the second switch, applying the signal output from the frequency converter to the input of the calibration receiver via the third switch and the first switch, and finding the amplitude and phase calibration values between branches of the array antenna based on the measured value detected at the calibration receivers of the respective branches.

In the sixth aspect of the adaptive array antenna transceiver apparatus described above, by controlling the calibration control circuit, a signal from one calibration transmitter is transmitted. This signal is separated by the branching means and applied to the input of the frequency converter via the second switch. The signals output from the frequency converter are applied in sequence to the input of the calibration receiver of the selected branches via the third switch and the first switch.

Therefore, the signals transmitted from one calibration transmitter can be detected in sequence by the calibration receiver of the respective branches via the path not passing through the antenna.

In addition, in the sixth aspect of the adaptive array antenna transceiver apparatus, the present invention provides a first frequency converter in which the signal having the frequency f1 output from one transmitter is converted to a signal having the frequency f2, and a transmitter/receiver common-use device frequency converter in which a signal having a frequency f1 input from the second circulator is converted to a signal having a frequency f2.

In the sixth aspect of the adaptive array antenna transceiver apparatus described above, the first frequency converter for converting the frequency of the signal transmitted to the additional antenna and the second frequency converter for converting the frequency of the signal received at the additional antenna are independent. Thus, the number of switches for switching the input and output of the frequency converter can be decreased.

In addition, in the sixth aspect of the adaptive array antenna transceiver apparatus, the present invention disposes the N antenna elements on one straight line, and in addition, disposes the additional antenna at a position at the middle of two antenna elements.

By disposing the N antenna elements and the additional antenna in this manner, the distance between at least two of the antenna elements and the additional antenna can be made equal.

Moreover, in the case that a plurality of additional antennas are provided, respective antenna elements are disposed such that the distances between two antenna elements are equal, and the plurality of additional antennas can be switched by the switches.

In addition, in the sixth aspect of the adaptive array antenna transceiver apparatus, the present invention disposes N antenna elements at equal intervals on one circle, and at the same time disposes an additional antenna at the center position of the circle.

By disposing the N antenna elements and additional antenna in this manner, all of the distances between the additional antenna and the N antenna elements are made equal.

DESCRIPTION OF THE PREFERRED EMBODIMENTS

The following embodiments so not limit the invention according to the claims. In addition, in order to attain the object, not all combinations of characteristics explained in the embodiments are necessary.

First Embodiment

Figure 1:
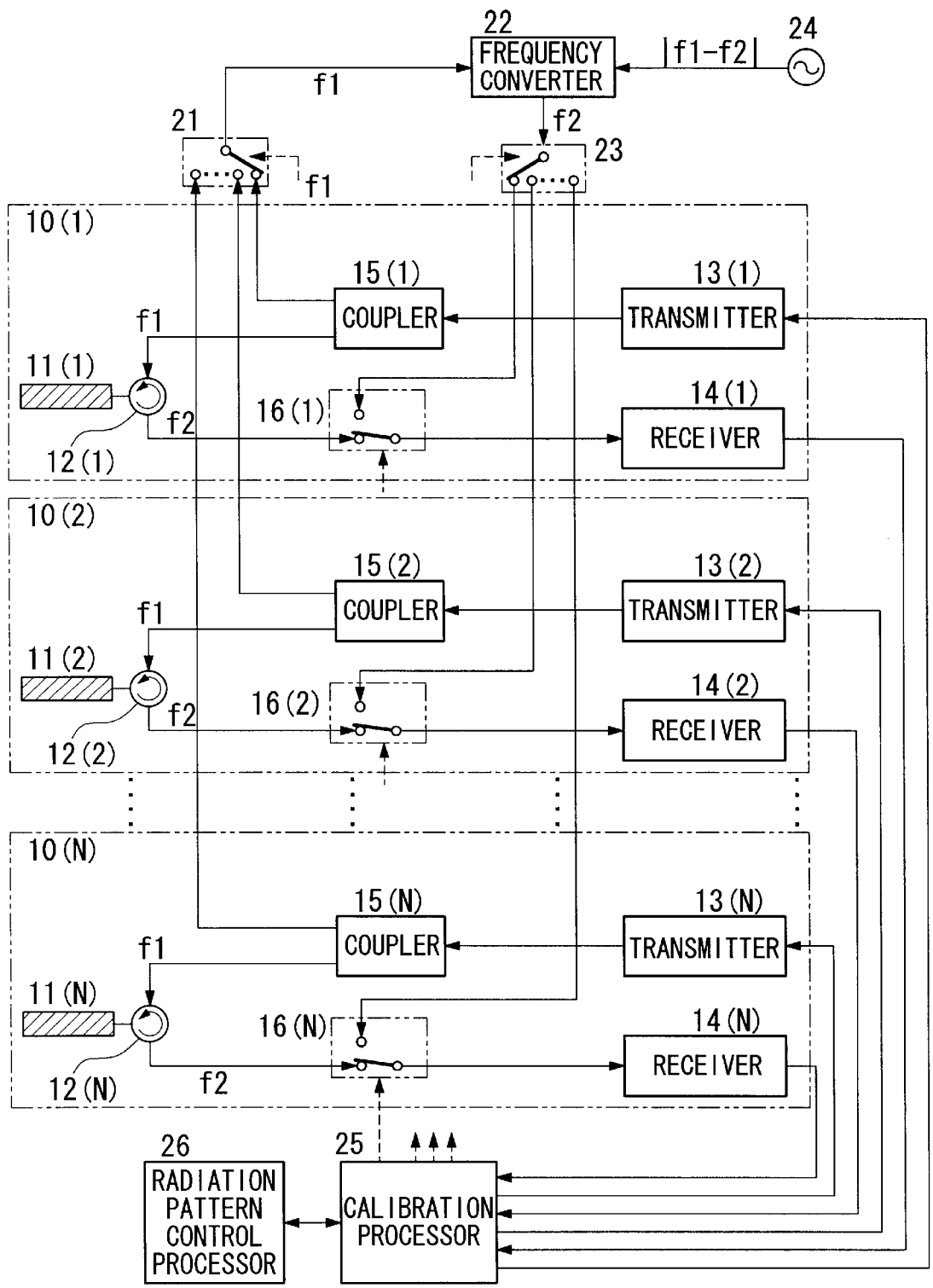
FIG. 1 is a block diagram showing the structure of the adaptive array antenna transceiver apparatus according to the first embodiment.
Figure 2:
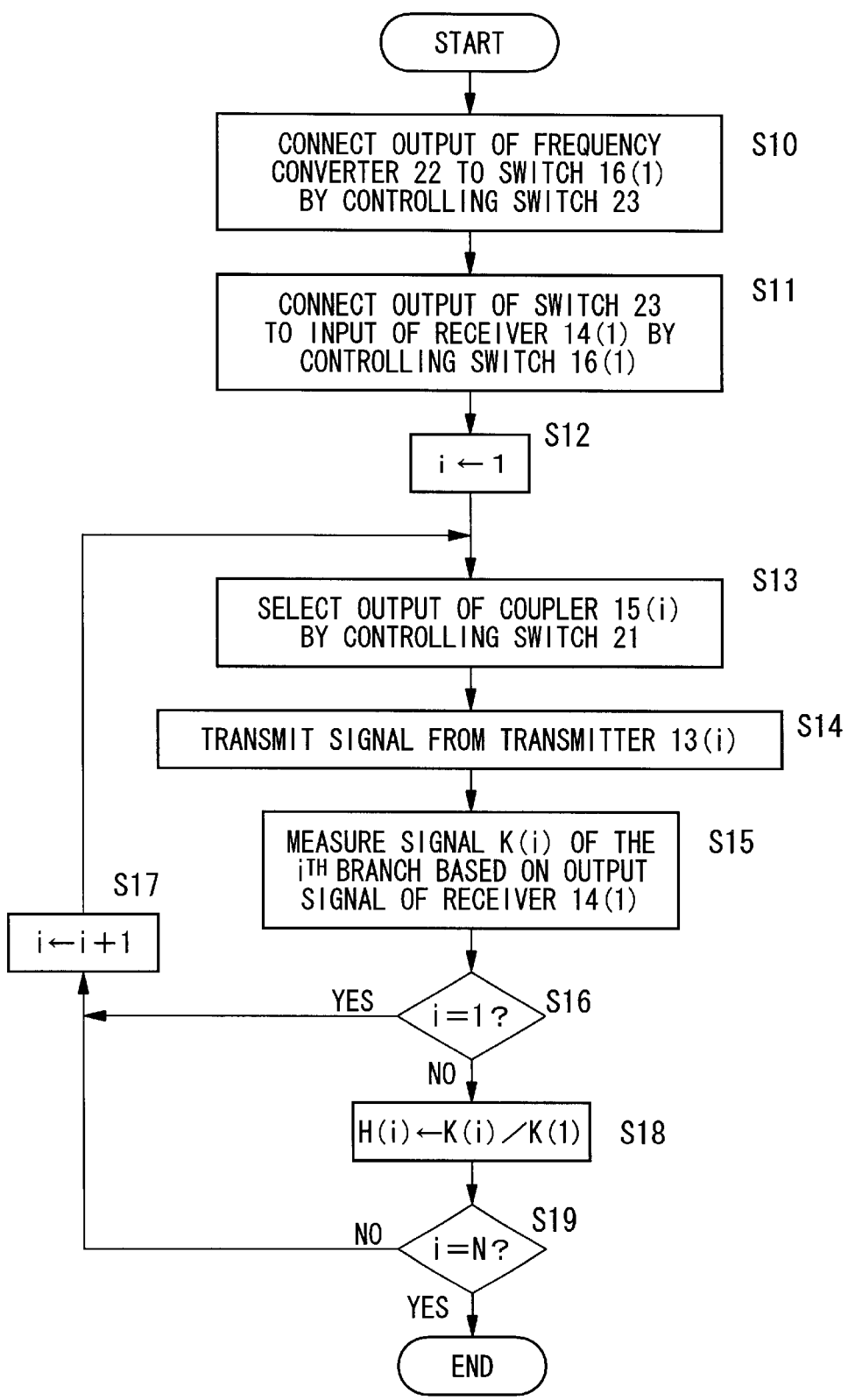
FIG. 2 is a processing chart showing the calibration control processing of the transmitter according to the first embodiment.
Figure 3:
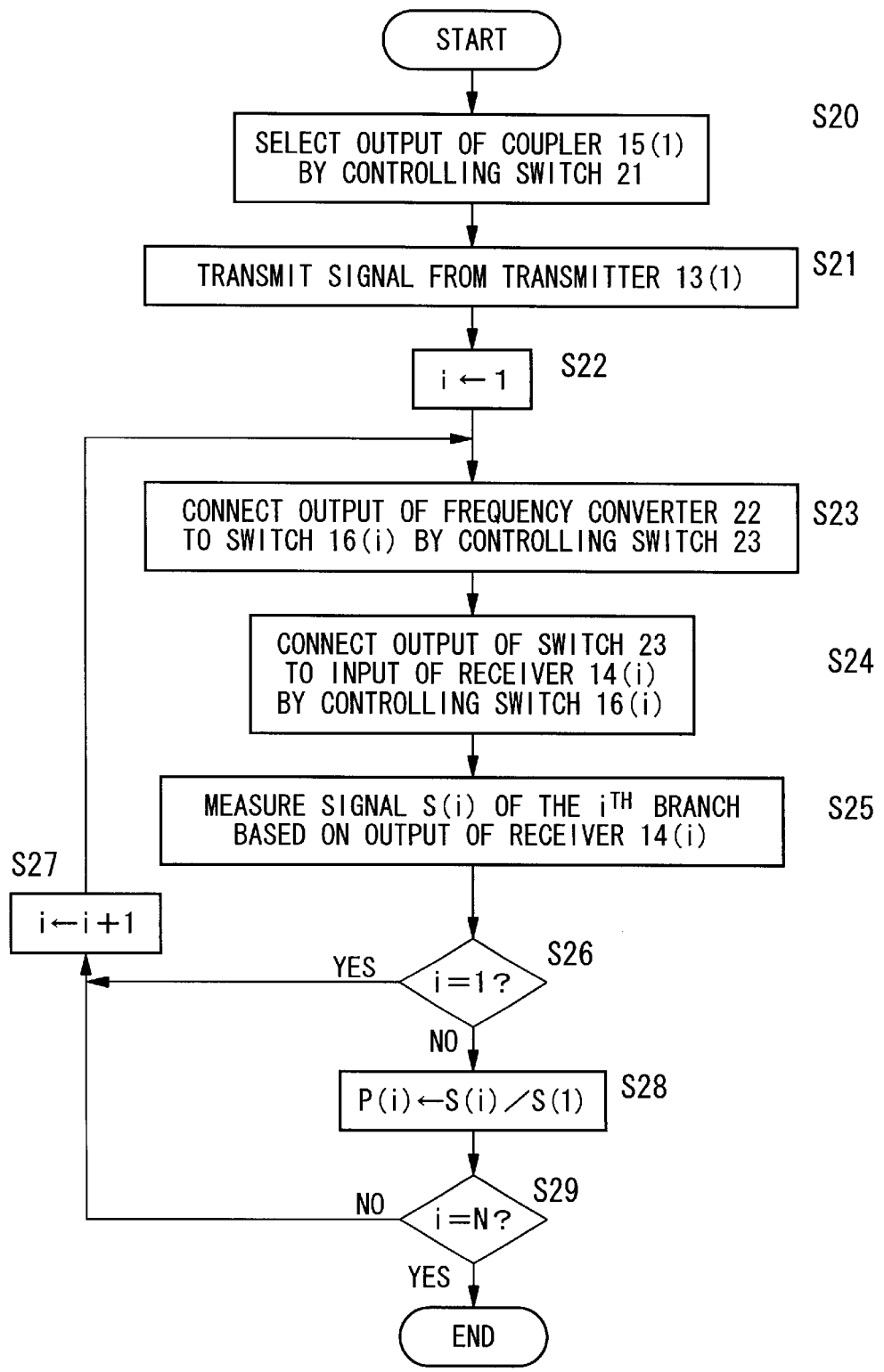
FIG. 3 is a processing chart showing the calibration control processing of the receiver according to the first embodiment.

The first embodiment of the adaptive array antenna transceiver apparatus of the present invention is explained referring to FIG. 1 through FIG. 3.

FIG. 1 is a block diagram showing the structure of the adaptive array antenna transceiver apparatus of the present invention. FIG. 2 is a flowchart showing the calibration control procedure of the transmitter of this embodiment. FIG. 3 is a flowchart showing the calibration control procedure of the receiver of this embodiment.

The adaptive array antenna transceiver apparatus comprises a circulator 12 that is an example of a transmitter/receiver common-use device, a radiation pattern control processor 26 corresponding to a radiation pattern control calculation circuit, a signal generator 24 corresponding to a local signal generator, a coupler 15 that is an example of a branching device, and a calibration processor 25 that corresponds to a calibration control circuit.

In FIG. 1, the array antenna is structured by N antenna elements 11 (where N is an arbitrary integer) disposed side by side. In this embodiment, the segments of the branch of the array antenna on which the antenna elements are disposed are represented by numerical values in parenthesis added to the reference numeral of each element. In addition, each arrow in FIG. 1 represents the direction of the signal. In the case that there is no need to segment the branches of each element, the parenthesis and the presentation of the numerical value in the parenthesis are omitted.

In the example in FIG. 1, for each of the antenna elements, a branch unit 10 including that element is formed. Each branch unit 10 is formed by an antenna element 11, a circulator 12, a transmitter 13, a receiver 14, a coupler 15, and a switch 16.

The circulator 12 is provided so that transmitters and receivers can use an antenna element 11 in common. The coupler 15 is provided in order to split and extract a part of the signal output from the transmitter 13.

In the case of carrying out transmission, the signal transmitted from each transmitter passes through the coupler 15 and the circulator 12, and is radiated as a wireless signal from the antenna element 11. In the case of carrying out reception, the signal received at antenna element 11 passes through the circulator 12 and the switch 16, and is input into the receiver.

In this example, the frequency of the signal output by the transmitter 13, that is, the transmitter frequency, is f1, the reception frequency at the receiver 14 is f2, and the transmission frequency f1 and the reception frequency f2 are different.

In the adaptive array antenna transceiver apparatus in FIG. 1, the switch 21, the frequency converter 22, the switch 23, the signal generator 24, the calibration processor 25, and the direction control processor 26 are provided in addition to the N branch units 10.

The direction control processor 26 combines the signals of N branches and controls the weighting of each of the branches during synthesis in order to adaptively control the radiation pattern of the array antenna.

The calibration processor 25 carries out calibration by finding separately the amplitude and phase error of the transmitter 13 and the receiver 14 of each branch unit 10. In practice, the calibration processor 25 finds the value to be used for calibration of each transmitter 13 by implementing the control shown in FIG. 2, and finding the value to be used for calibration of each receiver by implementing the control shown in FIG. 3.

The switches 16, 21, and 23 respectively are formed so as to be electrically controllable, and in this example each connection state is switched by the control of the calibration processor 25.

Switch 21 inputs one signal from the coupler of the N branching units 10 into the frequency converter 22. The switch 23 provides a signal output by the frequency converter 22 to one selected switch 16 from among the N branch units 10. The switch 16 of each of the branch units 10 selects either one of the reception signal from the circulator 12 or the signal output by the switch 23 and inputs this into the receiver 14. The switch 16 of each branch unit 10 selects either one of the reception signal from the circulator 12 or the signal output by the switch 23, and inputs this into the receiver 14.

The signal generator 24 outputs a signal having a frequency (|f1−f2|) corresponding to the difference between the transmission frequency f1 and the reception frequency f2. The frequency converter 22 outputs the result of mixing the signal output by the switch 21 and the signal output by the signal generator 24. The signal output by the switch 21 is one part of the signal output by the transmitter 13, and thus has a frequency of f1, and the frequency of the signal output by the signal generator 24 is (|f1−f2|).

By synthesizing (mixing) the signal having a frequency of f1 and a signal having a frequency of (|f1−f2|) in the frequency converter 22, a frequency component having the frequency of f2 can be obtained at the output of the frequency converter 22. This means that the signal having a frequency of f1 output by the transmitter 13 is converted to a signal having a frequency of f2 when passed through the frequency converter 22.

Because the reception frequency of the receiver 14 is f2, if the signal output by the frequency converter 22 is input into the receiver 14, the amplitude and phase of the signal output by the transmitter 13 can be measured at the receiver 14.

That is, in the conventional calibration circuit, when the transmission frequency and the reception frequency are different, the signal output by the transmitter cannot be input into the receiver and calibrated, but in the case of the device in FIG. 1, because the frequency is converted by the frequency converter 22, even in the case that the transmission frequency and the reception frequency are different, the signal output by the transmitter 13 can be input into the receiver 14 and calibrated.

The local signal of the receiver and the local signal of the transmitter can be used to generate a signal having a frequency (|f1−f2|) output by the signal generator 24. This means that the signal generator 24 can be realized for example by the circuit shown in FIG. 10 or the circuit shown in FIG. 11.

Figure 10:
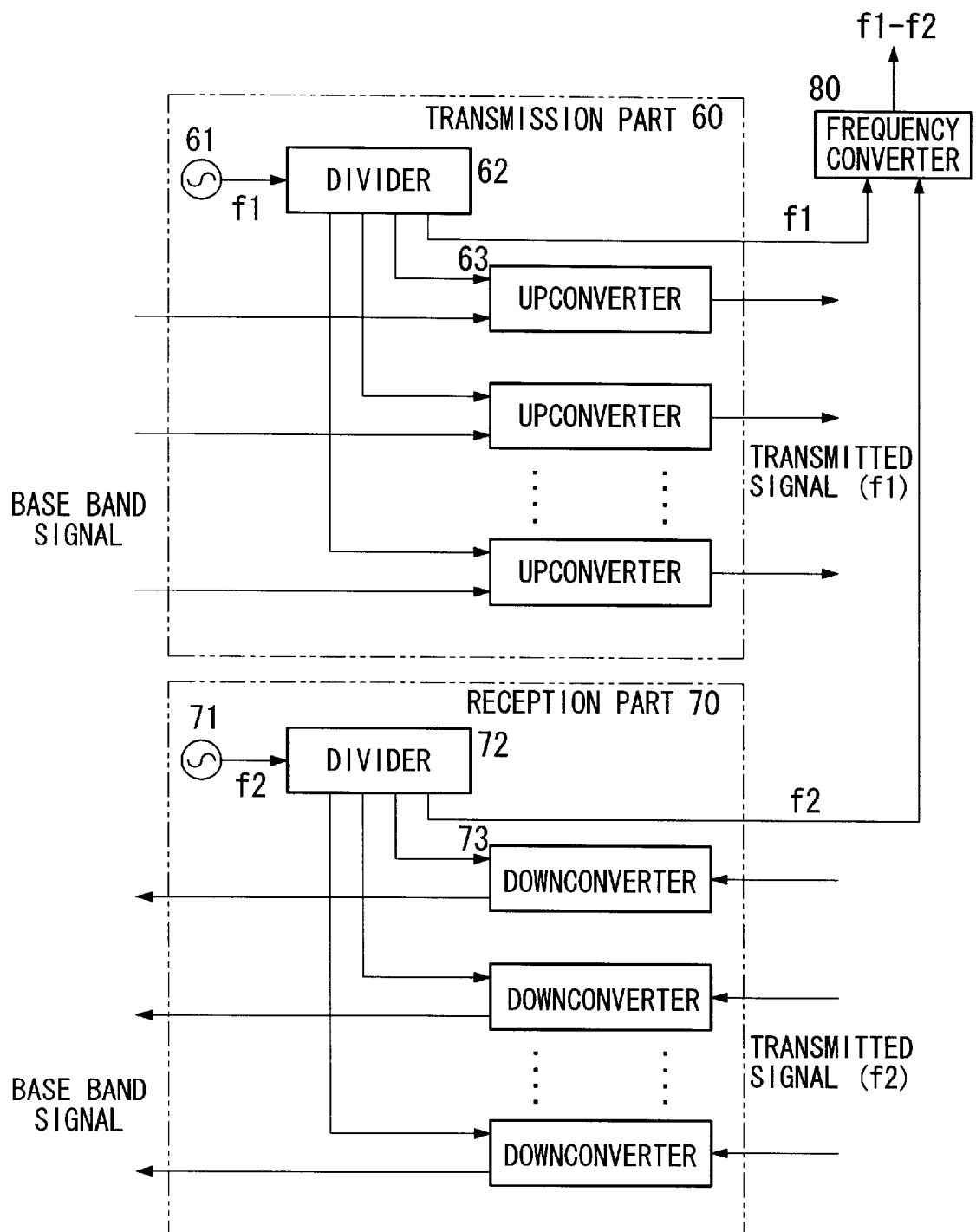
FIG. 10 is a block diagram showing an example of the generation circuit (1) of frequency (f1−f2).
Figure 11:
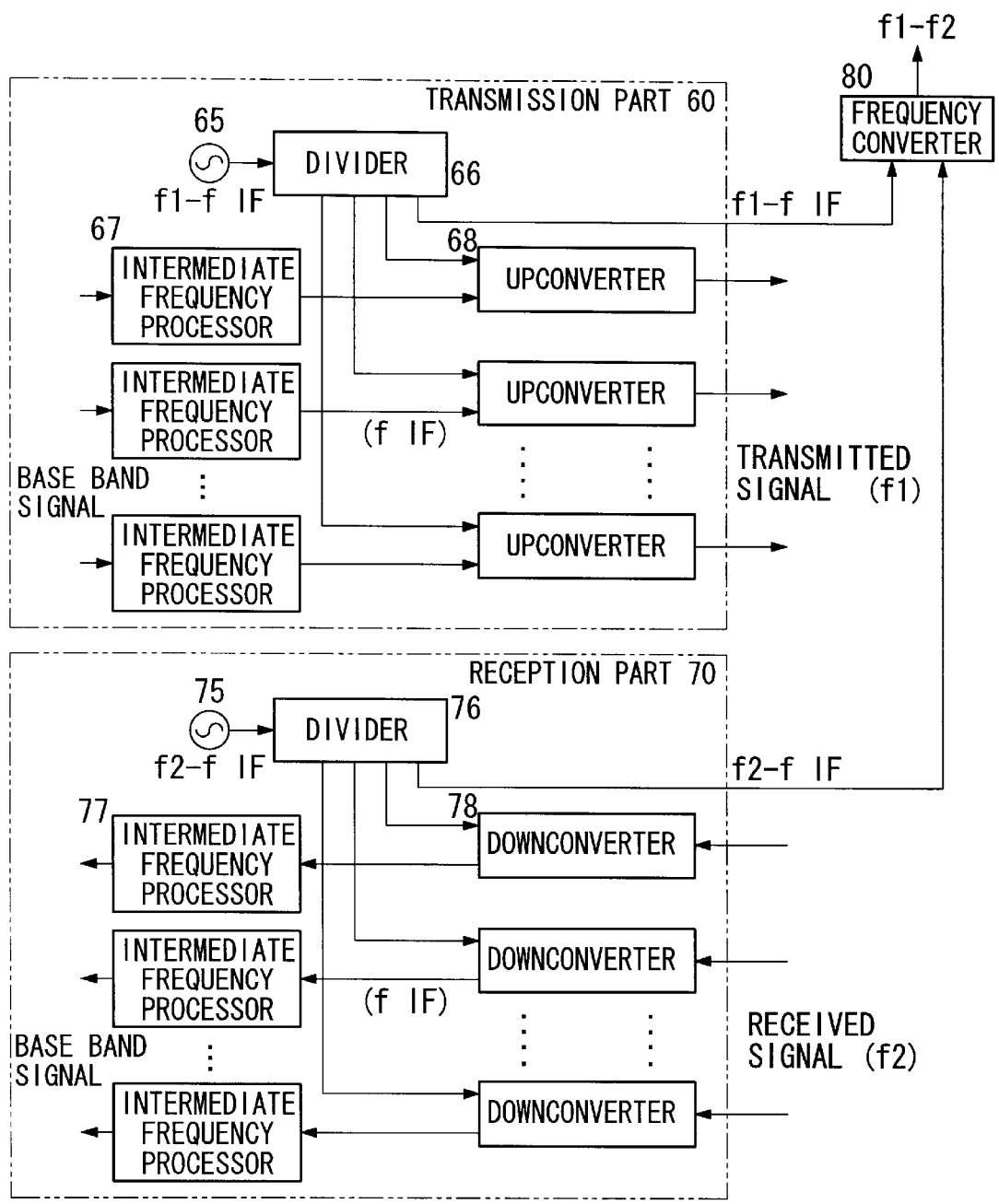
FIG. 11 is a block diagram showing an example of the generation circuit (2) of frequency (f1−f2).

FIG. 10 shows a circuit using a direct conversion method that directly converts the frequency of the baseband and the frequency of the communication frequency band, and FIG. 11 shows a circuit using a superheterodyne method that provides an intermediate frequency and carries out two-stage frequency conversion between the baseband and the transmission frequency band.

In the circuit in FIG. 10, the output signal of the oscillator 61 and the output signal of the oscillator 71 are mixed in the frequency converter 80, and thereby the frequency (|f1−f2|) of the difference therebetween is obtained because the frequency of the output signal of the oscillator 61 that the transmitting part 60 uses for frequency conversion is the same as the transmission frequency f1, and the frequency of the output signal of the oscillator 71 that the reception part 70 uses for frequency conversion is the same as the reception frequency f2.

In the circuit in FIG. 11, the case that the intermediate frequency is fIF is assumed. Therefore, the frequency of the signal output by the oscillator 65 of the transmitting part 60 is (f1−fIF), and the frequency of the signal output by the oscillator 75 of the reception part 70 is (f2−fIF). As shown in FIG. 11, by mixing the output signal of the oscillator 65 and the output signal of the oscillator 75 in the frequency converter 80, a frequency (f1−f2) of the difference therebetween is obtained.

In the case that the signal generator 24 is formed using the circuits shown in FIG. 10 and FIG. 11, a signal of (f1−f2) is generated using the local signals to be used for frequency conversion respectively in the transmitter 13 and the receiver 14, and thus the circuit structure can be simplified because providing a new oscillator is unnecessary. Furthermore, because a deviation between the frequency used in the signal generator 24 and the actual transmission frequency and reception frequency does not occur, the precision of the calibration can be improved.

Moreover, in the circuit in FIG. 1, the reason for extracting the signal via the coupler 15 from the output of the transmitter 13 is that the output of the transmitter 13 is large in comparison to the tolerated input level of the circuit on the receiving side. By using the coupler 15, a signal having a comparatively small level can be extracted from the output of the transmitter 13.

Next, the calibration control procedure shown in FIG. 2 will be explained. Moreover, the branch unit 10(1) has been assigned to serve as the reference branch, but the other branches can serve as the reference.

In step S 10, the output of the frequency converter 22 is connected to the switch 16(1) of the reference branch by controlling switch 23. Next, in step S 11, by controlling the switch 16(1) of the reference branch, the output of switch 23 is connected to the input of the receiver 14(1) of the reference branch.

In the next step S 12, the value of the counter i is initialized. In addition, the processing of steps S 13 to S 19 is repeatedly executed depending on the value of the counter i.

In step S 13, the switch 21 is switched so that the output of the coupler 15(i) corresponding to the value of the counter i is selected. In step S 14, the signal from the transmitter 13(i) of the branch corresponding to the value of the counter i is transmitted. Moreover, the signals from the transmitter 13(i) need only be transmitted during measurement.

In step S 15, the ith signal k(i) received by the receiver 14(1) of the reference branch is measured from the output signal of the receiver 14(1). This signal K(i) is the value that includes information about the amplitude and phase of the reception signal. The first time, because the value of the counter i is 1, the processing advances to step S 17 after passing through step S 15 and step S 16, the value of the counter i is incremented, and the processing returns to step S 13.

The second time and thereafter, because the value of the counter i is not 1, the processing advances to step S 18 after passing through steps S 15 and S 16. In step S 18, the calibration value H(i) of the ith branch is found by the following equation:

$$H(i)=K(i)/K(1) \quad (1)$$

In the case that the processing for all of the N branches has finished, the processing advances to step 17 after passing though steps S 18 and S 19, the value of the counter i is incremented, and the processing returns to step S 13.

Therefore, when the calibration control procedure in FIG. 2 is executed, the calibration values H(i) are found separately for the respective second to N branches.

Here, the signal K(i) is represented in the following equation:

$$K(i)=T(i) \cdot Q \cdot R(1) \quad (2)$$

where

T(i): amplitude and phase values produced at the transmitter 13(i),

Q: the fluctuating component of the amplitude and phase due to temperature characteristics, and R(1): the amplitude and phase produced by the receiver 14(1).

Therefore, by rearranging Equation 1, the following Equation can be obtained:

$$\begin{aligned}H(i) &= K(i)/K(1) \\ &= (T(i) \cdot Q \cdot R(1))/(T(1) \cdot Q \cdot R(1)) \\ &= T(i)/T(1)\end{aligned} \quad (3)$$

This means that the calibration value H(i) obtained by the calibration control procedure in FIG. 2 is a relative value of the amplitude and phase values of the transmitters 13(i) with respect to the reference branch. In addition, although the amplitude and phase values fluctuate due to the influence of the change, for example, in temperature characteristics, the Q component thereof is cancelled out in the above Equation 3, and thus the influence of temperature characteristics does not appear in the calibration value H(i).

Therefore, when transmitting at each transmitter 13(i), by multiplying the amplitude and phase value of each of the transmitters 13(i) by the calibration value H(i) obtained by the calibration control procedure in FIG. 2, the error in the amplitude and phase values between branches in the transmitter 13 can be compensated.

Next, the calibration control procedure in FIG. 3 will be explained. Moreover, in this example, the branch unit 10(1) is assigned to serve as the reference branch, but other branches can serve as the reference.

In step S 20, the output of the coupler 15(1) of the reference branch is selected by controlling the switch 21. In addition, in step S 21, the signal from the transmitter 13(1) of the reference branch is transmitted. Moreover, the transmitter 13(1) needs to transmit the signal only during measurement.

In step S 22, the value of the counter i is initialized. The processing of steps S 23 to S 29 is repeated depending of the value of the counter i.

In step S 23, switch 23 is controlled, and thereby the output of the frequency converter 22 is connected with the switch 16(i) of the branch depending on the value of the counter i. In step S 24, the switch 16(i) is controlled, and thereby the output of the frequency converter 22 and the input of the receiver 14(i) of the ith branch are connected.

In step S 25, the signal S(i) received by the receiver 14(i) of the ith branch is measured from the output signal of the receiver 14(i). This signal S(i) is the value that includes information about the amplitude and phase of the reception signal. The first time, because the value of the counter i is 1, the processing advances to step S 27 after passing through steps S 25 and S 26, the value of the counter i is incremented, and the processing returns to step S 23.

The second time and thereafter, because the value of the counter i is not 1, the processing advances to step S 28 after passing through steps S 25 and S 26. In step S 28, the calibration value P(i) of the ith branch is found by the following equation:

$$P(i)=S(i)/S(1) \quad (4)$$

In the case that the processing for all of the N branches has finished, the processing advances to step 27 after passing though steps S 28 and S29, the value of the counter i is incremented, and the processing returns to step S 23.

Therefore, when the calibration control procedure in FIG. 3 is executed, the calibration values S(i) are found separately for the respective second to second to Nth branches. In this example, because the first branch serves as the reference, naturally, the calibration value P(1) of the first branch is 1.

Here, the signal S(i) is represented in the following equation:

$$S(i)=T(1) \cdot Q \cdot R(i) \quad (5),$$

where

T(1): amplitude and phase values produced at the transmitter 13(i),

Q: the fluctuating component of the amplitude and phase due to temperature characteristics, and R(i): the amplitude and phase values produced by the receivers 14(i).

Therefore, by rearranging Equation 4, the following Equation can be obtained:

$$\begin{aligned}P(i) &= S(i)/S(1) \\ &= (T(1) \cdot Q \cdot R(i))/(T(1) \cdot Q \cdot R(1)) \\ &= R(i)/R(1)\end{aligned} \quad (6)$$

This means that the calibration value P(i) obtained by the calibration control procedure in FIG. 3 is a relative value of the amplitude and phase values of the receivers 14(i) with respect to the reference branch. In addition, although the amplitude and phase values fluctuate due to the influence of the change, for example, in temperature characteristics, the Q component thereof is cancelled out in the above Equation 6, and thus the influence of temperature characteristics does not appear in the calibration value P(i).

Therefore, when receiving at each of the branches, by multiplying the amplitude and phase value of each of the receivers 14(i) by the calibration value P(i) obtained by the calibration control procedure in FIG. 3, the error in the amplitude and phase values between branches in the receiver 14 can be compensated.

The fluctuation component Q of the amplitude and phase values that is due to the temperature characteristics in Equation 2 and Equation 5 in practice includes for each of the branches a fluctuation component for the transmitter 13, the fluctuation component for the receiver 14, and the fluctuation component for the frequency converter 22 to be used in calibration. Therefore, the characteristics of the frequency converter 22 fluctuate with respect to temperature changes that accompany the passage of time, but because the frequency converter 22 is used in common when measuring any of the amplitude and phase values in the calibration processing, the fluctuation component Q of the amplitude and phase values of the single frequency converter 22 do not influence the calibration values that are found.

Second Embodiment

A second embodiment of the adaptive array antenna transceiver apparatus of the present invention will be explained referring to FIG. 4 to FIG. 6.

Figure 4:
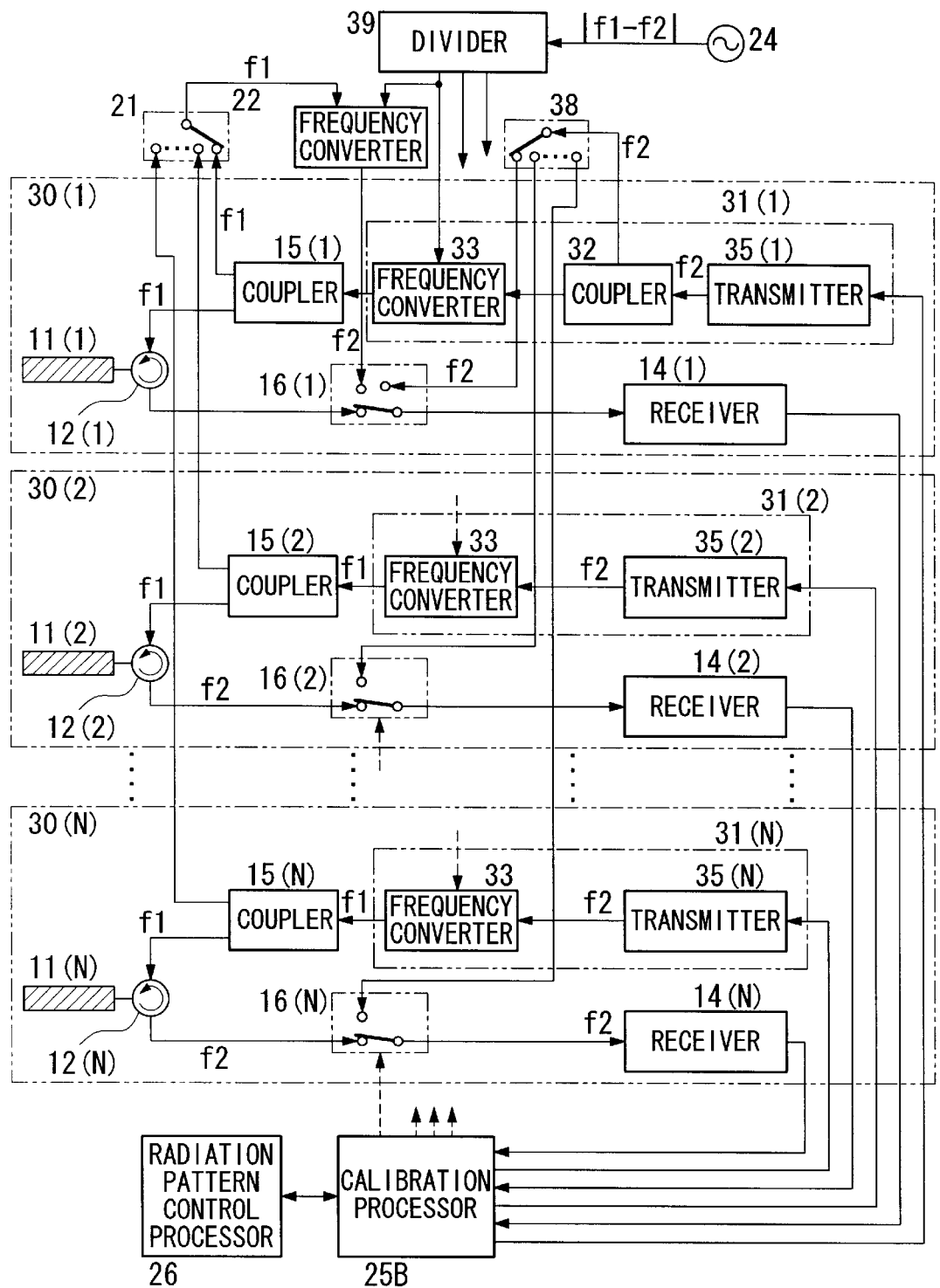
FIG. 4 is a block diagram showing the structure of the adaptive array antenna transceiver apparatus according to the second embodiment.

FIG. 4 is a block diagram showing the structure of the adaptive array antenna transceiver apparatus of the present invention. FIG. 5 is a flowchart showing the calibration control procedure of the transmitter of this embodiment. FIG. 6 is a flowchart showing the calibration control procedure of the receiver of this embodiment.

Figure 5:
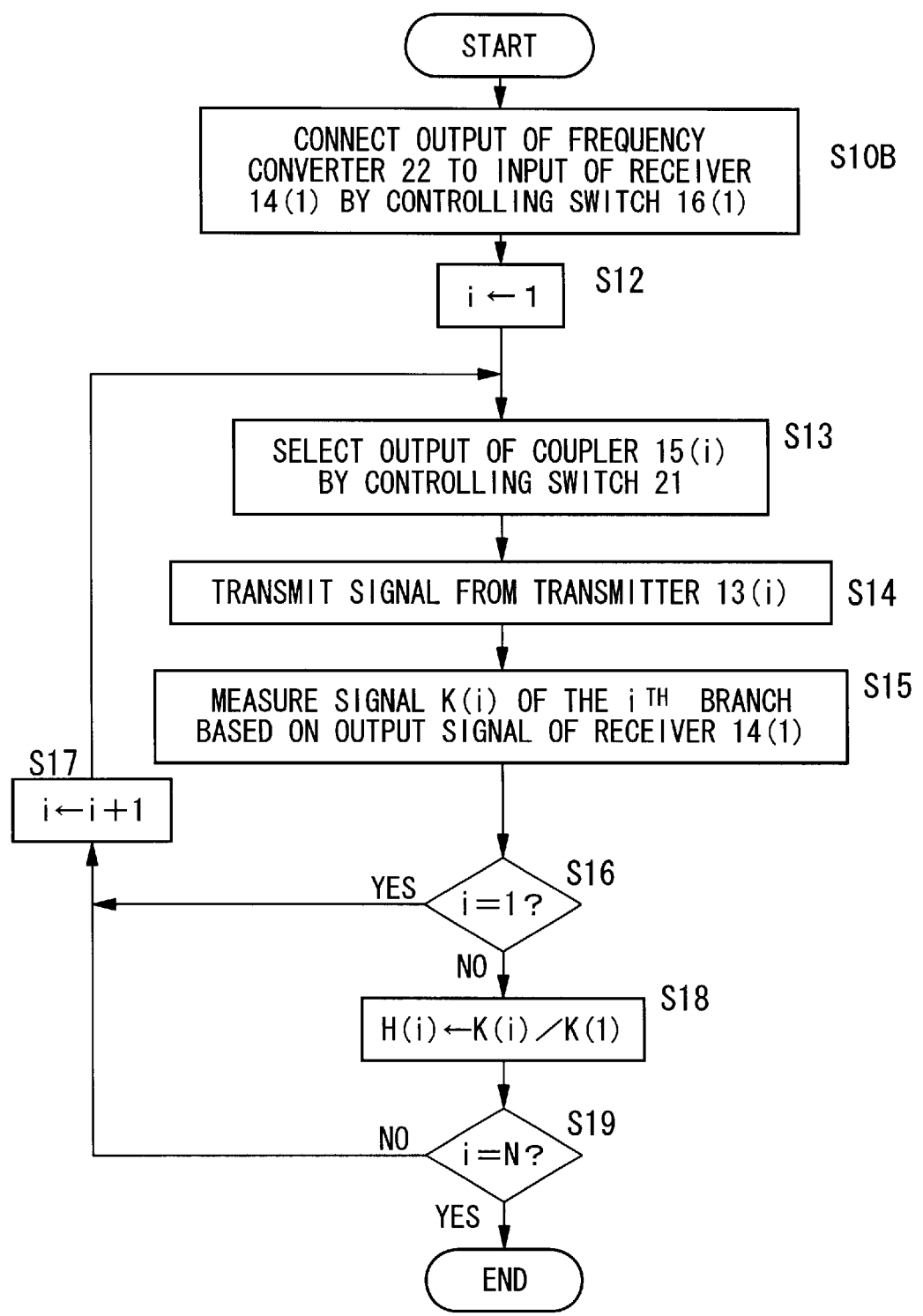
FIG. 5 is a processing chart showing the calibration control processing of the receiver according to the second embodiment.
Figure 6:
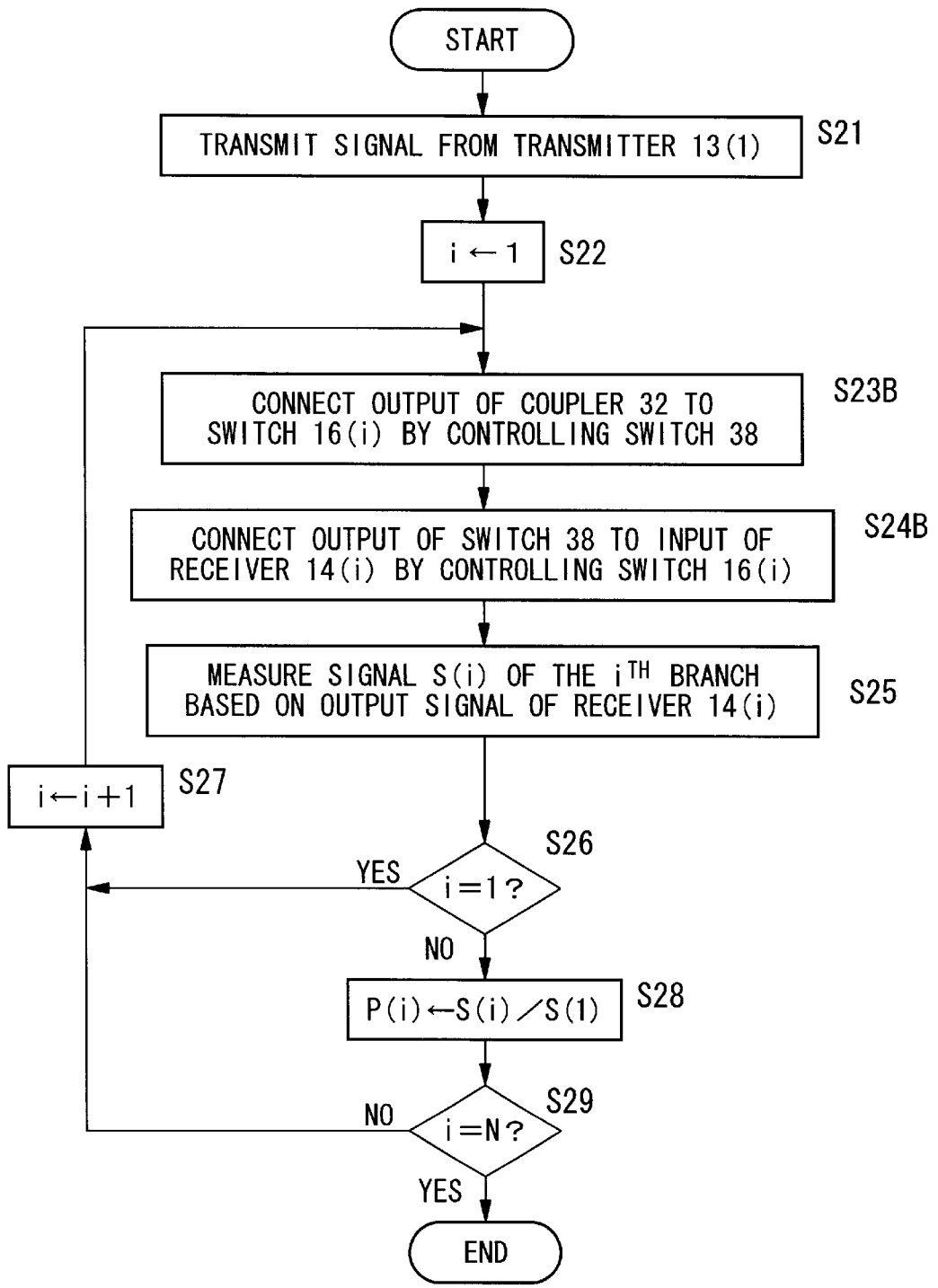
FIG. 6 is a processing chart showing the calibration control processing of the receiver according to the second embodiment.

This embodiment is a modification of the first embodiment, and the elements and processing in FIG. 4 to FIG. 6 corresponding to those of the first embodiment are shown with the identical reference numerals and step numbers.

The adaptive array antenna transceiver apparatus comprises a circulator 12 that is an example of a transmitter/receiver common-use device, a radiation pattern control processor 26 corresponding to a radiation pattern control calculation circuit, a coupler 15 and a coupler 32 that are an example of a branching device, and a calibration processor 25B that corresponds to a calibration control circuit.

Like FIG. 1, in FIG. 4, the array antenna is structured by N antenna elements 11 (where N is an arbitrary integer) disposed side by side. In this embodiment, the segments of the branch of the array antenna on which the antenna elements are disposed are represented by numerical values in parenthesis added to the reference numeral of each element. In addition, each arrow in FIG. 4 represents the direction of the signal. In the case that there is no need to segment the branches of each element, the parenthesis and the presentation of the numerical value in the parenthesis are omitted.

In the example of FIG. 4, for each of the antenna elements, a branch unit 10 including that element is formed. Each branch unit 30 is formed by an antenna element 11, circulator 12, a transmitting part 31, a receiver 14, a coupler 15, and a switch 16.

The transmitting part 31 provides a transmitter 35, a coupler 32, and a frequency converter 33. In this example, the frequency of the signal output by the transmitter 35 is f2, and is identical to the reception frequency of the receiver 14. However, the frequency converter 33 connected to the output of the transmitter 35 converts the frequency of the signal output by the transmitter 35 to f1 and applies this to the circulator 12. Therefore, the transmission frequency f1, and this differs from the reception frequency of the receiver 14. Moreover, in this example (f1>f2).

The circulator 12 is provided so that transmitters and receivers can use an antenna element 11 in common. The coupler 15 is provided in order to split and extract the transmission signal having a frequency of f1 1 that was frequency converted by the frequency converter 33. In addition, the coupler 32 is provided for splitting and directly extracting the transmission signal having a frequency f2 output by the transmitter 35 in the transmitting part 31.

In the adaptive array antenna transceiver apparatus of FIG. 4, in addition to the N branching units 30, the frequency converter 22, the signal generator 24, the switch 38, the divider 39, and calibration processor 25B, and the direction control processor 26 are provided.

The signal having a frequency of (|f1−f2|) output by the frequency converter 22 is distributed by the divider 39, and applied to the frequency converter 22 and to the frequency converter 33 of each of the branches.

The switch 21 selects the signal (having frequency f1) from one of the couplers 15 of the N branches and applies this to the frequency converter 22. The switch 38 applies the signal (having frequency f2) extracted by the coupler 32 from the transmitting part 31(1) of the first branch to one switch selected from among the N branches.

The switch 16(1) selects one of the reception signal from the circulator 12(1), the signal from the frequency converter 22, or the signal from switch 38 and applies this to the input of the receiver 14(1). In addition, the switches 16(2) to 16(N), other than that of the reference branch, select one of the reception signal from the circulator 12 and the signal from the switch 38, and apply this to the receiver 14.

The calibration processor in FIG. 4 executes respectively the calibration control procedure for the transmitter shown in FIG. 5 and the calibration control processing for the receiver shown in FIG. 6.

The contents of the calibration control procedure for the transmitter shown in FIG. 5 is almost identical to that in FIG. 2, which has been explained already. The only difference is step S 10B in FIG. 5. In step S 10B in FIG. 5, by controlling the switch 16(1) of the reference branch, the output of the frequency converter 22 is input into the receiver 14(1).

Therefore, the signal transmitted from the transmitter 31 of each of the branches can be received at the receiver 14(1) of the reference branch. In the case that calibration of the transmitter 31 is carried out, the amplitude and phase values that include the characteristics of the frequency converter 33 included in the transmitting part 31 must be measured.

Thus, the transmission signal having the frequency f1 is extracted by the coupler 15(1), input into the frequency converter 22 via the switch 21, and applied to the input of the receiver 14(1) via the switch 16(1) after being converted to frequency f2. Because the reception frequency of the receiver 14 is f2, the signal output by the frequency converter 22 can be measured by the receiver 14.

The signal K(i) that is measured at step S 15 is represented in the following equation:

$$K(i)=T(i) \cdot Q \cdot R(1) \quad (7),$$

where

T(i): amplitude and phase values produced at the 31(i),

Q: the fluctuating component of the amplitude and phase due to temperature characteristics of the frequency converter 22, and R(1): the amplitude and phase produced by the receiver 14(1).

Therefore, the calibration value H(i) of the ith branch found in step S 18 of FIG. 5 is represented as follows:

$$H(i) = K(i)/K(1) \qquad (8)$$
$$= (T(i) \cdot Q \cdot R(1))/(T(1) \cdot Q \cdot R(1))$$
$$= T(i)/T(1)$$

This means that the calibration value H(i) obtained by the calibration control procedure in FIG. 5 is a relative value of the amplitude and phase values of the transmitter 31(i) with respect to the reference branch. In addition, although the amplitude and phase values fluctuate due to the influence of this change, for example, in temperature characteristics, the Q component thereof is cancelled out in the above Equation 8, and thus the influence of temperature characteristics does not appear in the calibration value H(i).

Therefore, when transmitting at each of the branches, by multiplying the amplitude and phase values of each of the transmitters 131(i) by the calibration value H(i) obtained by the calibration control procedure in FIG. 5, the error in the amplitude and phase values between branches in the transmitting part 31 can be compensated.

The contents of the calibration control procedure for the receiver shown in FIG. 6 is almost identical to that in FIG. 3, which has already been explained. Step S 20 is unnecessary and has been omitted. In addition, in step S 23B of FIG. 6, by controlling the switch 38, the output of the coupler 32 provided in the transmitting part 31(1) of the reference branch is connected to the switch 16(i) of the ith branch.

In addition, in step S 24B of FIG. 6, by controlling the switch 16(i) of the ith branch, the output of the switch 38 and the input of the receiver 14(i) of the ith branch are connected.

Therefore, the signal transmitted from the transmitter 35(1) of the reference branch can be input into the receiver 14(i) of each of the branches. The frequency f2 of the output signal of the transmitter 35 is identical to the reception frequency f2 of the receiver 14, and thus each of the receivers 14(i) can receive as-is the signal input from the switch 16.

In the case of carrying out the calibration of the receiver 14, the characteristics of the frequency converter 33 included in the transmitting part 31 must be considered, and thus the signal before frequency conversion by the frequency converter 33 is extracted and directly input into the receiver 14.

$$S(i)=T(1) \cdot R(i) \qquad (9),$$

where
T(1) is amplitude and phase values produced at transmitter 35(1), and
R(i) is the amplitude and phase produced by the receiver 14(i).

Therefore, the calibration value P(i) of the ith branch found in step S 28 of FIG. 6 is represented as follows:

$$P(i) = S(i)/S(1) \qquad (10)$$
$$= (T(1) \cdot R(i))/(T(1) \cdot R(1))$$
$$= R(i)/R(1)$$

This means that the calibration values P(i) obtained by the calibration control procedure in FIG. 6 is a relative value of the amplitude and phase values of the receiver 14(i) with respect to the reference branch. Therefore, when receiving at each of the branches, by multiplying the amplitude and phase values of each of the receivers 14(i) by the calibration values P(i) obtained by the calibration control procedure in FIG. 3, the error in the amplitude and phase values between each of the branches in the receiver 14 can be compensated.

The fluctuation component of the amplitude and phase values due to the temperature characteristics in the above Equation 8 in practice include the fluctuation component in the transmitting part 31 of each of the branches, the fluctuation component in the receiver 14, and the fluctuation component in the frequency converter 22 to be used in calibration. Therefore, the characteristics of the frequency converter 22 change with respect to the temperature changes that accompany the passage of time, but because the frequency converter 22 is used on common when measuring the amplitude and phase values of any of the branches during calibration processing, the fluctuation component Q of the amplitude and phase values of the single frequency converter 22 do not influence the calibration values.

Third Embodiment

A third embodiment of the adaptive array antenna transceiver apparatus of the present invention will be explained referring to FIG. 7 to FIG. 9.

Figure 7:
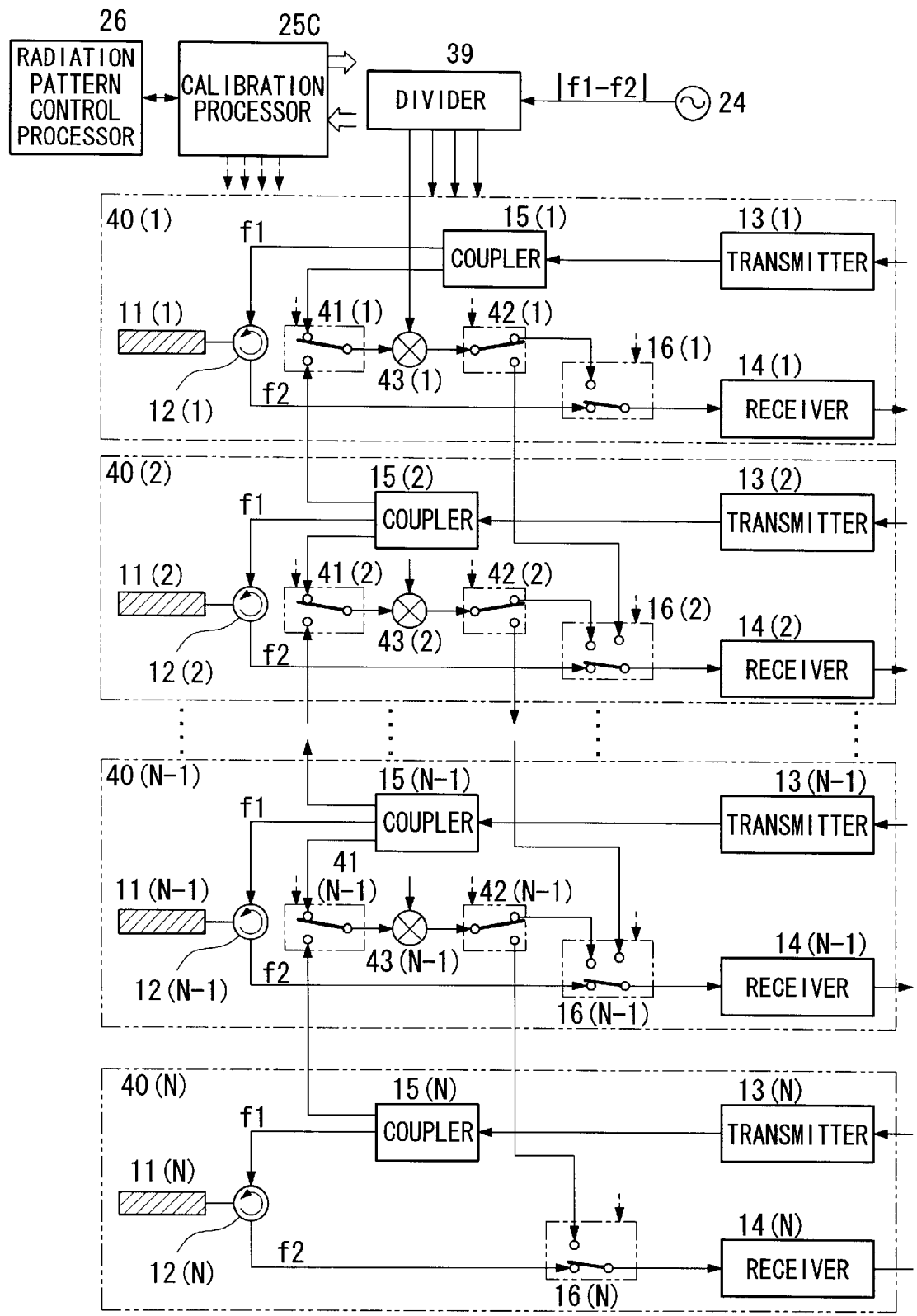
FIG. 7 is a block diagram showing the structure of the adaptive array antenna transceiver apparatus according to the third embodiment.

FIG. 7 is a block diagram showing the structure of the adaptive array antenna transceiver apparatus of the present invention. FIG. 8 is a flowchart showing the calibration control procedure of the transmitter of this embodiment. FIG. 9 is a flowchart showing the calibration control procedure of the receiver of this embodiment.

Figure 8:
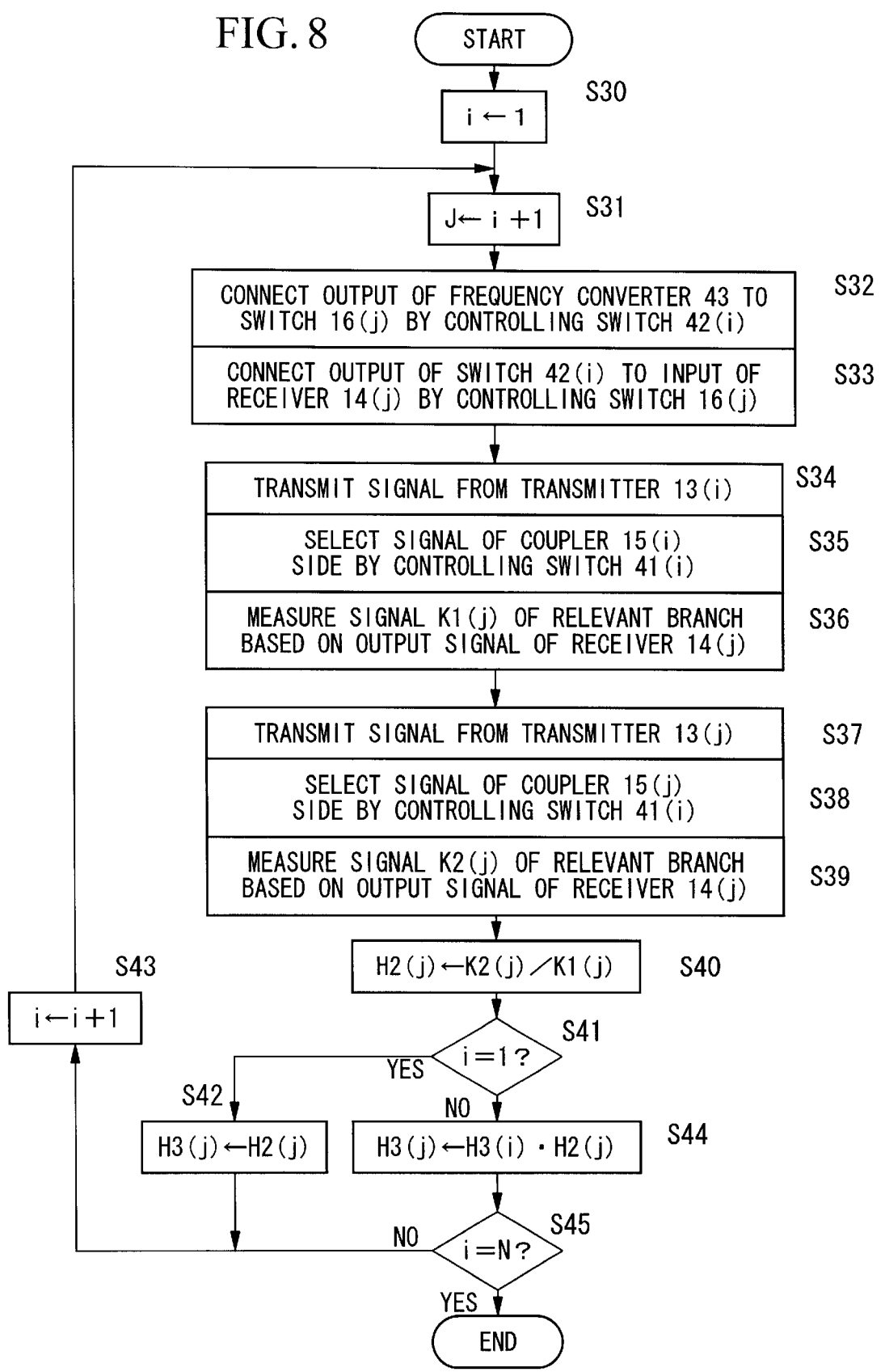
FIG. 8 is a processing chart showing the calibration control processing of the receiver according to the third embodiment.
Figure 9:
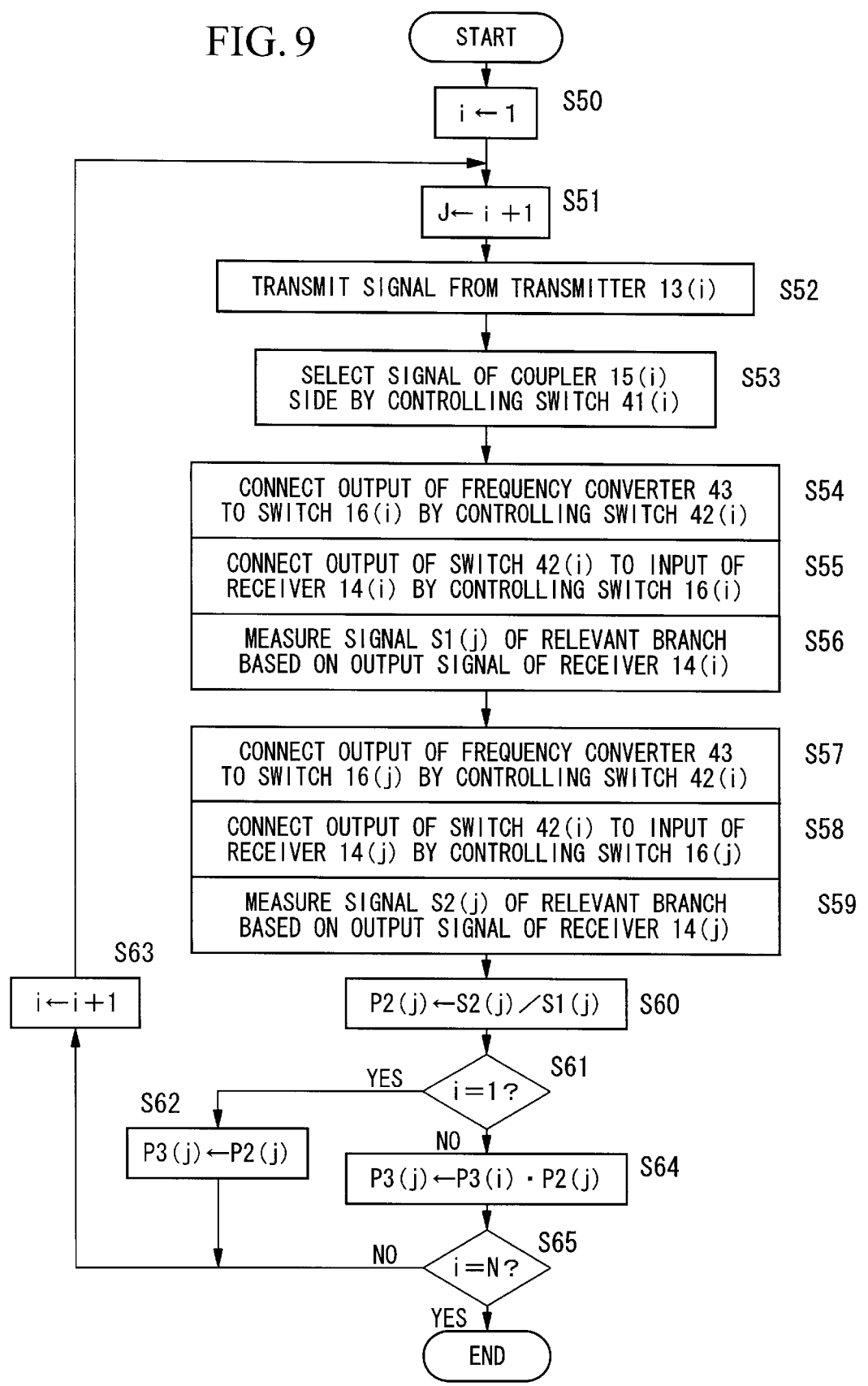
FIG. 9 is a processing chart showing the calibration control processing of the receiver according to the third embodiment.

This embodiment is a modification of the first embodiment, and the elements and processing in FIG. 7 to FIG. 9 corresponding to those of the first embodiment are shown with the identical reference numerals and step numbers.

The adaptive array antenna transceiver apparatus comprises a circulator 12 that is an example of a transmitter/receiver common-use device, a radiation pattern control processor 26 corresponding to a radiation pattern control calculation circuit, a signal generator 24 that corresponds to the local signal generator, a coupler 15 that is an example of a branching device, and a calibration processor 25C that corresponds to a calibration control circuit.

Like FIG. 7, the array antenna is structured by N antenna elements 11 (where N is an arbitrary integer) disposed side by side. In this embodiment, the segments of the branch of the array antenna on which the antenna elements are disposed are represented by numerical values in parenthesis added to the reference numeral of each element. In addition, each arrow in FIG. 7 represents the direction of the signal. In the case that there is no need to segment the branches of each of the antenna elements, the parenthesis and the presentation of the numerical value in the parenthesis are omitted.

In the example of FIG. 7, for each of the antenna elements 11, a branch unit 40 including that element is formed. Each branch unit 40 is formed by an antenna element 11, circulator 12, a transmitter 13, a receiver 14, a coupler 15, switches 16, 41, 42, and a frequency converter 43

However, the switches 41 and 42, and the frequency converter 43 for the Nth branch unit 40(N) are unnecessary and therefore omitted.

The circulator 12 is provided so that transmitters and receivers can use an antenna element 11 in common. The coupler 15 is provided in order to split and extract a part of the signal output by the transmitter 13.

In the case that transmission is being carried out, the signals transmitted from each of the transmitters 13 through the coupler 15 and the circulator 12 and is radiated as a wireless signal from the antenna element 11. In the case that reception is being carried out, the signal received at the antenna element 11 passes through the circulator 12 and the switch 16, and is input into the receiver 14.

In this example, the frequency of the signal output by the transmitter 13, that is, the transmission frequency, is f1, the reception frequency at the receiver 14 is f2, and thus the transmission frequency f1 and the reception frequency f2 are different.

In the adaptive array antenna transceiver apparatus in FIG. 7, in addition to the N branch units 40, a signal generator 24, a divider 39, a calibration processor 25C, and a radiation pattern control processor 26 are provided.

The radiation pattern control processor 26 combines the signals of the N branches in order to carry out adaptive control of the radiation pattern of the array antenna, and at the same time to control the weighting of each of the branches during synthesis.

The calibration processor 25C carries out calibration by finding separately the amplitude and phase errors of the transmitter 13 and the receiver 14 of each of the branch units 40. In practice, the calibration processor 25C finds the value to be used in calibration of each of the transmitters 13 by implementing the control shown in FIG. 8, and finds the value to be used in calibration of each of the receivers 14 by implementing the control shown in FIG. 9.

The switches 16, 41, and 42 are each formed so as to be electrically controllable, and in this example, the connection condition of each is switched by the control of the calibration processor 25C.

The switch 41(*i*) of the ith branch selects one of either the signal from the coupler 15(*i*) of the relevant branch or the signal from the coupler 15 (i+1) of the adjacent branch, and inputs this into the frequency converter 43.

The frequency converter 43 of each of the branches uses the signal (having a frequency f1−f2) from the respective dividers 39, and converts the frequency of the signal (having a frequency of f1) output by the switch 41 to f2.

The switch 42 of the ith branch selectively outputs the signal (having frequency f2) output by the frequency converter 43(*i*) of the relevant branch to either one of the switch 16(*i*) of the relevant branch or the switch 16(i+1) of the adjacent branch.

In this example, the first branch is assigned to serve as the reference branch. The switch 16(1) of the reference branch selects either one of the signal output by the switch 24 of the relevant branch or the reception signal from the circulator 12, and applies this to the input of the receiver 14.

The switches 16(*j*) of the second to (N−1) branch respectively select any one of the signal from the switch 42(j−1) of the adjacent branch, the signal from the switch 42(*j*) of the relevant branch, or the signal from the circulator 12.

The switch 16(N) of the Nth branch selects either one of the signal from switch 42(N−1) of the adjacent branch or the signal from the circulator 12, and applies this to the inputs of the receiver 14.

The signal generator 24 outputs a signal having a frequency (|f1−f2|) corresponding to the difference between the transmission frequency f1 and the reception frequency f2. This signal is distributed by the divider 39 and applied to the circuit. The frequency transmitter 43 of each of the branches converts the frequency of the signal output from the transmitter 13 from f1 to f2 using the signal (|f1−f2|) from the signal generator 24.

Because the reception frequency of the receiver 14 is f2, if the signals output by each of the frequency converters 43 are input into the receiver 14, amplitude and phase of the signal output by the transmitter 13 can be measured.

Moreover, in the example in FIG. 7, the respective combination of two branches determined by being matched with the antenna elements in the order of their arrangement is formed so that the switches 41 and 42 select the path of the signal. However, the combination of two branches selected by the switches 41 and 42 can be determined arbitrarily, without the antenna element 11 having to be identical to the two branches that are actually adjacent.

Next, the calibration control procedure shown in FIG. 8 will be explained. Moreover, in this example, the branch unit 40(1) has been assigned to serve as the reference branch, but other branches can serve as the reference branch.

In step S 30, the value of the counter i is initialized. In step S 31, the value of counter j is assigned the value of the counter i incremented by 1. The processing of steps S 31 to S 45 is repeatedly executed depending on the values of the counters i and j.

The value of the counter i represents the object branch, and the value of the counter j represents the branch adjacent to the object branch.

In step S 32, by controlling the switch 42(*i*) of the object branch, the output of the frequency converter 43 is connected to the switch 16(*j*) of the adjacent branch. In addition, in step S 33, by controlling the switch 16(*j*) of the adjacent branch, the output of the switch 42(*i*) of the object branch is connected to the input of the receiver 14(*j*) of the adjacent branch.

In step S 34, the signal from the transmitter 13(*i*) of the object branch, which corresponds to the value of the counter i, is transmitted. Moreover, the signal from the transmitter 13(*i*) needs to be transmitted only during measurement.

In step S 35, by controlling the switch 41(*i*) of the object branch, which corresponds to the value of the counter i, the output of the coupler 15(*i*) is selected. In step S 36, the jth signal K1(j) received by the receiver 14(*j*) of the adjacent branch is measured from the output signal of the receiver 14(*j*). This signal K1(j) is the value that includes information about the amplitude and phase of the reception signal.

In step S 37, the signal from the transmitter 13(*i*) of the adjacent branch corresponding to the value j of the counter is transmitted. Moreover, transmission of the signal from the transmitter 13(*j*) needs to be transmitted only during measurement.

In step S 38, by controlling the switch 41(*i*) of the object branch, which corresponds to the value of the counter i, the output of the coupler 15(*j*) of the adjacent branch is selected. In step S 39, the jth signal K2(j) received by the receiver 14(*j*) of the adjacent branch is measured from the output signal of the receiver 14(*j*). The signal K2(j) is the value that includes information about the amplitude and phase of the reception signal.

In the next step S 40, the calibration value H2(j) of the jth branch is found by the following equation:

$$H2(j)=K2(j)/K1(j) \tag{11}$$

Because the value of the counter i is 1, the processing passes through steps 41 and 42 to advance to step S 43, the value of the counter i is incremented, and the processing returns to step S 31. The second time and thereafter, because the value of the counter i is not 1, the processing passes through steps 41 to S 44, and advances to step 45.

In step S 42, the calibration value H2(j) is stored as calibration value H3(j). In addition, in step S 44, the ith calibration value H3(i) found for the previous branch is multiplied by the jth calibration value H2(j) found for the relevant branch (the object branch and the adjacent branch), and the result is stored as the calibration value H3(j).

Therefore, when executing the procedure in FIG. 8, the jth calibration value H3(j) for each of the branches can be obtained (j=2 to N).

The signal K1(j) obtained in step S 36 and the signal K2(j) obtained in step S 39 are respectively represented by the following formulae:

$$K1(j) = T(i) \cdot Q(i) \cdot R(j) \qquad (12)$$

$$K2(j) = T(j) \cdot Q(i) \cdot R(j) \qquad (13)$$

where

T(i), T(j): amplitude and phase values produced at the 31(i) and the transmitter 13(j), Q(i): the fluctuating component of the amplitude and phase due to temperature characteristics of the frequency converter 43(i), and R(j): the amplitude and phase produced by the receiver 14(j).

Therefore, by rearranging Equation 11, the following equation is obtained:

$$\begin{aligned} H2(j) &= K2(j)/K1(j) \qquad (14) \\ &= (T(j) \cdot Q(i) \cdot R(j))/(T(i) \cdot Q(i) \cdot R(j)) \\ &= T(j)/T(i) \end{aligned}$$

The calibration value H3(j) of steps S 42 and S 44 will be explained. In the case that j=2, for example, from Equation 14, the calibration value H2(2)=H3(2). In the case that j>2, the calibration value H3(3) is represented by the following equation:

$$\begin{aligned} H3(3) &= H3(2) \cdot H2(3) \qquad (15) \\ &= H2(2) \cdot H2(3) \\ &= ((T(2)/T(1)) \cdot (T(3)/T(2)) \\ &= T(3)/T(1) \end{aligned}$$

Therefore, the calibration value H3(4) is represented by the following equation:

$$\begin{aligned} H3(4) &= H3(3) \cdot H2(4) \qquad (16) \\ &= (T(3)/T(1)) \cdot H2(4) \\ &= (T(3)/T(1)) \cdot (T(4)/T(3)) \\ &= (T(4)/T(1)) \end{aligned}$$

By the same calculation as above, the calibration value H3(j) is represented in the following equation:

$$\begin{aligned} H3(j) &= H3(i) \cdot H2(j) \qquad (17) \\ &= T(j)/T(1) \end{aligned}$$

This means that the calibration value H3(j) obtained by the calibration control procedure shown in FIG. 8 is a relative value of the amplitude and phase values of the transmitter 13(j) with respect to the reference branch. In addition, the measured amplitude and phase values fluctuate due to the influence of temperature characteristics, etc., with the passage of time, but the Q component thereof is cancelled in the above Equation 14, and thus the influence of the temperature characteristics does not appear in the calibration value H3(j).

Therefore, when transmitting by each of the branches, the amplitude and phase values of each of the transmitters 13(j) are multiplied by the calibration values H3(j) obtained by the calibration control procedure in FIG. 8, and thereby the error in amplitude and phase in the transmitter 13 between the branches can be compensated.

Next, the calibration control procedure shown in FIG. 9 will be explained. Moreover, the branch unit 40(1) has been assigned to serve as the reference branch, but other braches can serve as the reference branch.

In step S 50, the value of the counter i is initialized. In step S 51, the value of counter j is assigned the value of the counter i incremented by 1. The processing of steps S51 to S 65 is repeatedly executed depending on the values of the counters i and j. Moreover, the value of the counter i represents the object branch, and the value of the counter j represents the branch adjacent to the object branch.

In step S 52, the signal from the transmitter 13 (i) of the object branch, which corresponds to the value of the counter i, is transmitted. Moreover, the signal from the transmitter 13(i) needs to be transmitted only during measurement. In step S 53, by controlling the switch 41(i) of the object branch, which corresponds to the value of the counter i, the output of the coupler 15(i) is selected.

In step S 54, by controlling the switch 42(i) of the object branch, the output of the frequency converter 43 and the switch 16(i) of the object branch. In addition, is step S 55, by controlling the switch 15(i) of the object branch, the output of the switch 42(i) of the object branch is connected to the output of the receiver 14(j) of the object branch.

In step S 56, the jth signal S1(j) received by the receiver 14(j) of the object branch is measured from the output signal of the receiver 14(j). This signal S1(j) is the value that includes information about the amplitude and phase of the reception signal.

In step S 57, by controlling the switch 42(i) of the object branch, the output of the frequency converter 43 and the switch 16(j) of the adjacent branch are connected. In addition, in step S 58, by controlling the switch 16(j) of the adjacent branch, the output of the switch 43(i) of the object branch is connected to the input of the receiver 14(j) of the adjacent branch.

In step S 59, the jth signal S2(j) received by the receiver 14(j) of the adjacent branch is measured from the output signal of the receiver 14(j). This signal S2(j) is the value that includes information about the amplitude and phase of the reception signal.

In the next step S 60, the calibration value P2(j) of the jth branch is found by the following equation:

$$P2(j) = S2(j)/S1(j) \qquad (18)$$

Because the value of the counter i is 1, the processing passes through steps 61 and 62 to advance to step S 63, the value of the counter i is incremented, and the processing returns to step S 51. The second time and hereafter, because the value of the counter i is not 1, the processing passes through steps 61 to S 64, and advances to step 65.

In step S 62, the calibration value P2(j) is stored as calibration value P3(j). In addition, in step S 64, the ith calibration value P3(i) found for the previous branch is multiplied by the jth calibration value P2(j) found for the relevant branch (the object branch and the adjacent branch), and the result is stored as the calibration value P3(j).

Therefore, when executing the procedure in FIG. 9, the jth calibration value P3(j) for each of the branches is obtained j=2 to N).

The signal KS(j) obtained in step S 56 and the signal S2(j) obtained in step S 59 are respectively represented by the following formulae:

$$S1(j) = T(i) \cdot Q(i) \cdot R(i) \quad (19)$$

$$S2(j) = T(i) \cdot Q(i) \cdot R(j) \quad (20)$$

where

T(i): amplitude and phase values produced at the 31(i),

Q(i): the fluctuating component of the amplitude and phase due to temperature characteristics of the frequency converter 43(i), and R(i), R(j): the amplitude and phase produced by the receiver 14(j) and the receiver 14(j).

Therefore, by rearranging Equation 18, the following equation is obtained:

$$P2(j) = S2(j)/S1(j) \quad (14)$$
$$= (T(i) \cdot Q(i) \cdot R(j))/(T(i) \cdot Q(i) \cdot R(i))$$
$$= R(j)/R(i)$$

The calibration value P3(j) of steps S 62 and S 64 will be explained. In the case that j=2, for example, from Equation 21, the calibration value P2(2)=P3(2). The calibration value P3(3) is represented by the following equation:

$$P3(3) = P3(2) \cdot P2(3) \quad (22)$$
$$= P2(2) \cdot P2(3)$$
$$= ((R(2)/R(1)) \cdot (R(3)/R(2)))$$
$$= R(3)/R(1)$$

Therefore, the calibration value P3(4) is represented by the following equation:

$$P3(4) = P3(3) \cdot P2(4) \quad (23)$$
$$= (R(3)/R(1)) \cdot P2(4)$$
$$= (R(3)/R(1)) \cdot (R(4)/R(3))$$
$$= (R(4)/R(1))$$

By the same calculation as above, the calibration value P3(j) is represented in the following equation:

$$P3(j) = P3(i) \cdot P2(j) \quad (24)$$
$$= R(j)/R(1)$$

This means that the calibration value P3(j) obtained by the calibration control procedure shown in FIG. 9 is a relative value of the amplitude and phase values of the receiver 14(j) with respect to the reference branch. In addition, the measured amplitude and phase values fluctuate due to the influence of temperature characteristics, etc., with the passage of time, but the Q component thereof is cancelled in the above Equation 21, and thus the influence of the temperature characteristics does not appear in the calibration value P3(j).

Therefore, when transmitting by each of the branches, the amplitude and phase values of each of the transmitters 14(j) are multiplied by the calibration values P3(j) obtained by the calibration control procedure in FIG. 9, and thereby the error in amplitude and phase in the receiver 14 between the branches can be compensated.

Fourth Embodiment

The fourth embodiment of the adaptive array antenna transceiver apparatus of the present invention will be explained referring to FIG. 12 to FIG. 16, and FIG. 10, FIG. 11, and FIG. 18.

Figure 12:
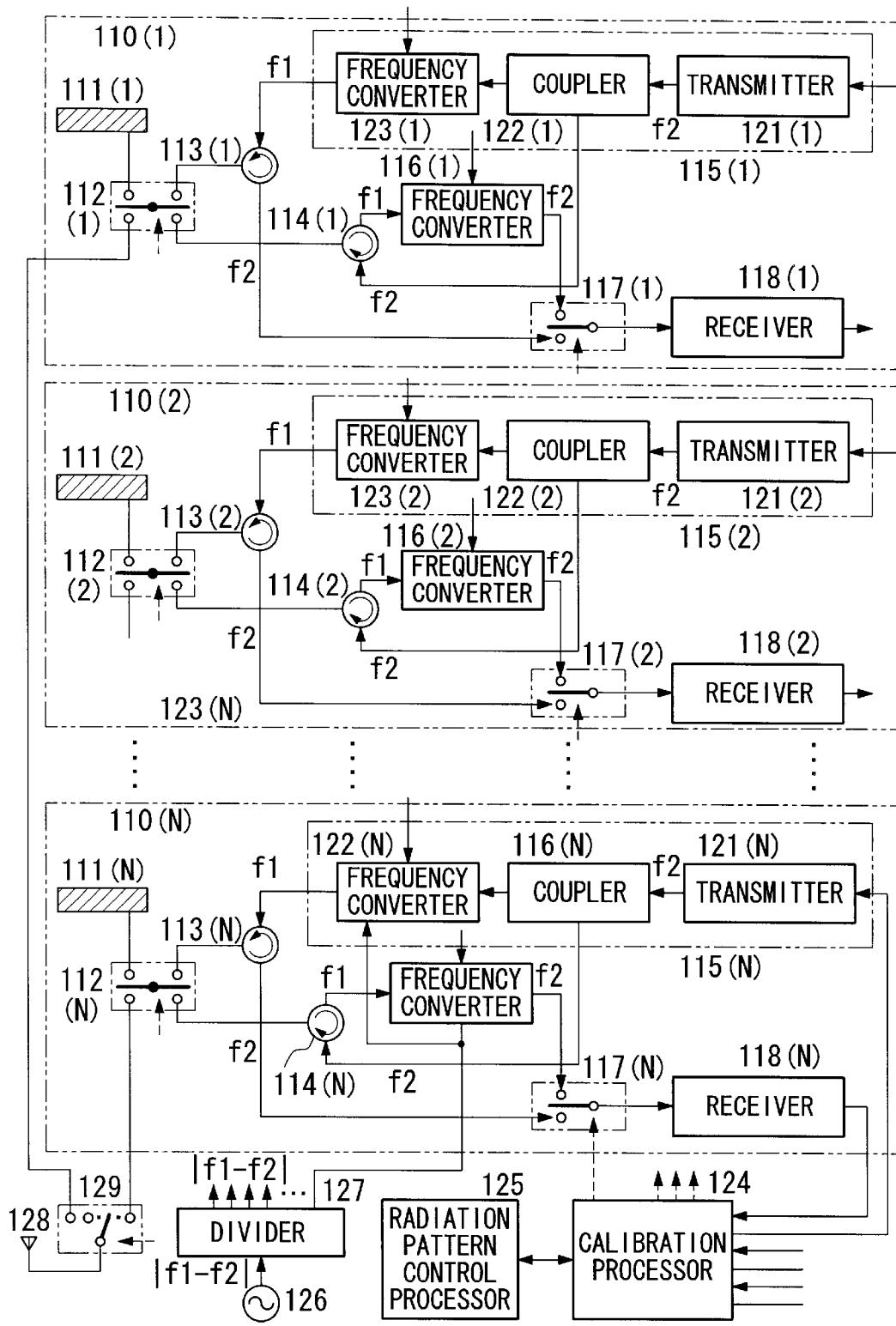
FIG. 12 is a block diagram showing the structure of the adaptive array antenna transceiver apparatus according to the fourth embodiment.
Figure 13:
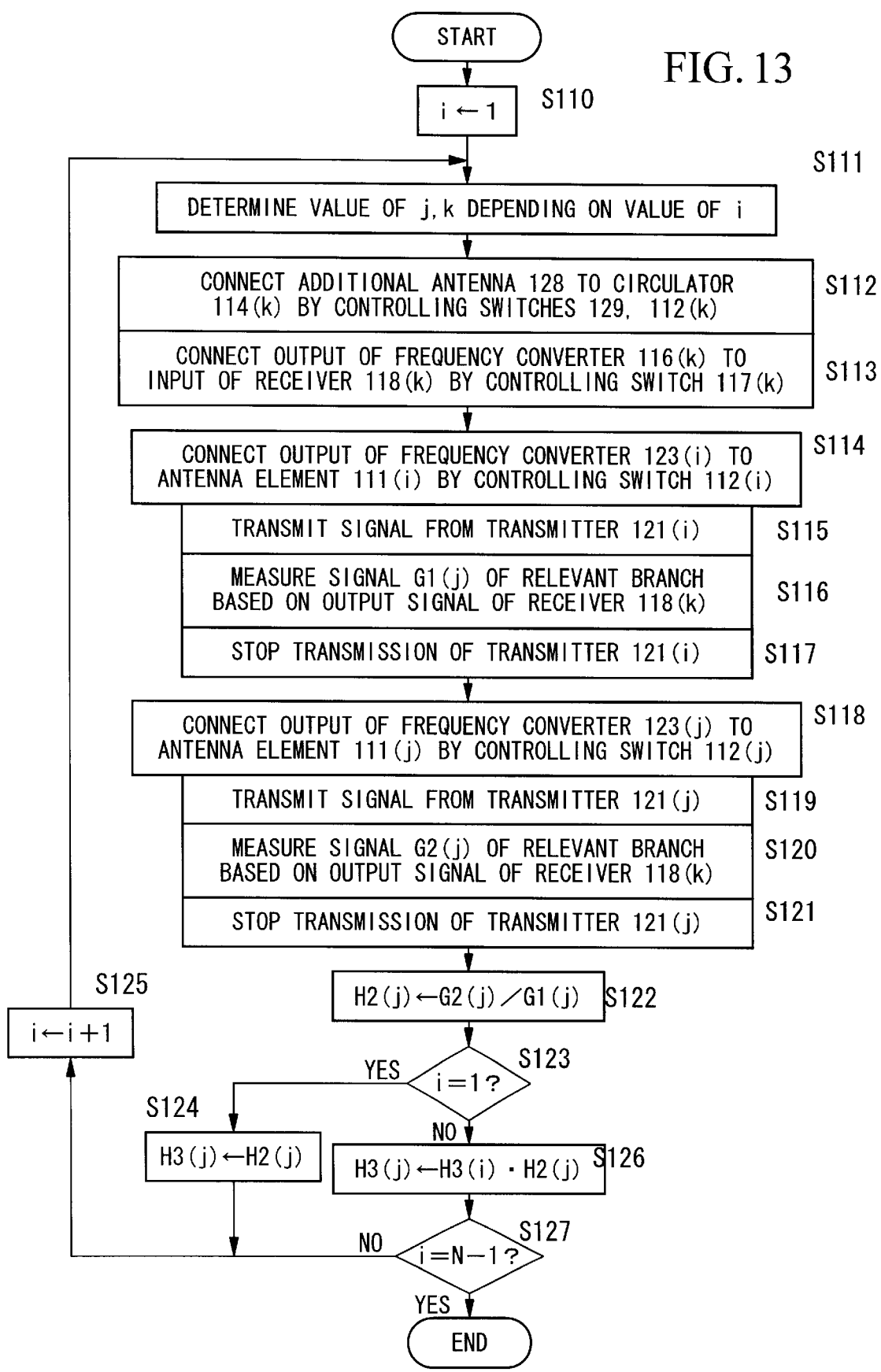
FIG. 13 is a processing chart showing the calibration control processing of the receiver according to the fourth embodiment.
Figure 14:
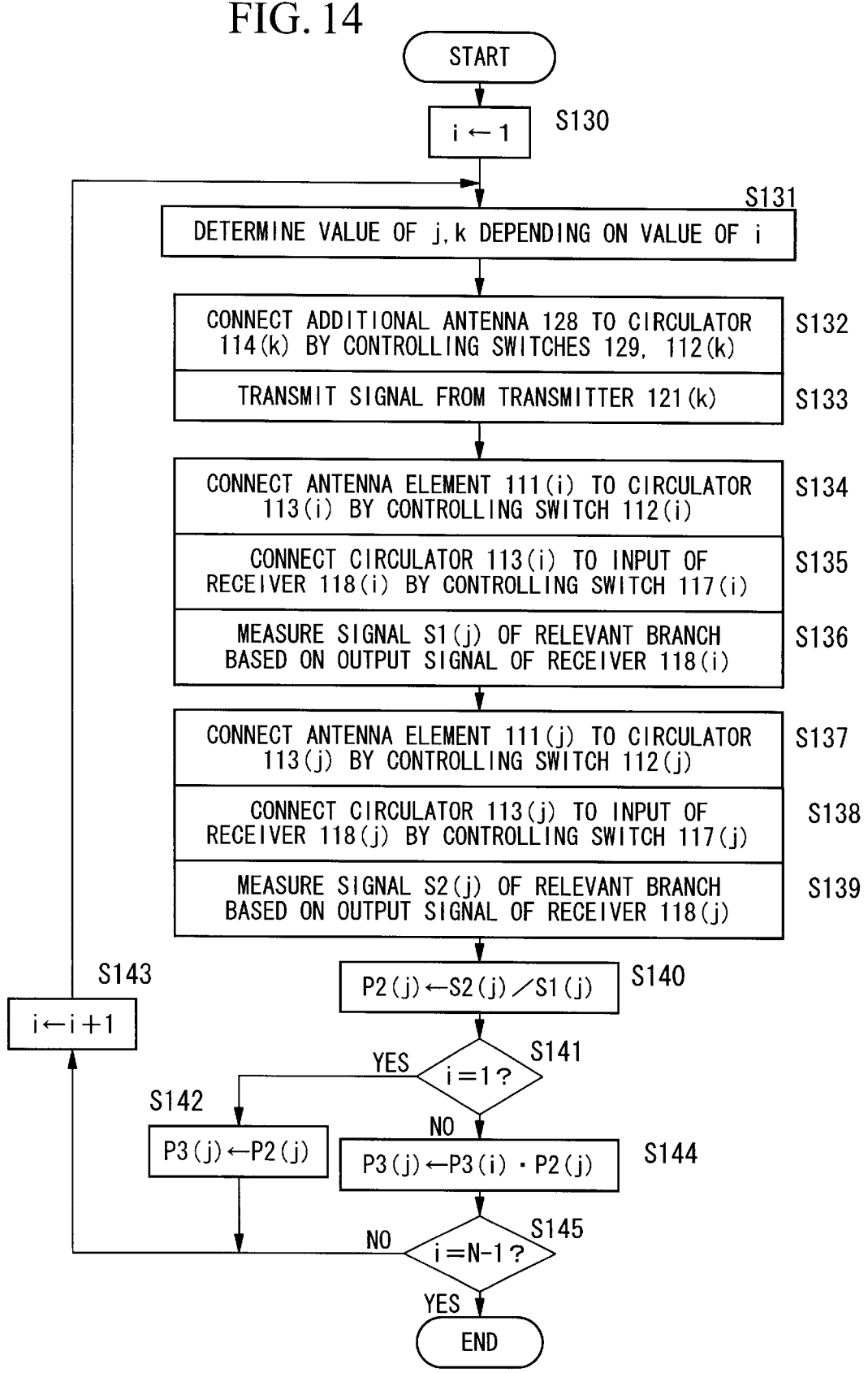
FIG. 14 is a processing chart showing the calibration control processing of the receiver according to the fourth embodiment.
Figure 15A:
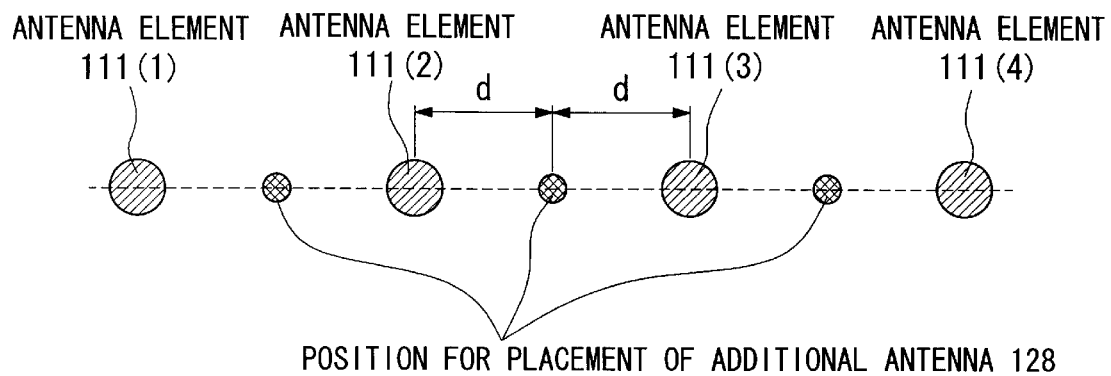
FIGS. 15A and 15B are planar drawings showing an example of the arrangement (1) of the antenna elements and the additional antenna.
Figure 16:
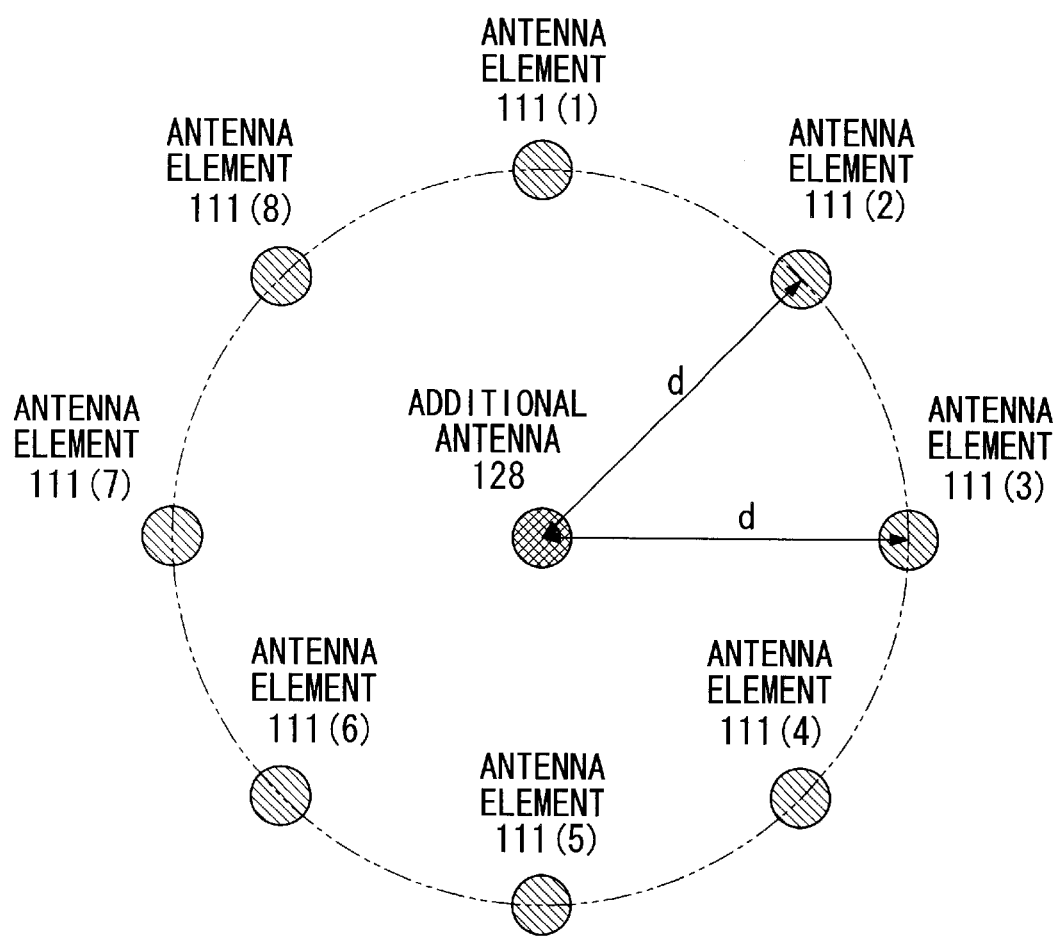
FIG. 16 is planar drawings showing an example of the arrangement (2) of the antenna elements and the additional antenna.

FIG. 12 is a block diagram showing the structure of the adaptive array antenna transceiver apparatus of the present embodiment. FIG. 13 is a flowchart showing the calibration control procedure of the transmitter of this embodiment. FIG. 14 is a flowchart showing the calibration control procedure of the receiver of this embodiment. FIG. 15A is a planar drawing showing an example of the arrangement of the antenna elements and the additional antenna. FIG. 16 is a planar drawing showing an example of the arrangement of the antenna elements and the additional antenna.

Figure 18:
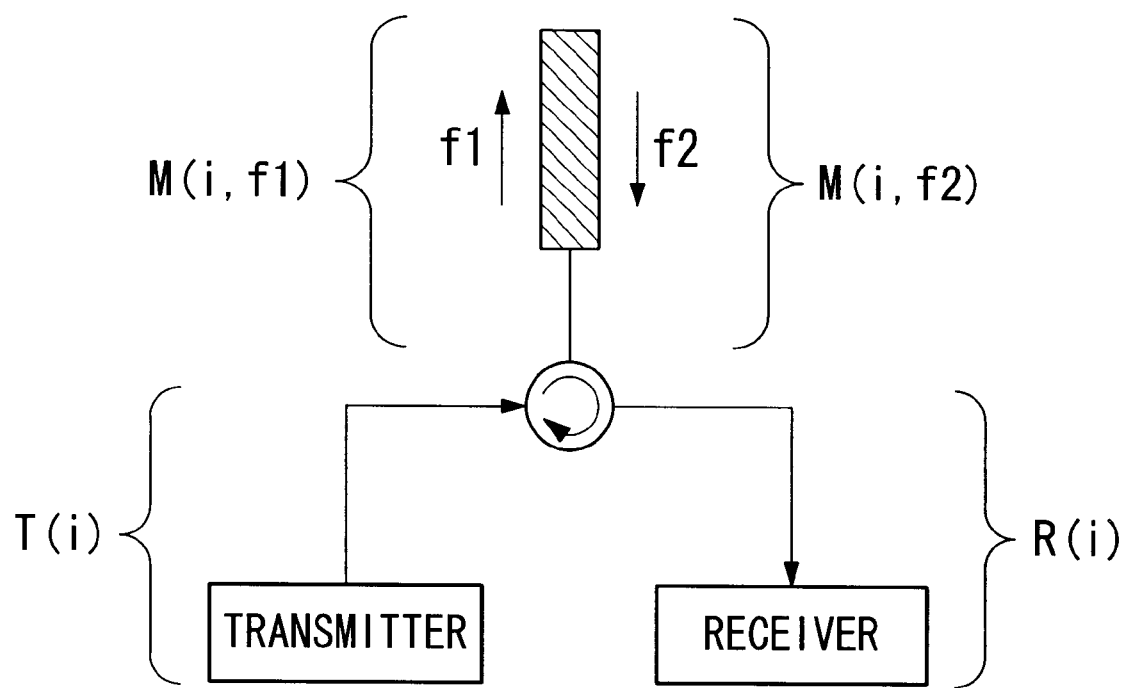
FIG. 18 is a block diagram showing the amplitude and phase values of each of the $i^{th}$ branches.

FIG. 10 is a block diagram showing an example of a generating circuit (1) having a frequency of f1–f2. FIG. 11 is a block diagram of a generating circuit (2) having a frequency of f1–f2. FIG. 18 is a block diagram showing the amplitude and phase values of each part of the ith branch.

The adaptive array antenna transceiver apparatus in this example comprises a radiation pattern control processor 125 corresponding to a radiation pattern control calculation circuit, a coupler 122 that is an example of a branching device, circulator 113 and circulator 114 that are an example of a transmitter/receiver common-use device, and a calibration processor 124 that corresponds to a calibration control circuit.

In FIG. 12, the array antenna is structured by N antenna elements 111 (where N is an arbitrary integer) disposed side by side. In this embodiment, the segments of the branch of the array antenna on which the antenna elements are disposed are represented by numerical values in parenthesis added to the reference numeral of each element. In addition, each arrow in FIG. 12 represents the direction of the signal. In the case that there is no need to segment the branches of each element, the parenthesis and the presentation of the numerical value in the parenthesis are omitted.

In the example of FIG. 12, for each of the antenna elements 111, a branch unit 110 including that element is formed. All branch units 110 are formed by identical structures. Each of the branches comprises an antenna element 111, switch 112, circulators 11, a transmitting part 115, a receiver 118, a frequency converter 116, switches 117, and a receiver 118.

The transmitting part 115 provides a transmitter 121, a coupler 122, and a frequency converter 123. The coupler 122 is provided for separating and extracting a part of a signal output by the transmitter 121 in the transmitting part 115.

The circulators 113, 114, and 122 are provided so that a transmitter and a receiver can use an antenna element 11 in common. In the case that transmission is carried out for communication, the signal transmitted from each of the transmitting parts 115 passes through the circulator 113 and switch 112, and is radiated as a wireless signal from an antenna element 111. In addition, in the case that reception is carried out for communication, the signal received by the antenna element 111 passes through the switch 112, circulator 113, and switch 117, and is input into the receiver 118.

In this example, the frequency of the signal output by the transmitting part 115, that is, the transmission frequency of the array antenna to be used in communication is f1, and the reception frequency of the array antenna and receiver 118 to be used for communication is f2, and the transmission frequency f1 and the reception frequency f2 are different.

However, in the transmitting part 115, the frequency of the signal transmitted by the transmitter 121 becomes f2 as the reception frequency of the receiver 118. The signal transmitted by the transmitter 121 passes through the frequency converter 123 and is converted to the transmission frequency f1. The coupler 122 extracts a signal having a frequency f2 from the output of the transmitter 121. In addition, the frequency converter 116 inputs the signal having a frequency f1 from the circulator 114, and is converted to a frequency of a signal such that a signal having a frequency of f2 is output.

In the adaptive array antenna transceiver apparatus in FIG. 12, a calibration processor 124, a radiation pattern control processor 125, a signal generator 126, a divider 127, an additional antenna 128, and a switch 129 are provided in addition to the N branch units 110.

The radiation pattern control processor 125 combines the signals of the N branches in order to carry out adaptive control of the radiation pattern of the array antenna, and at the same time, control the weighting of each of the branches during synthesis.

The calibration processor 124 carries out calibration by finding separately the amplitude and phase error of the transmitter (transmitting part 115 and the antenna element 111) of each of the branch units 110 and the reception system (receiver 118 and antenna element 111). In practice, the calibration processor finds the value to be used for calibrating the transmission system of each of the branches by implementing the control shown in FIG. 13, and finds the value to be used for calibrating the reception system of each of the branches by implementing the control shown in FIG. 14.

The respective switches 112, 117, and 129 are formed to as to be electrically controllable, and in this example, the various connection states are switched by the control of the calibration processor 124.

The switch 129 connects the additional antenna 128 to any one of the switches 112 of the N branch units 110. The switches 112 of each of the branches connect any one of the antenna elements 111 and switches 129 to any one of the circulators 113 and 114. The switch 117 of each of the branches connects either one of the outputs of the circulator 113 or the frequency converter 116 to the input of the receiver 118.

The signal generator 126 outputs a signal having frequency (|f1−f2|), which corresponds to the difference between the transmission frequency f1 and the reception frequency f2. The signal output by the signal generator is applies to the frequency converters 116 and 123 of each of the branches via the divider 127. The frequency converters 116 and 123 carry out conversion of the frequency using the signal from the signal generator 126.

Specifically, because the frequency of the signal input into the frequency converter 123 from the transmitter 121 is f2, and the frequency of the signal from the signal generator 126 is (|f1−f2|), by synthesizing (mixing) these signals, the frequency of the signal output from the frequency converter 123 is f1.

By synthesizing (mixing) these signals, the frequency of the signal output from the frequency converter is f1.

In addition, because the frequency of the signal input into the frequency converter 116 from the circulator 114 is f1, and the frequency of the signal from the signal generator 126 is (|f1−f2|), by synthesizing (mixing) these signals, the frequency of the signal output from the frequency converter 116 is f2.

In this example, because the transmission frequency and reception frequency to be used for communication are respectively f1 and f2, one signal transmitted from the branch cannot be detected by another branch and received by the receiver 118 as-is. However, by carrying out conversion of the frequency using the frequency converter 116, the signal transmitted from another branch can be received by the receiver 118.

The signal having a frequency of (|f1−f2|) output from the signal generator 126 can be generated using the local signal from the receiver and the local signal of the transmitter.

This means that the signal generator 126 can be realized by the circuit shown in FIG. 10 or the circuit shown in FIG. 11.

FIG. 10 shows a circuit using a direct conversion method that directly converts the frequency of the baseband and the frequency of the communication frequency band, and FIG. 11 shows a circuit using a superheterodyne method that provides an intermediate frequency and carries out two-stage frequency conversion between the baseband and the transmission frequency band.

In the circuit in FIG. 10, the output signal of the oscillator 61 and the output signal of the oscillator 71 are mixed in the frequency converter 80, and thereby the frequency (|f1−f21|), which is the difference therebetween, is obtained because the frequency of the output signal of the oscillator 61 that the transmitting part 60 uses for frequency conversion is the same as the transmission frequency f1, and the frequency of the output signal of the oscillator 71 that the receiving part 70 uses for frequency conversion is the same as the reception frequency f2.

In the circuit in FIG. 11, the case that the intermediate frequency is fIF is assumed. Therefore, the frequency of the signal output by the oscillator 65 of the transmitting part 60 is (f1−fIF), and the frequency of the signal output by the oscillator 75 of the reception part 70 is (f2−fIF). As shown in FIG. 11, by mixing the output signal of the oscillator 65 and the output signal of the oscillator 75 in the frequency converter 80, a frequency (f1−f2) of the difference therebetween is obtained.

In the case that the signal generator 126 is formed using the circuits shown in FIG. 10 and FIG. 11, a signal of (f1−f2) is generated using the local signals to be used for frequency conversion respectively in the transmitting part 115 and the receiver 118, and thus the circuit structure can be simplified because providing a new oscillator is unnecessary. Furthermore, because a deviation between the frequency used in the signal generator 126 and the actual transmission frequency and reception frequency does not occur, the precision of the calibration can be improved.

Moreover, for the circuit in FIG. 12, the reason that the signal output from the transmitter 121 via the coupler 122 is extracted is that the output of the transmitter 121 is large in comparison to the tolerated input level of the circuit on the receiver side.

The position where the additional antenna 128 is disposed must be determined depending on the position of the N antenna elements 111 that form the array antenna. As shown in FIG. 15A, in the case that the antenna elements arranged on one line are evenly spaced, the additional antenna 128 should be disposed at a position, for example, in the middle of two antenna elements 111 such that the distances d between each of the antenna elements 111 on the two branches that are the object of calibration and the additional antenna 128 are equal.

In addition, as shown in FIG. 16, in the case that the antenna elements 111 are disposed with equal separation on one circle, the additional antenna 128 should be positioned at center position of the circle. In this case, the distances d between the antenna elements 111 and the additional antenna 128 are equal for any branch.

When the additional antenna 128 is disposed in this manner, as will be described below, the transmission loss between each of the antenna elements 111 and the additional antenna 128 will be made equal, and a calibration value not influenced by these transmission losses can be found.

Next, the calibration control procedure shown in FIG. 13 will be explained. Moreover, in this example, the branch unit 10(1) is assigned to serve as the reference branch, but any other branch can serve as the reference.

In step 110, the value of the counter i is initialized. The value of the counter i corresponds to the one branch that is the object of calibration. The processing in step S 111 to S 127 is repeatedly executed depending on the value of the counter i.

In step S 111, the values of the counters j and k corresponding respectively to two branches is determined according to the value of the counter i. However, the value of the counter j is determined so as to differ from the value of the counter i, and the value of counter k is determined so as to differ from the value of counter i and to differ from the value of counter j.

In practice, the value of counter j can be set to the result of adding 1 to the value of counter i, and the value of counter k can be set to the result of adding 2 to the value of the counter i. However, in the case that the values of counters j and k exceed N, which is the number of branches, they are set to the result of subtracting N from that value.

Thereby, the values of the counters i, j, and k all have values that differ from each other, and thus by selecting branches specified by the values of the counters i, j, and k, three different branches can be selected simultaneously.

However, for the two branches that are the object of calibration, the values of the counters i and j must be determined such that the distances between the antenna element 111 of each of the branches and the additional antenna 128 are equal.

As shown in FIG. 16, in the case that the antenna elements are disposed in a circle and the additional antenna 128 is disposed at the center thereof, there is no particular problem because the distance between the antenna element 111 of any of the branches and the additional antenna 128 are equal.

However, as shown in FIG. 15A, in the case that the antenna elements 111 are arranged in a straight line, the position of the additional antenna 128 must be changed each time such that the distances between the antenna elements 111 of the two branches selected as the objects of calibration are equal.

In step S 112, by controlling the switch 129 and the switch 112(k) of the branch corresponding to the value of counter k, the additional antenna 128 is connected to the circulator 114(k) of the branch corresponding to the value of the counter k.

In step S 113, for the branch corresponding to the value of the counter k, by controlling switch 117(k), the output of the frequency generator 116(k) is connected to the input of the receiver 118(k).

In step S 114, for a branch corresponding to the value of counter i, by controlling switch 112(i), the output of the frequency converter 123(i) and the antenna element 111(i) are connected.

In step 115, the signal from the transmitter 121(i) of the branch corresponding to the value of the counter i is transmitted. In this case, the signal output from the transmitter 121(i) passes through the coupler 122(i), is converter to frequency f1 by the frequency converter 123(i), passes through the circulator 113(i) and the switch 112(i), and is transmitted from the antenna element 111(i) as a wireless signal.

This wireless signal is received by the additional antenna 128. The signal received by the additional antenna 128 passes through switch 129 is input into the branch corresponding to the value of the counter k, passes through the switch 112(k) and the circulator 114(k), is converted to the frequency f2 by the frequency converter 116(k), passes through the switch 117(k), and is input into the receiver 118(k).

Thus, in step S 116, from the received output of the receiver 118(k), the signal (amplitude and phase values) G1(j) of the branch currently selected is measured. When the measurement has finished, in the next step S 117, the transmission of the transmitter 121(i) is stopped.

In the same manner as describe above, in step S 118, for the branch corresponding to the value of counter j, by controlling switch 112(j), the output of the frequency converter 123(j) and the antenna element 111(j) are connected.

In step S 119, the signal from the transmitter 121(j) of the branch corresponding to the value of the counter j is transmitted. In this case, the signal output from the transmitter 121(j) passes through the coupler 112(j), the frequency is converted to f1 by the frequency converter 123(j), passes through the circulator 112(j) and the switch 112(j), and is transmitted from the antenna element 111(j) as a wireless signal.

This wireless signal is received by the additional antenna 128. The signal received by the additional antenna 128 passes through switch 129, is input into the branch corresponding to the value of the counter k, passes through switch 112(k) and circulator 114(k), the frequency is converted to f2 by the frequency converter 116(k), passes through switch 117(k), and is input into the receiver 118(k).

Thus, in step 120, from the received output of the receiver 118(k), the signal (amplitude and phase values) G2(j) of the branch that is currently selected is measured. When the measurement has finished, in the next step S 121, the transmission of the transmitter 121(j) is stopped.

In step 122, the calibration value H2(j) is found by the following equation:

$$H2(j)=G2(j)/G1(j) \tag{101}$$

In the first process, because the value of the counter i is 1, the processing passes through steps S 122 and S 123, advances to step S 124, and in step S 125 updates the value of the counter i, and returns to step S 111. In step S 124, the calibration value H2(j) is stored as calibration value H3(j).

The second time and thereafter, because the value of the counter i is not 1, the processing passes through steps S 122 and S 123, advances to step S 126, passes through steps S 127 and S 125, and returns to step 111. In this case, in step S 125 the value of the counter i is updated.

In step S 126, the result of calibrating the calibration value H2(j) by the following equation is stored as the calibration value H3(j):

$$H3(j)=H3(i)\cdot H2(j) \quad (102)$$

When the processing for all of the branches has completed, the calibration value H3(j) is found separately for the respective second to N branches. In this example, because the first branch serves as the reference, naturally, the calibration value H3(j) of the first branch is 1.

Here, the amplitude and phase values G1(j) and G2(j) measured in steps S 116 and S 120 in FIG. 13 are represented by the following equations:

$$G1(j)=T(i)\cdot M(i, f1)\cdot L1(k)\cdot M2(f1)\cdot Q(k)\cdot R(k) \quad (103)$$

$$G2(j)=T(j)\cdot M(j, f1)\cdot L2(k)\cdot M2(f1)\cdot Q(k)\cdot R(k) \quad (104),$$

where:
T(i), T(j): the amplitude and phase of the transmitting parts 115(i) and 115(j),
M(i, f1): the amplitude and phase related to f1 of the antenna element 111(i),
M(j, f1): the amplitude and phase related to f1 of the antenna element 111(j),
L1(k): the transmission loss between the antenna element 111(i) and the additional antenna 128,
L2(k): the transmission loss between the antenna element 111(j) and the additional antenna 128,
M2(f1): amplitude and phase related to f1 of the additional antenna 128,
Q(k): the amplitude and phase of the frequency converter 116(k), and
R(k): the amplitude and phase of the receiver 118(k).

In this embodiment, because the distance between the antenna element 111(i) and the additional antenna 128 and the distance between the antennal element 111(j) and the additional antenna 128 are identical, the transmission losses L1(k) and L2(k) are identical. In addition, because the additional antenna 128 and the branch corresponding to the counter k are used in common between the two branches corresponding to the counters i and j, these components are identical. Therefore, by rearranging Equation 101, the following equation is obtained:

$$H2(j) = G2(j)/G1(j) \quad (105)$$
$$= (T(j)\cdot M(j, f1)\cdot L2(k)\cdot M2(f1)\cdot Q(k)\cdot R(k))/$$
$$(T(i)\cdot M(i, f1)\cdot L1(k)\cdot M2(f1)\cdot Q(k)\cdot R(k))$$
$$= (T(j)\cdot M(j, f1))/(T(i)\cdot M(i, f1))$$

This means that, as shown in FIG. 18, the amplitude and phase values for the entire transmission system of the ith branch, which combines the component T(i) of the amplitude and phase related to f1 of the transmitting part 115 and the component M(i, ft) of the amplitude and phase values related to f1 of the antenna elements 111(j) can be found for each of the branches as a ratio with the other branches.

The calibration value H3(J) in steps S 124 and S 126 will now be explained. The calibration value H3(3), for example, is represented by the following equation:

$$H3(3) = H3(2)\cdot H2(3) \quad (106)$$
$$= H2(2)\cdot H2(3)$$
$$= ((T(2)\cdot M(2, f1))/(T(1)\cdot M(1, f1)))\cdot$$
$$= ((T(3)\cdot M(3, f1))/(T(2)\cdot M(2, f1)))$$
$$= (T(3)\cdot M(3, f1))/(T(1)\cdot M(1, f1))$$

Therefore, the calibration value H3(4) is represented by the following equation:

$$H3(4) = H3(3)\cdot H2(4) \quad (107)$$
$$= ((T(3)\cdot M(3, f1))/(T(1)\cdot M(1, f1)))\cdot H2(4)$$
$$= ((T(3)\cdot M(3, f1))/(T(1)\cdot M(1, f1)))\cdot$$
$$((T(4)\cdot M(4, f1))/(T(3)\cdot M(3, f1)))$$
$$= ((T(4)\cdot M(4, f1))/(T(1)\cdot M(1, f1)))$$

By a calculation similar to the above, the calibration value H3(j) is represented by the following equation:

$$H3(j) = H3(i)\cdot H2(j) \quad (108)$$
$$= ((T(j)\cdot M(j, f1))/(T(1)\cdot M(1, f1)))$$

This means that the calibration value H3(j) obtained by the calibration control procedure in FIG. 13 is a relative value of the amplitude and phase values of the transmitting system (transmitting part 115(j) and antenna element 111(j)) of the jth branch with respect to the reference branch. In addition, the measured amplitude and phase values fluctuate due to the influence of the change in the temperature characteristics through time, but because the component Q thereof is cancelled, the influence of the temperature characteristics does not appear in the calibration value H3(j).

In this manner, by using only one additional antenna 128, the calibration value H3(j) of each of the branches can be found as a relative value with respect to the reference branch. When transmitting using each of the branches, by multiplying the amplitude and phase values of the transmitting part 115(j) by the calibration value H3(j) obtained by the calibration control procedure in FIG. 13, the error in the amplitude and phase values between branches in the transmitting part 115 can be calibrated.

Next, the calibration control procedure shown in FIG. 14 will be explained. Moreover, in this example, the branch unit 110(i) has been assigned to serve as the reference branch, but other branches can serve as the reference.

In step 130, the value of the counter is initialized. The value of the counter i corresponds to the one branch that is the object of calibration. The processing in steps 131 to 145 is repeatedly executed depending on the value of the counter i.

In step 131, the value of counters j and k corresponding respectively to two branches is determined depending on the value of the counter i. However, the value of the counter j is always set so as to be different from the value of the counter i, and the counter k is always set so as to differ from the value of the counter i and to differ from the value of the counter j.

In practice, counter j can be set to the result of adding 1 to the value of counter i, and the value of the counter k can be set to the result of adding 2 to the counter i. However, in the case that the values of the counters j and k exceed N, which is the number of branches, they are set to the result of subtracting N from that value.

Thereby, the values of the counters i, j, and k are values that are different from each other, and thereby by selecting the branch specified by the values of the counters i, j, and k, three differing branches can be selected simultaneously. In the processing in FIG. 14, the value of the counters i and j correspond to the two branches that are the object of measurement, and the value of the counter k corresponds to the branch used in common for transmission.

However, for the two branches that are the object of calibration, the values of the counters i and j must be determined such that the distances between the antenna element 111 of each of the branches and the additional antenna 128 are equal.

As shown in FIG. 16, in the case that the antenna elements are disposed in a circle and the additional antenna 128 is disposed at the center thereof, there is no particular problem because the distance between the antenna element 111 of any of the branches and the additional antenna 128 are equal.

However, as shown in FIG. 15A, in the case that the antenna elements 111 are arranged in a straight line, the position of the additional antenna 128 must be changed each time such that the distances between the antenna elements 111 of the two branches selected as the object of calibration are equal.

In step S 132, by controlling the switch 129 and the switch 112(k) of the branch corresponding to the value of counter k, the additional antenna 128 is connected to the circulator 114(k) of the branch corresponding to the value of the counter k.

In step S 133, the signal from the transmitter 121(k) of the branch corresponding to the value of the counter k is transmitted. In this case, the signal output from the transmitter 121(k) is split by the coupler 122(k), passes through the circulator 114(k), the switch 112(k), and the switch 129(k), and is transmitted as a wireless signal from the additional antenna 128.

This wireless signal transmitted from the additional antenna 128 can be received by the antenna element 111 of each of the branches. The signal output by the transmitter 121(k) is transmitted from the additional antenna 128 having a frequency f2, without passing through the frequency converter 123(k), and thus the signal can be received by the receiver 118 without converting the frequency at the branch on the receiver side.

In step 134, for the branch corresponding to the value of the counter i, by controlling the switch 112(i), the antenna element 111(i) and the circulator 113(i) are connected.

In step 135, for the branch corresponding to the value of the counter i, by controlling switch 117(i), the circulator 113(i) and the receiver 118 are connected.

In this case, the signal receiver by the antenna element 111(i) passes through the switch 112(i), the circulator 113(i), and the switch 117(i), and is input into the receiver 118(i). Then, in step S 136, the signal (amplitude and phase values) S1(j) of the branch selected from the receiver output of the receiver 118(i) is measured.

In the same manner as describe above, in step S 137, for the branch corresponding to the value of counter j, by controlling switch 112(j), the antenna element 111(j) and the circulator 113(j) are connected.

In step 139, for the branch corresponding to the value of the counter j, by controlling switch 117(j), the circulator 113(j) and the output of the receiver 118 are connected.

In this case, the signal received by the antenna element 111(j) passes through the switch 112(j), the circulator 113(j), and the switch 117(j), and is input into the receiver 118(j). Then, in step 139, the signal (amplitude and phase values) S2(j) of the branch selected from the received output of the receiver 118(j) is measured.

In step S 140, the calibration value P2(j) is found by the calculation of the following equation:

$$P2(j)=S2(j)/S1(j) \qquad (109)$$

In the first process, because the value of the counter i is 1, the processing passes through steps S140 and S 141, advances to step S 142, and in step S 143 updates the value of the counter i, and returns to step S 131. In step S 142, the calibration value P2(j) is stored as calibration value P3(j).

The second time and thereafter, because the value of the counter i is not 1, the processing passes through steps S 140 and S 141, advances to step S 144, passes through steps S 142, and returns to step 131. In this case, in step S 143 the value of the counter i is updated.

In step S 144, the result of calibrating the calibration value P2(j) by the following Equation is stored as the calibration value H3(j)

$$P3(j)=P3(i)\cdot P2(j) \qquad (110)$$

When the processing for all of the branches has completed, the calibration value P3(J) is found separately for the respective second to N branches. In this example, because the first branch serve as the reference, naturally, the calibration value P3(j) of the first branch is 1.

Here, the amplitude and phase values S1(j) and S2(j) measured in steps S 136 and S 139 in FIG. 14 are represented by the following equations:

$$S1(j)=T(k)\cdot M2(f2)\cdot L1(k)\cdot M(i, f2)\cdot R(i) \qquad (111)$$

$$S2(j)=T(k)\cdot M2(f2)\cdot L2(k)\cdot M(j, f2)\cdot R(j) \qquad (112),$$

where:

T(k): the amplitude and phase of the transmitter 121(k),

M2(f2): the amplitude and phase related to f2 of the additional antenna 128,

L1(k): the transmission loss between the antenna element 111(i) and the additional antenna 128, L2(k): the transmission loss between the antenna element 111(j) and the additional antenna 128, M(i, f2): amplitude and phase related to f2 of the antenna element 111(i), M(j, f2): amplitude and phase related to f2 of the antenna element 111(j), R(i): the amplitude and phase of the receiver 118(i), and R(j): the amplitude and phase of the receiver 118(j).

In this embodiment, because the distances between the antenna element 111(i) and the additional antenna 128 and the distance between the antennal element 111(j) and the additional antenna 128 are identical, the transmission losses L1(k) and L2(k) are identical. In addition, because the additional antenna 128 and the branch corresponding to the counter k are used in common between the two branches corresponding to the counters i and j, these components are identical. Therefore, by rearranging Equation 109, the following equation is obtained:

$$P2(j) = S2(j)/S1(j) \quad (113)$$
$$= (T(k) \cdot M2(f2) \cdot L2(k) \cdot M(j, f2) \cdot R(j))/$$
$$(T(k) \cdot M2(f2) \cdot L1(k) \cdot M(i, f2) \cdot R(i))$$
$$= (M(j, f2) \cdot R(j))/(M(i, f2) \cdot R(i))$$

This means that, as shown in FIG. 18, the amplitude and phase values for the entire reception system of the ith branch hole, which combines the component T(i) of the amplitude and phase related to f1 of the transmitting part 115 and the component M(i, ft) of the amplitude and phase values related to f1 of the antenna elements 111(j), can be found for each of the branches as a ratio with the other branches.

The calibration value P3(j) in steps S 142 and S 144 will now be explained. The calibration value H3(3), for example, is represented by the following equation:

$$P3(3) = P3(2) \cdot P2(3) \quad (114)$$
$$= P2(2) \cdot P2(3)$$
$$= ((M(2, f2) \cdot R(2))/(M(1, f2) \cdot R(1))) \cdot$$
$$((M(3, f2) \cdot R(3))/(M(2, f2) \cdot R(2)))$$
$$= (M(3, f2) \cdot R(3))/(M(1, f2) \cdot R(1))$$

Therefore, the calibration value P3(4) is represented by the following equation:

$$P3(4) = P3(3) \cdot P2(4) \quad (115)$$
$$= ((M(3, f2) \cdot R(3))/(M(1, f2) \cdot R(1))) \cdot P2(4)$$
$$= ((M(3, f2) \cdot R(3))/(M(1, f2) \cdot R(1))) \cdot$$
$$((M(4, f2) \cdot R(4))/(M(3, f2) \cdot R(3)))$$
$$= (M(4, f2) \cdot R(4))/(M(1, f2) \cdot R(1))$$

By a calculation similar to the above, the calibration value P3(j) is represented by the following equation:

$$P3(j) = P3(i) \cdot P2(j) \quad (116)$$
$$= (M(j, f2) \cdot R(j))/(M(1, f2) \cdot R(1))$$

This means that the calibration value P3(j) obtained by the calibration control procedure in FIG. 14 is the relative value of the amplitude and phase values of the reception system (receiver 118(j) and antenna element 111(j)) of the jth branch with respect to the reference branch.

Therefore, when receiving at each of the branches, by multiplying the amplitude and phase values of each of the receivers 118(j) by the calibration value P3(j) obtained in the calibration control procedure in FIG. 14, the error of the amplitude and phase values between the branches in the reception system can be compensated.

Moreover, because the transmission and reception of the signal only between the for the additional antenna 128 and the antenna elements 111 disposed in proximity thereto is necessary, providing a high gain is not necessary, as is the case for an antenna generally used in communication. Therefore using an ultra-small antenna or a probe as the additional antenna 128 is sufficient.

The fluctuation component Q of the amplitude and phase values due to the temperature characteristics in the above Equations 103 and 104 in practice includes the fluctuation component in the transmitter 121 of each of the branches, the fluctuation component in the receiver 118, and the fluctuation component in the frequency converter used in the calibration. Therefore, the characteristics of the frequency converter 116 change with respect to temperature accompanying the passage of time, but because the frequency converter 116 is used in common when measuring the amplitude and phase values of any of the branches in calibration processing, the fluctuation component Q of the amplitude and phase values of the single frequency converter 116 does not influence the calibration value.

Fifth Embodiment

Figure 17:
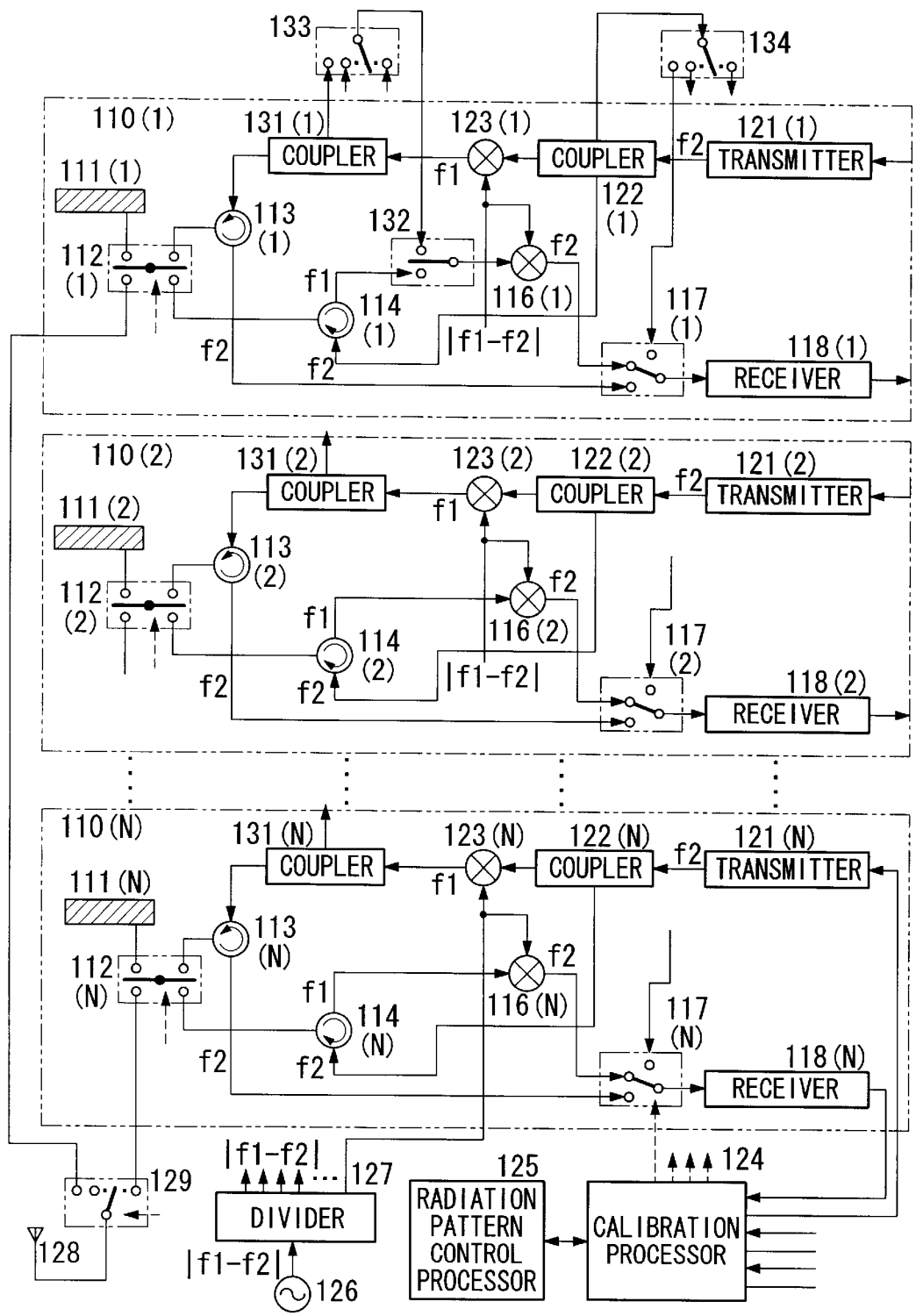
FIG. 17 is a block diagram showing the structure of the adaptive array antenna transceiver apparatus according to the fifth embodiment.

The fifth embodiment of the adaptive array antenna transceiver apparatus of the present invention will be explained referring to FIG. 17. FIG. 17 is a block diagram showing the structure of the adaptive array antenna transceiver apparatus of this embodiment.

This embodiment is an example of a modification of the fourth embodiment. In FIG. 17, the elements corresponding to those in FIG. 12 are indicated with the same reference numbers. The explanations of the elements that are identical to those in the fourth embodiment are omitted.

The adaptive array antenna transceiver apparatus in this embodiment comprises a radiation pattern control processor corresponding to the direction control computing circuit 125, a coupler 122, which is an example of a branching device, a coupler 131, a circulator 113, which is an example of a transmitter/receiver common-use device, the circulator 114, and a calibration processor 124 corresponding to a calibration control circuit.

In the FDD transceiver apparatus, the part of the antenna and current supply are influenced by rapid environmental fluctuations such as temperature with comparative difficulty, but the high frequency circuits of the transmitter and the receiver are comparatively easily influenced by temperature fluctuations in the electrical amplifier and the circulators, for example.

Therefore, while the calibration related to the antenna and power supply does not have to be calibrated frequently, the calibration of the transmitter and receiver, which are easily influenced due to temperature fluctuations, is preferably carried out at short time intervals.

Thus, in the adaptive array antenna transceiver apparatus shown in FIG. 17, in addition to the calibration function of the fourth embodiment, functions are added for measuring separately each of the individual branches by separating from the antenna the calibration values of the amplitude and phase of the transmitting part 115 (transmitter 121 and frequency converter 123) and the receiver 118. Calibration values that include the antenna and the power source can be calculated by the same processing procedure as that shown in FIGS. 13 and 14, which have already been explained.

As shown in FIG. 17, in this embodiment, by providing the coupler 131 for each of the branch units 110, a part of the signal output by the frequency converter 123 can be separated and extracted. The part of the signal extracted by the coupler 31 for each of the branches is applied to each of the switches 133. The switches 133 select one of the signals from any one of the couplers 131 of the N branches.

In addition, a switch 132 is provided on the first branch unit 110(1), which has been assigned to serve as the reference branch. The switch 132 selects one of either the signal output by the circulator 114(1) or the signal selected by the switch 133 and applies this to the input of the frequency converter 116.

The switch 134 outputs a signal that has been split by the coupler 122(1) with respect to any one of the switches 117 of the N branch units 110. The switch 117 of each of the branches selectively applies any one of the reception signal from the circulator 113, the output signal of the frequency converter 116, or the output of the switch 134 to the input of the receiver 118.

The selection conditions for each switch 132, 133, 134, and 117 are switched by control of the calibration processor 124. The calibration processor 124 implements the following control for calibration, in addition to that explained in FIG. 13 and FIG. 14.

The calibration processing related to the transmitting part 115 is as follows:

(1) By controlling the switch of the branch unit 110(1) assigned to serve as the reference branch, the output of the switch 133 is connected to the input of the frequency converter 116(1). In addition, by controlling the switch 117(1), the output of the frequency converter 116(1) is connected to the input of the receiver 118(1).

(2) Any one of the branches (i) is selected, and the signal from the transmitter 121 of the selected branch is output.

(3) The signal of the selected branch separated by the coupler 131(i), the signal is sent, and this signal is selected by the switch 133.

(4) The signal (amplitude and branch values) X(i) of the selected branch is measured from the received output of the receiver 118(1) of the reference branch.

The processing of the above 2 to 4 is repeated, and the signals X(i) of all of the branches are measured in sequence.

In this case, the signal having the frequency f2 output from the transmitter 121(i) passes through the coupler 122(i), is converted to the frequency f1 by the frequency converter 123(i), separated by the coupler 131(i), and input into the switch 133.

Furthermore, this signal passes through the switch 133 and the switch 132, is converted to frequency f2 by the frequency converter 116(1), passes through the switch 117 (1), and input into the receiver 118(1). Therefore, the signal output from the transmitting part 115 (transmitter 121, frequency converter 123) of each of the branches is measured at the receiver 118(1) of the reference branch.

Here, the signal X(i) of each of the branches measured here is represented by the following equation:

$$X(i)=T(i) \cdot Q(1) \cdot R(1) \quad (117)$$

where

T(i): amplitude and phase values not included in the antenna of each of the branches, Q(1): the amplitude and phase of the frequency converter 116(1) of the reference branch, and R(1): the amplitude and phase of the receiver 118(1) of the reference branch.

Therefore, the calibration value A(i) of the transmitting part 115 is obtained by the following equation:

$$A(i) = X(i)/X(1) \quad (118)$$
$$= T(i) \cdot Q(1) \cdot R(1)/T(1) \cdot Q(1) \cdot R(1)$$
$$= T(i)/T(1)$$

In addition, the calibration procedure related to the receiver part is as follows:

(1) The signal from the reference branch transmitter 121(1) is output, the coupler 122(1) separates this signal, and the split signal is sent to the switch 134.

(2) One branch (i) is selected, the switch 134 switched depending on the selected branches.

(3) By controlling switch 117(i) of the selected branch (i), the output of the switch 134 is connected to the input of the receiver 118(i).

(4) The signal (amplitude and phase values) Y(i) of the selected branch is measured from the received output of the receiver 118(i) of the selected branch.

The processing in the above 1 to 4 is released, and the signals Y(i) are measured in sequence for all of the branches.

Here, the signal Y(i) of each of the branches measured is represented by the following Equation:

$$Y(i)=T(1) \cdot R(i) \quad (119)$$

where

T(i): amplitude and phase of the transmitter 121(i) of the reference branch, and R(i): the amplitude and phase of the receiver 118(i) of each of the branches.

Therefore, the calibration value B(i) of the receiver 118(i) is obtained by the following equation:

$$B(i) = Y(i)/Y(1) \quad (120)$$
$$= (T(1) \cdot R(i))/(T(1) \cdot R(1))$$
$$= R(i)/R(1)$$

Therefore, not only the calibration value of the amplitude and phase of the entire transceiver part that includes the antenna and electrical supply in this embodiment, but also the calibration value related to the transmitter and the calibration value related to the receiver, which are easily influenced by temperature changes, can be obtained for each of the branches.

Sixth Embodiment

The sixth embodiment of the adaptive array antenna transceiver apparatus of the present invention will be explained referring to the FIG. 19 to FIG. 21.

Figure 19:
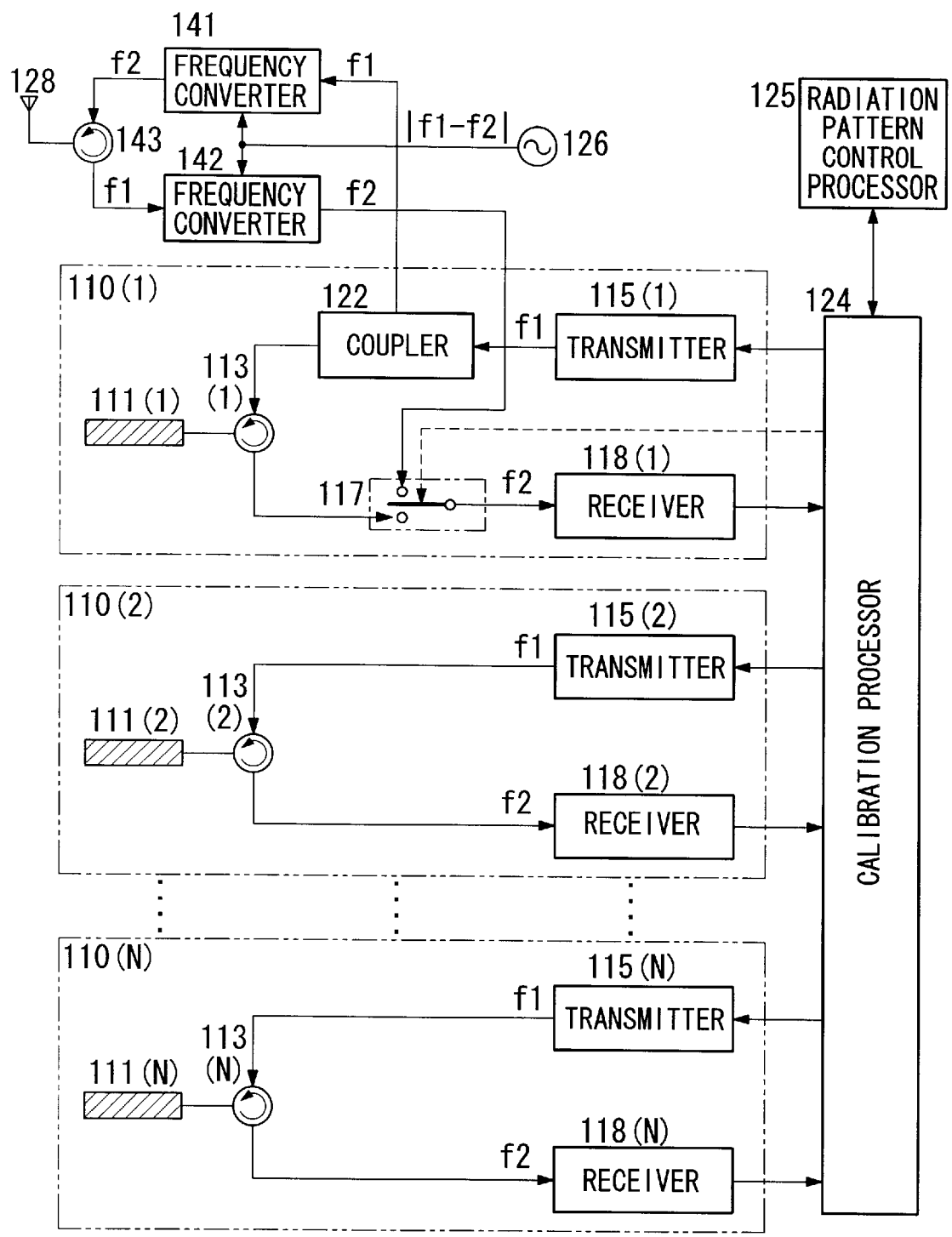
FIG. 19 is a block diagram showing the structure of the adaptive array antenna transceiver apparatus according to the sixth embodiment.

FIG. 19 is a block diagram showing the structure of the adaptive array antenna transceiver apparatus of this embodiment. FIG. 20 is a flowchart showing the calibration control procedure of the transmitter of this embodiment.

Figure 21:
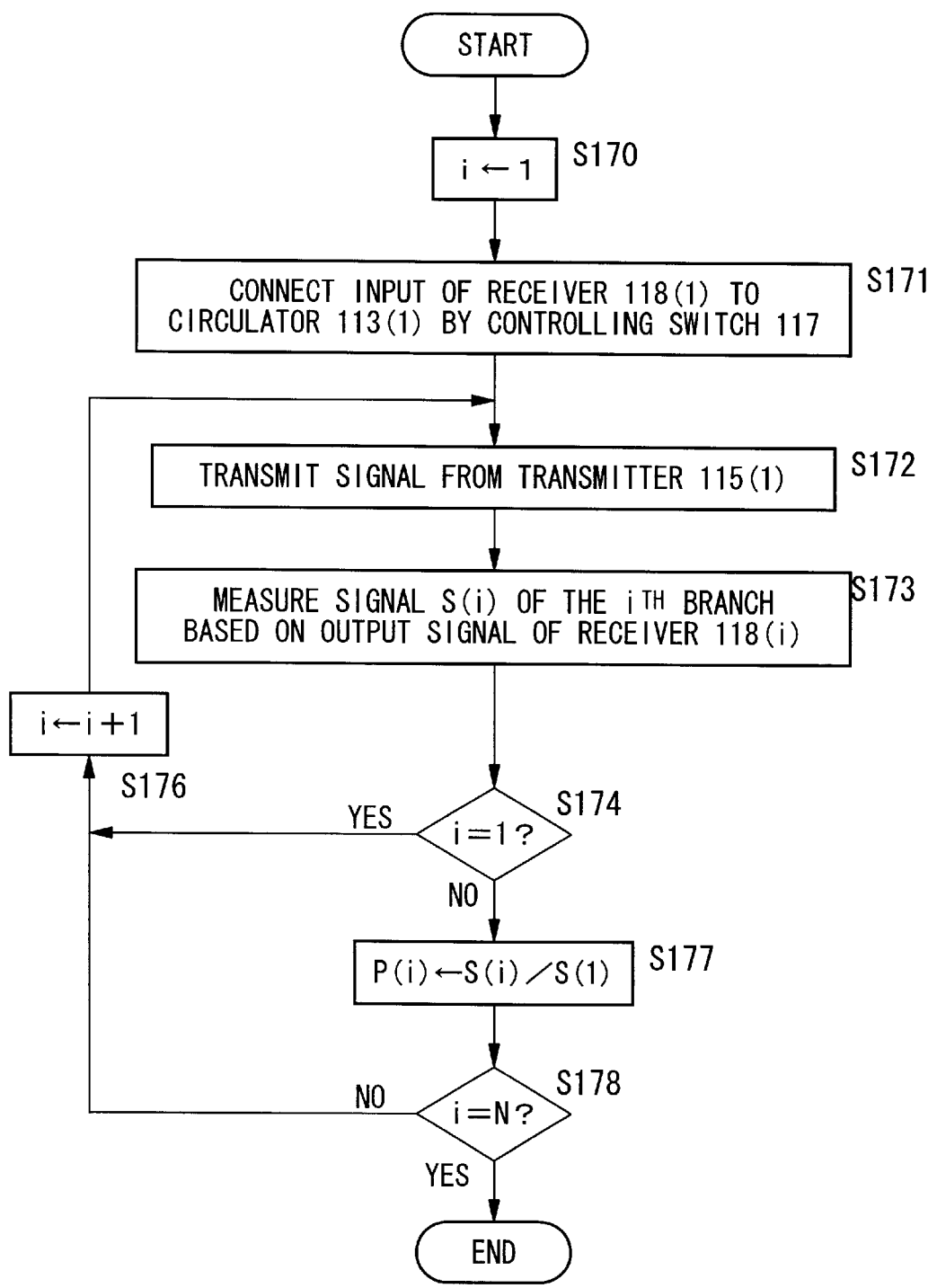
FIG. 21 is a processing chart showing the calibration control processing of the receiver according to the sixth embodiment.

FIG. 21 is a flowchart showing the calibration control procedure for the receiver of this embodiment.

This embodiment is a modification of the fourth embodiment. In FIG. 19, the elements corresponding to FIG. 12 have identical reference numerals.

The adaptive array antenna transceiver apparatus in this embodiment includes the circulator 113 and a circulator 145, which are examples of a transmitter/receiver common-use device, a radiation pattern control processor 125, which corresponds to the radiation pattern control calculation circuit, a coupler 122, which is an example of a branching device, and a calibration processor 124, which corresponds to a calibration control circuit.

In the example in FIG. 19, the array antenna is structured by N antenna elements 111 (where N is an arbitrary integer) disposed in a line. Each of the branch units 110 provides antenna elements 111, a circulator 113, a transmitting part 115, and a receiver 118. In addition, the coupler 122 and the switch 117 are provided only on the one branch unit 110(1). The other branch units 110 have structures that are identical to each other.

The coupler 122 of the branch unit 110(1) is provided in order to separate and extract a part of the signal output from the transmitting part 115. The switch 117 of the branch unit 110(1) is provided in order to switch the signals input into the receiver 118(1). The selection state of the switch 117 is electrically controlled by the calibration processor 124. The circulator is provided so that the transmitter and receiver can use antenna elements 111 in common.

In case of transmission for communication, the signal transmitted from each of the transmitting parts 115 passes through the circulator 113, and is radiated as a wireless signal from the antenna elements 111. In addition, in the case of carrying out reception for communication, the signal received by the antenna elements 111 passes through the circulator 113, and is input into the receiver 118.

In this example, the frequency of the signal output by the transmitting part 115, that is, the transmission frequency of the array antenna to be used for communication, is f1, the reception frequency of the array antenna and receiver 118 to be used in communication is f2, and the transmission frequency f1 and the reception frequency f2 are different.

Moreover, like the case of FIG. 12, a transmitter (121) that transmits a signal having a frequency the same as the reception frequency f2 of the receiver 118 and the frequency converter (123) are provided in the transmitting part 115.

In the adaptive array antenna transceiver apparatus in FIG. 19, in addition to the N branch units 110, a calibration processor 124, a radiation pattern control processor 125, a signal generator 126, frequency converters 141 and 142, a circulator 143, and the additional antenna 128 are provided.

The circulator 143 inputs a signal having a frequency of f1 from the additional antenna 128, and outputs a signal having frequency f2 to the additional antenna 128. The radiation pattern control processor 125 combines the signals of N branches and controls the weighting of each of the branches during synthesis.

The calibration processor 124 carries out calibration by finding separately the amplitude and phase errors in the transmission system (transmitting part 115 and antenna elements 111) and the reception system (receiver 118 and antenna elements 111) of each of the branch units 110. In practice, the calibration processor 124 finds the value to be used in calibration for the transmission system of each of the branches by executing the control shown in FIG. 20, and the by finding the value to be used for calibration of the reception system for each of the branches by executing the control shown in FIG. 21.

A part of the signal (having frequency f1) transmitted by the transmitting part 115 is separated by the coupler 122, and applied to the input of the frequency converter 141. The frequency converter 141 executes conversion of the frequency by using the signal (having a frequency of |f1−f2|) output by the signal generator 126.

This means that the frequency converter 141 mixes the signal input from the coupler 122 and the signal input from the signal generator 126, and carries out conversion of the frequency. The frequency of the signal input from the coupler 122 is f1 and the signal input from the signal generator 126 is |f1−f2|, and thus a signal having a frequency of f2 is output from the frequency converter 141. The signal output by the frequency converter 141 passes through the circulator 143 and is radiated as an electromagnetic wave from the additional antenna 128.

In addition, in the case that a signal having a frequency of f1 is received by the additional antenna 128, this signal is input into the frequency converter 142 via the circulator 143. The frequency generator executes the conversion of the frequency by using the signal (having a frequency of |f1−f2|) output by the signal generator 126.

This means that the signal having a frequency of f1 received by the additional antenna 128 is converted to a signal having a frequency of f2 and output from the frequency converter 142. By controlling the switch 117, the signal output by the frequency converter 142 can be input into the receiver 118(1).

In this example, the frequency of the signal output by the transmitting part 115 is f1, the frequency received by the receiver 118 is f2, and thus the signal output by the transmitting part 115 cannot be received as-is by the receiver 118. However, by carrying out conversion of the frequency by using the frequency converters 141 and 142, the signal transmitted from the transmitting part 115 can be received by the receiver 118.

Like the fourth embodiment, the signal having a frequency of |f1−f2| output from the signal generator 126 can be generated by using the local signal of the receiver and the local signal of the transmitter. This means that the signal generator 126 can be realized by the circuit shown in FIG. 10 or the circuit shown on FIG. 11.

Moreover, in the circuit shown in FIG. 19, a signal via the coupler 122 is extracted from the output of the transmitting part 115 because the output of the receiver 118 is large compared to the tolerated input level of the circuit on the receiver side. By using the coupler 122, a signal having a comparatively small level can be extracted from the output of the transmitting part 115.

The position at which the additional antenna 128 is disposed must be determined depending on the positions of the N antenna elements 111 that form the array antenna. As shown in FIG. 15A, in the case that the array elements 111 are arranged spaced at equal intervals on one straight line, the additional antenna must be disposed at the middle position between, for example, two antenna elements 111, such that the distances d between each of these antenna elements 111 and the additional antenna 128 are equal.

Figure 15B:
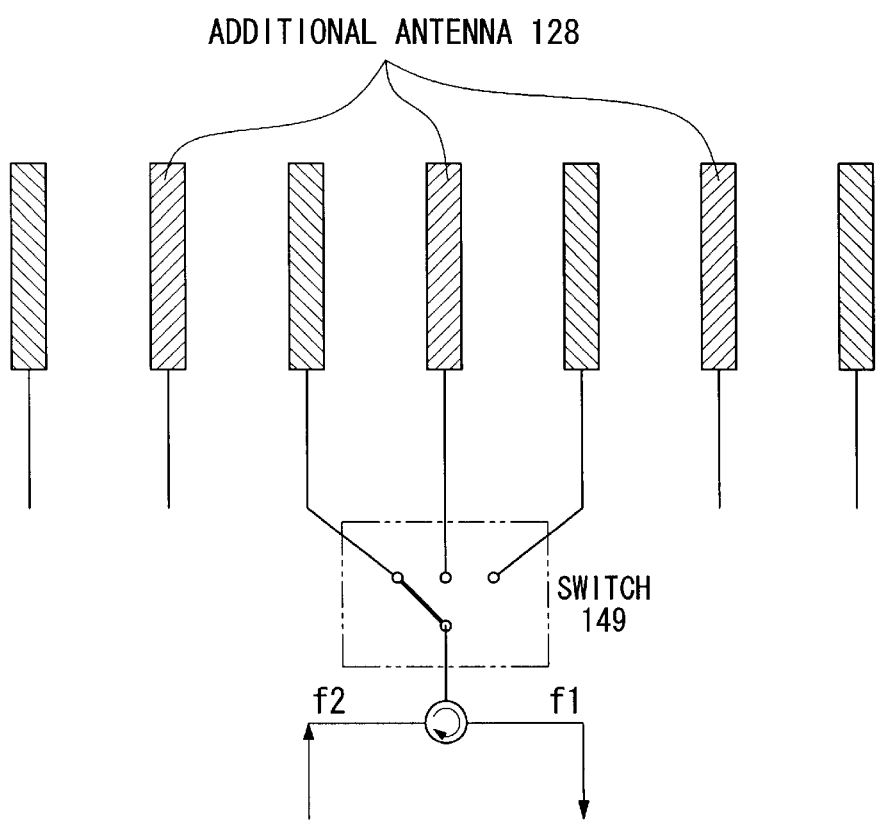

Moreover, as shown in FIG. 15A, in the case that a plurality of additional antennas 128 are used, as shown in FIG. 15B, one of the plurality of additional antennas 128 is selectively connected to a circulator using the switch 149.

In addition, as shown in FIG. 16, in the case that the antenna elements 111 are disposed side by side at equal intervals on one circle, the additional antenna 128 can be disposed at the center position of the circle. In this case, the distances d between the antenna elements 111 and the additional antenna 128 are equal for any of the branches.

When the additional antennas 128 are disposed in this manner, the transmission losses between each of the antenna elements 111 and the additional antenna 128 are equal, and a calibration value that is not influenced thereby can be found.

Next, the calibration control procedure shown in FIG. 20 will be explained. Moreover, in this example, the first branch unit 110(1) is assigned to serve as the reference branch, but another branch can serve as the reference. That is, the coupler 122 and the switch 117 can be provided on any one of the branch units 110. In addition, when starting the calibration control procedure in FIG. 20, it is assumed that all of the transmitting parts 115(1) to 115(N) have stopped transmitting.

In step S 150, the value of the counter i is initialized. The value of the counter i corresponds to the one branch that is the object of calibration. In step S 152, by controlling switch 117, the output of the frequency converter 142 is connected to the input of the receiver 118(1) of the reference branch.

The processing of steps S 153 to S 160 that follow are repeatedly executed depending on the value of the counter i.

In step S 153, the signal (having a frequency f1) is transmitted from the ith transmitting part 115(j). In this case, the signal output by the transmitting part 115(i) passes through the circulator 113(i) and is transmitted as a wireless signal from the antenna element 111(i).

This wireless signal is received by the additional antenna 128. The signal received by the additional antenna 128 passes through the circulator 142, and is input into the receiver 118(1).

Thus, in step 154, the signal K(i) received by the receiver 118(i) is measured. After the measurement has completed, in the next step S 155, the transmission of the transmitting part 115(i) is stopped.

By repeating the processing of steps S 153 to S 160, the signals output from the transmitting parts 115 included in the respective N branches pass through the path through the antennas (111 and 128) of each of the branches, are respectively received by the receiver 118(1), and the signals K(1) to K(N) are measured.

In the first process, the counter i is 1, and thus the processing proceeds from S 156 to S 158. Moreover, the signal K(1) first obtained is saved as the signal of the reference branch.

In addition, the second time and thereafter, because the counter i is not 1, the processing proceeds from step S 156 to S 159. In step S 159, the calibration value H(i) is found by the calculation of the following equation:

$$H(i) = K(i)/K(1) \tag{121}$$

When the processing of all of the branches has finished, the calibration values H(i) are found separately as relative values for each of the second to Nth respective branches. In this example, because the first branch is the reference, naturally the calibration value H(i) of the first branch is 1.

Figure 20:
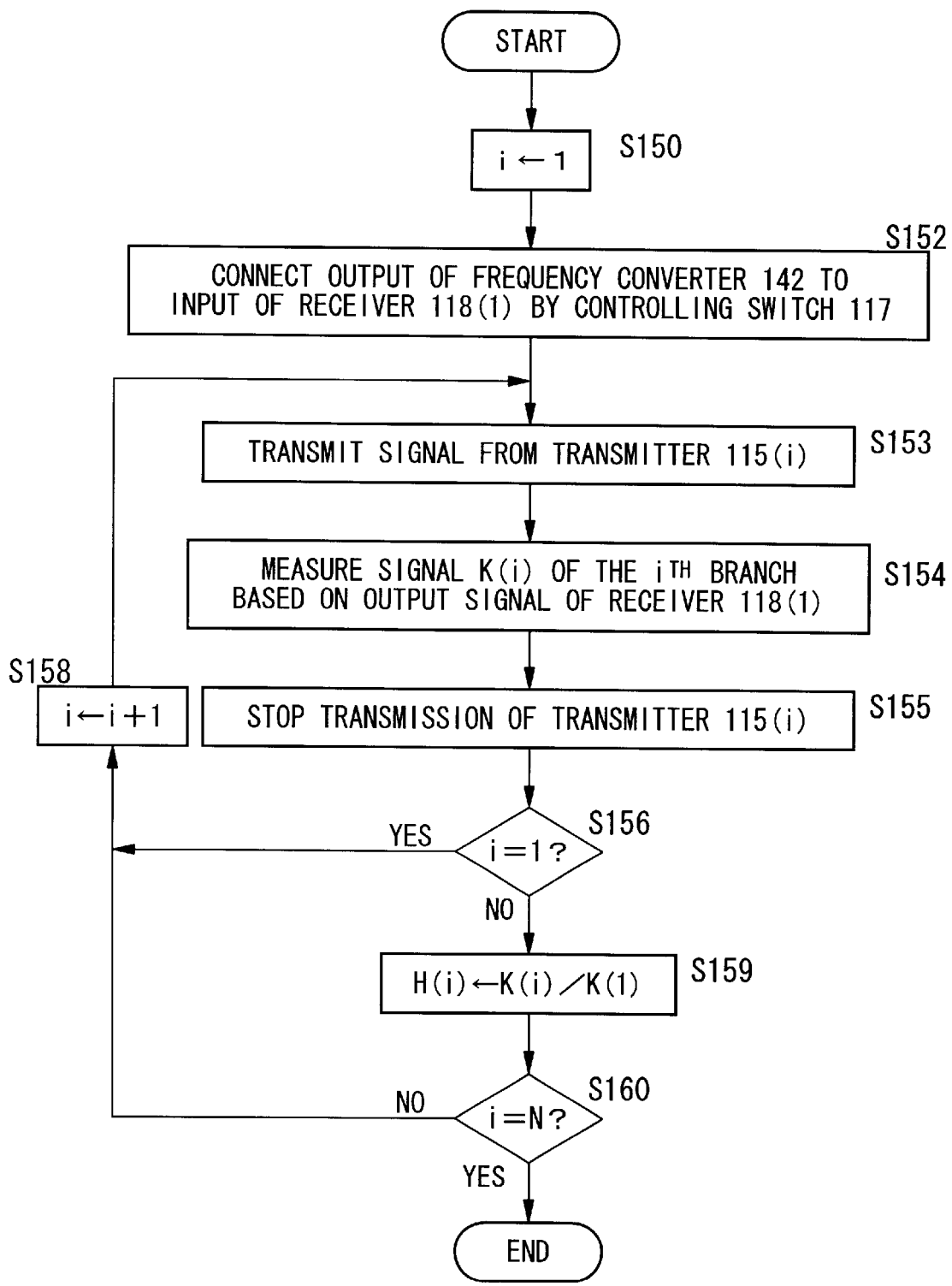
FIG. 20 is a processing chart showing the calibration control processing of the receiver according to the sixth embodiment.

The amplitude and phase values K(i) measured in step S 154 in FIG. 20 are represented by the following equation:

$$K(i) = T(i) \cdot M(i, f1) \cdot L(i) \cdot M(a, f1) \cdot Q2 \cdot R(1) \tag{122},$$

where:

T(i): amplitude and phase produced by the transmitting part 115(i),

M(i, f1): the amplitude and phase related to f1 of the antenna element 111(i),

M(a, f1): the amplitude and phase related to f1 of the additional antenna 128,

L(i): the transmission losses between the antenna elements 111(i) and the additional antenna 128, Q2: the amplitude and phase of the frequency converter 142, and R(1): the amplitude and phase of the receiver 118(1).

In this embodiment, the additional antenna 128, the frequency converter 142, and the receiver 119(1) are used in common in the measurement of the branch that corresponds to the counter i, and thus, their components are in common. Therefore, by rearranging the Equation 121 above, the following equation is obtained:

$$\begin{aligned}H(i) &= K(i)/K(1) \\ &= (T(i) \cdot M(i, f1) \cdot L(i) \cdot M(a, f1) \cdot Q2 \cdot R(1))/ \\ &\quad (T(1) \cdot M(1, f1) \cdot L(1) \cdot M(a, f1) \cdot Q2 \cdot R(1)) \\ &= (T(i) \cdot M(i, f1) \cdot L(i))/(T(1) \cdot M(1, f1) \cdot L(1))\end{aligned} \tag{123}$$

In addition, in this embodiment, because it is assumed that the distances between the antenna elements 111(i) and the additional antenna 128 is identical for all branches which are objects of calibration, the transmission losses L(i) are identical for all of the branches. Therefore, by rearranging the Equation 123, the following equation is obtained:

$$\begin{aligned}H(i) &= (T(i) \cdot M(i, f1) \cdot L(i))/(T(1) \cdot M(1, f1) \cdot L(1)) \\ &= (T(i) \cdot M(i, f1))/(T(1) \cdot M(1, f1))\end{aligned} \tag{124}$$

This means that the amplitude and phase values of the entire transmission system of the ith branch, which are a combination of the component T(i) of the amplitude and phase of related to the f1 of the transmitting part 115(i) and the component M(i, f1) of the amplitude and phase related to f1 of the antenna element 111(i), can be found for each of the branches as a ratio with the other branches.

Moreover, the measured amplitude and phase values fluctuate due to the influence of fluctuations in the temperature characteristics, etc., with the passage of time, but the component Q2 thereof is cancelled out in the Equation 124 above, and thus the influence of the temperature characteristics do not appear in the calibration value H(i).

In this manner, by using only a single additional antenna 128, the calibration value of each of the branches can be found as a relative value with respect to the reference branch. When transmitting with each of the branches, by multiplying the amplitude and phase values of the transmitting part 115(i) by the calibration value H(i) obtained by the calibration control procedure in FIG. 20, the error in the amplitude and phase values between branches in the transmitting part 115 can be compensated.

Next, the calibration control procedure shown in FIG. 21 will be explained. Moreover, in this example, the first branch unit 110(1) is assigned to serve as the reference branch, but another branch can be used as the reference.

In step S 170, the value of the counter i is initialized. The value of the counter i corresponds to the one branch that is the object of calibration. In step S 171, by controlling switch 117, the input of the receiver 118(1) is connected to the circulator 113(1).

In step S 172, the signal from the transmitting part 115(1) of the reference branch is transmitted.

In this case, the signal output from the transmitting part 115(1) is separated by the coupler 122, and after the signal having a frequency of f2 is converted by the frequency converter 141, it passes through the circulator 143, and is transmitted from the additional antenna 128 as a wireless signal.

The wireless signal transmitted from the additional antenna 128 can be received by the antenna element 111 of each of the branches. In addition, the frequency of the signal transmitted from the additional antenna 128 is converted to f2, and thus the signal received by the antenna elements 11 can be input and detected directly at the receiver 118.

The processing of steps S 173 to S 178 is repeatedly executed depending on the value of the counter i. Each time these processes are executed, in step S 176, the value of the counter i is updated.

In step S 173, the signal (amplitude and phase values) S(i) of the branch can be measured from the received output of the receiver 118(i) of the ith branch.

By repeating the processing of steps S 173 to S 178, the signals output from the transmitting part 115(1) of the reference branch pass through the path through the antennas (111 and 128) of each of the branches, are respectively received by the receiver 118(1), and the signals S(1) to S(N) are measured.

In the first process, the counter i is 1, and thus the processing proceeds from S 174 to S 176. Moreover, the signal S(1) first obtained is saved as the signal of the reference branch.

In addition, the second time and thereafter, because the counter i is not 1, the processing proceeds from step S 174 to S 177. In step S 177, the calibration value P(i) is found by the calculation of the following equation:

$$P(i)=S(i)/S(1) \qquad (125)$$

When the processing of all of the branches has finished, the calibration values P(i) are found separately for each of the second to Nth respective branches. In this example, because the first branch is the reference, naturally the calibration value P(i) of the first branch is 1.

The amplitude and phase values S(i) measured in step S 173 in FIG. 21 are represented by the following equation:

$$S(i)=T(1) \cdot Q1 \cdot M(a, f2) \cdot L(i) \cdot M(i, f2) \cdot R(i) \qquad (126),$$

where:

T(1): amplitude and phase produced by the transmitting part 115(1),

Q1: the amplitude and phase related to the frequency converter 141,

M(a, f2): the amplitude and phase related to f2 of the additional antenna 128,

L(i): the transmission losses between the antenna elements 111(i) and the additional antenna 128, M(i,f2): amplitude and phase related to f2 of the antenna element 111(i), and R(i): the amplitude and phase of the receiver 118(i).

In this embodiment, it is assumed that the distances between the antenna elements 111(i) of all the branches and the additional antenna 128 are identical, and thus the transmission losses L1(i) for all branches are identical.

In addition, the frequency converter 141 and the additional antenna 128 are used in common in the measurement of all of the branches, and thus their components are in common. Therefore, by rearranging the Equation 125 above, the following equation is obtained:

$$\begin{aligned}
P(i) &= S(i)/S(1) \qquad (127)\\
&= (T(1) \cdot Q1 \cdot M(a, f2) \cdot L(i) \cdot M(i, f2) \cdot R(i))/\\
&\quad (T(1) \cdot Q1 \cdot M(a, f2) \cdot L(1) \cdot M(1, f2) \cdot R(1))\\
&= (L(i) \cdot M(i, f2) \cdot R(i))/(L(t) \cdot M(1, f2) \cdot R(1))\\
&= (M(i, f2) \cdot R(i))/(M(1, f2) \cdot R(1))
\end{aligned}$$

This means that, as shown in FIG. 18, the amplitude and phase values of the entire reception system of the ith branch, which are a combination of the component R(i) of the amplitude and phase of reception part 118(i) and the component M(i, f2) of the amplitude and phase related to f2 of the antenna element 111(i), can be found for each of the branches as a ratio with respect to the reference branch.

Therefore, when receiving at each of the branches, by multiplying the amplitude and phase values of each of the receivers 118(i) by the calibration value P(i) obtained by the calibration control procedure in FIG. 21, the error of the amplitude and phase values between branches in the reception system can be compensated.

Moreover, because the transmission and reception of the signal needs to be done only between the additional branch 128 and the antenna element 111 positioned in proximity thereto, having a high gain, as with the general antenna used in communication, is not necessary. Therefore, it is sufficient to use an ultra-small type antenna or a probe as the additional antenna 128.

The fluctuation component Q1 of the amplitude and phase values due to temperature characteristics in the Equation 126 above in practice includes the fluctuation component in the transmitting part 115 of each of the branches, the fluctuation component in the receiver 118, and the fluctuation components in the frequency converter 141 used in calibration.

The characteristics of the frequency converter 141 change with respect to the temperature fluctuations that accompany the passage of time, but because a frequency converter 141 is used in common when measuring the amplitude and phase values of any branch in the calibration processing, the fluctuation component Q1 of the amplitude and phase values of a single frequency component 141 does not influence the found calibration value.

Seventh Embodiment

The seventh embodiment of the adaptive array antenna transceiver apparatus of the present invention will be explained referring to FIG. 22 to FIG. 24.

Figure 22:
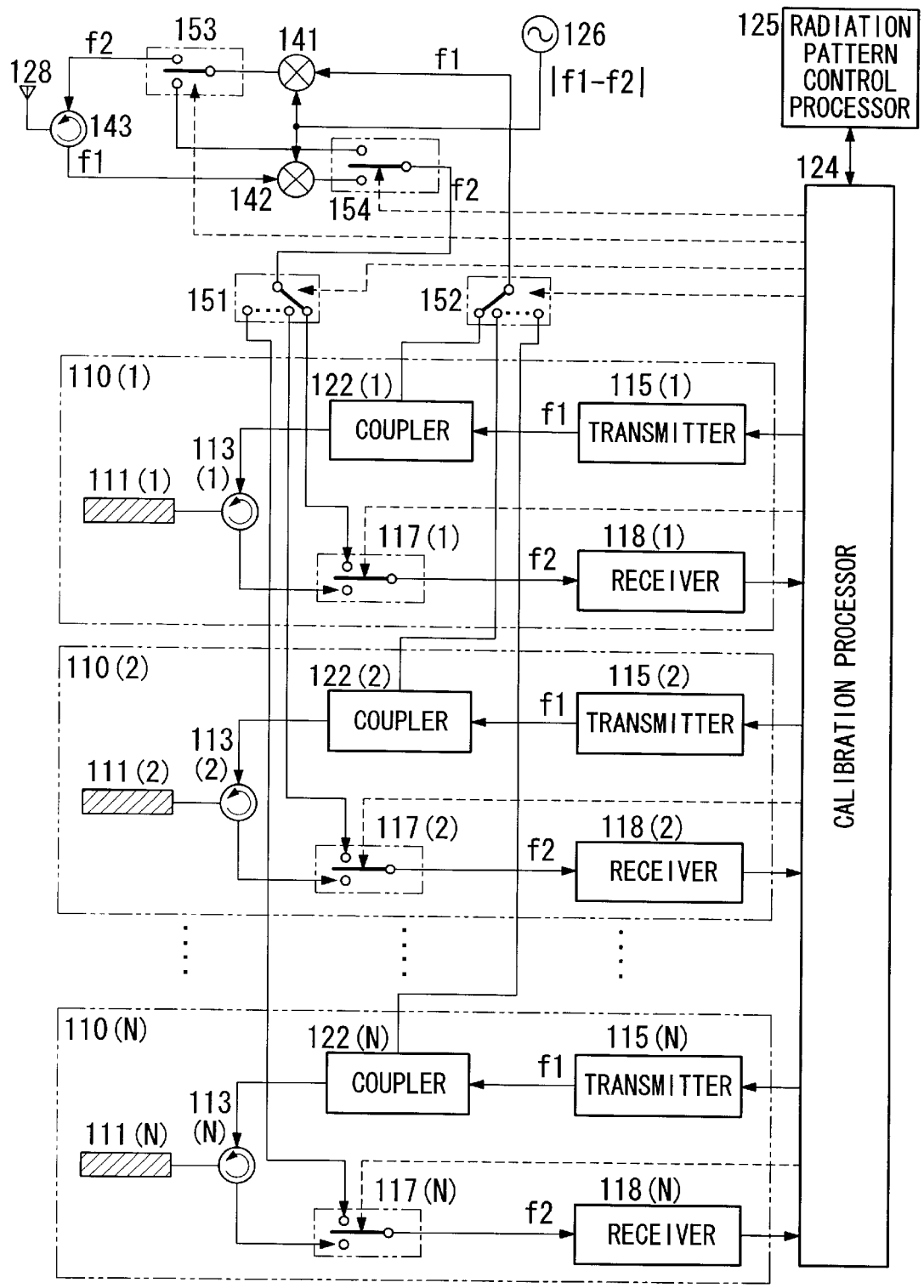
FIG. 22 is a block diagram showing the structure of the adaptive array antenna transceiver apparatus according to the seventh embodiment.

FIG. 22 is a block diagram showing a structure of the adaptive array antenna transceiver apparatus of this embodiment. FIG. 23 is a flowchart showing the calibration control procedure for the transmitter of this embodiment.

Figure 24:
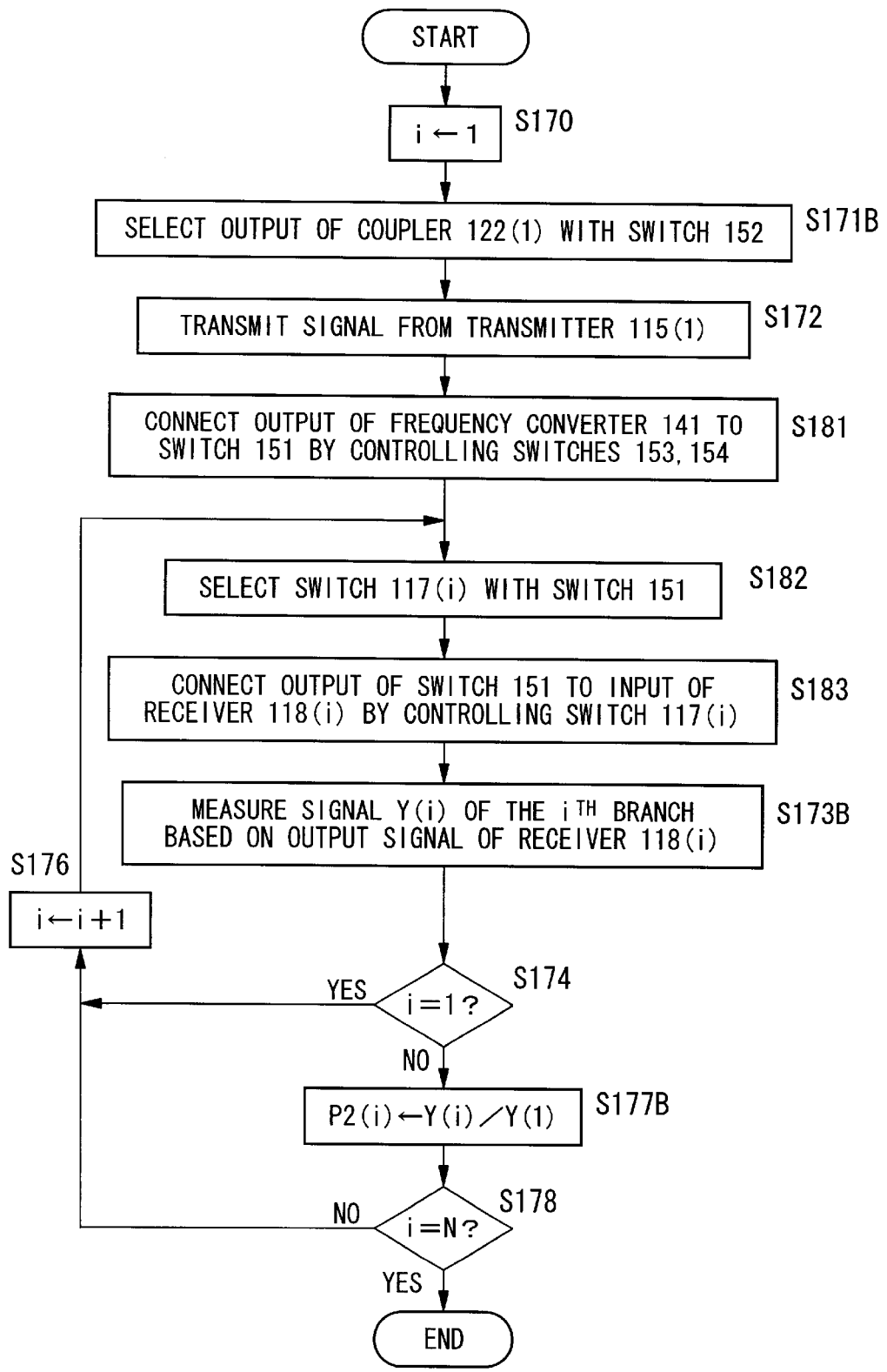
FIG. 24 is a processing chart showing the calibration control processing of the receiver according to the seventh embodiment.

FIG. 24 is a flowchart showing the calibration control procedure for the receiver of this embodiment.

This embodiment is an example of a modification of the sixth embodiment. In FIG. 22 to FIG. 24, the elements corresponding to those in FIG. 19 to FIG. 21 are indicated with the same reference numbers. The explanations of the elements that are identical to those in the sixth embodiment are omitted.

Moreover, the adaptive array antenna transceiver apparatus of this embodiment includes a coupler 122, which is an example of a branching device.

In an adaptive array antenna transceiver apparatus, for example, the part of the antenna and current supply are influenced by rapid environmental fluctuations such as temperature with comparative difficulty. However, the high frequency circuits such as transmitters, receivers, electrical amplifiers, and frequency converters are comparatively easily influenced by temperature fluctuations in the electrical amplifier and the circulators, for example.

Therefore, it is sufficient to that the calibrations related to the antenna and power supply be carried out at a comparatively infrequent interval, but the calibration of the high frequency circuits such as transceivers must be carried out at comparatively short time intervals.

Thus, in this embodiment, the antenna is structured such that calibration can be implemented for separate transceivers independently. Moreover, calibrations that include the antenna can be realized by the same processing as that used in the sixth embodiment, and the explanation thereof will be omitted.

Referring to FIG. 22, in this embodiment, the coupler 122 and switch 117 for each of the branch units 110. In addition, switches 151, 152, 153, and 154 are added. The switches 151, 152, 153, and 154 are all structured so as to be electrically controllable, and are connected such that their state can be changed by the control of the calibration processor 124.

The switch 154 selectively connects one of any of the N couplers 122(1) to 122(N) to the input of the frequency converter 141. The switch 153 selectively outputs the signal output by the frequency converter 141 to either one of the circulator 143 or switch 154.

The switch 154 selectively outputs either the signal output by the frequency converter 141 or the signal output by the frequency converter 142 to the switch 151. The switch 151 selectively outputs the signal input via the switch 154 to the switches 117 of any one of the N branches.

Next, the calibration control procedure shown in FIG. 23 will be explained. Moreover, in this example, the first branch unit 110(1) is assigned to serve as the reference branch, but other branches can serve as the reference. In addition, it is assumed that when the calibration control procedure in FIG. 23 starts, all of the transmitting parts 115(1) to 115(N) stop transmitting.

In step S 150, the value of the counter i is initialized. The value of the counter i corresponds to the one branch that is to be the object of calibration.

In step S 152B, by controlling switch 117(1) of the reference branch, the output of the switch 151 is connected to the input of the receiver 118(1) of the reference branch. In addition, by controlling switches 153 and 154, the output of the frequency converter 141 is connected to switch 151.

The processing of steps S 153 to S 169 is thereafter repeatedly executed depending on the value of the counter i.

In step S 153, the signal (having a frequency of f1) from the ith transmitting part 115(i) is transmitted.

In the added step S 161, first the output of the coupler 122(i) of the ith branch is selected by the switch 152, and in step S 151 the switch 117(1) of the reference branch is selected.

In this case, the signal output by the transmitting part 115(i) is split by the coupler 122(i), passes through the switch 152, is input into the frequency converter 141, and converted to a signal having a frequency of f2. In addition, the signal output by the frequency converter 141 passes through switch 153, passes through the switch 154, passes through the switch 151, passes through the switch 117(1) of the reference branch, and is applied to the input of the receiver 118(1).

Thus, in step S 154, the receiver 118(1) measures the reception signal X(i). After measurement has finished, in the next step S 155, the transmission of the transmitting part 115(i) stops.

By repeating the processing of steps S 153 to S 160, the signal output from the transmitting parts 115 included in respective N branches passes through the path that does not transit the antennas (111, 128), is received in receiver 118(1), and signals X(1) to X(N) are measured.

In the first process, because the counter i is 1, the processing advances to steps S 156 to S 158. The signal X(1) first obtained is saved as the signal of the reference branch.

In addition, in the processing of the second time and thereafter, because the counter i is not 1, the processing advances from step S 156 to S 159. In step S 159, the calibration value H2(i) is found by the calculation of the next equation:

$$H2(i)=X(i)/X(1) \tag{128}$$

When the processing for all of the branches has finished, the calibration values H2(i) are found separately as relative values for the respective second to Nth branches. In this example, because the first branch is the reference branch, of course, the calibration value H2(i) of the first branch is 1.

The amplitude and phase values X(i) measured in step S 154B of FIG. 22 are represented by the following equation:

$$X(i)=T(i) \cdot Q1 \cdot R(1) \tag{129}$$

where

T(i): amplitude and phase values not produced by the transmitting part 115(i),

Q1: the amplitude and phase of the frequency converter 141, and

R(1): the amplitude and phase of the receiver 118(1).

In this embodiment, because the frequency counter 141 and the receiver 118(1) are used in common for measuring any of the branches corresponding to the counter i, these components are in common. Therefore, by rearranging the Equation 129, the following equation is obtained:

$$\begin{aligned} H2(i) &= X(i)/X(1) \\ &= (T(i) \cdot Q1 \cdot R(1))/(T(1) \cdot Q1 \cdot R(1)) \\ &= T(i)/T(1) \end{aligned} \tag{130}$$

This means that the amplitude and phase values of the component T(i) of the amplitude and phase related to the f1 of the transmitting part 115(i) of the ith branch are found for each of the branches as the ratio of the reference branch (1).

Moreover, the measured amplitude and phase values fluctuate due to the influence of the temperature characteristics, etc., that change through time, but the component Q1 thereof is cancelled in Equation 130 above, and thus the influence of temperature characteristics does not appear in calibration value H2(i).

In this manner, without using the antenna element 111 and the additional antenna 128, the calibration value H2(i) of each of the branches can be found as a relative value with respect to the reference branches. Of course, by the processing explained in the sixth embodiment, the calibration values of the whole, including the antenna elements 111 must be found, but the calibration values of the whole including the antenna elements 111 only need to be applied at comparatively infrequent intervals.

Figure 23:
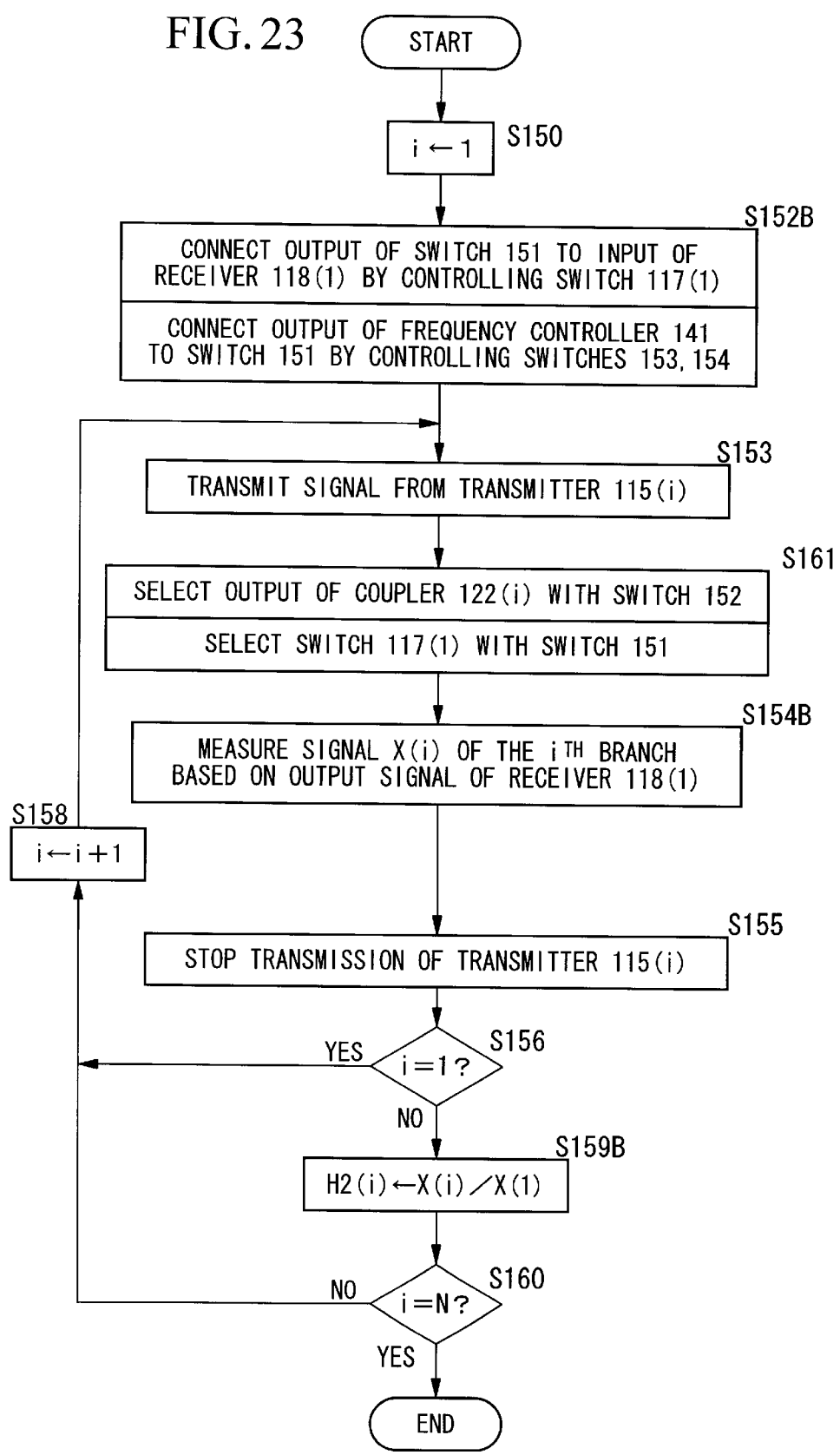
FIG. 23 is a processing chart showing the calibration control processing of the receiver according to the seventh embodiment.

When transmitting by each of the branches, the amplitude and phase values of each of the transmitting parts 115(i) are multiplied by the calibration value H2(i) obtained by the calibration control procedure in FIG. 23, and the error of the amplitude and phase values between branches in the transmitting part 115 can be compensated.

Next, the calibration control procedure shown in FIG. 14 will be explained. Moreover, in this example, the branch unit 110(1) has been assigned to serve as the reference branch, but other branches can serve as the reference.

In step S 170, the value of the counter i is initialized. The value of the counter i corresponds to the one branch that is to be the object of calibration. In the next step S 171B, the output of the coupler 122(1) of the reference branch is selected by the switch 152.

In step S 172, the signal from the transmitting part 115(1) of the reference branch is transmitted.

In this case, the signal output from the transmitting part 115(1) is split by the coupler 122(1), passes through the switch 152, is input into the frequency converter 141, and converted to a signal having a frequency of f2 by the frequency converter 141.

In the additional step S 181, the output of the frequency converter 141 is connected to the switch 151 by controlling the switches 153 and 154. In addition, in step S 182, by controlling switch 151, the ith switch 117(i) is selected. In step S 183, by controlling switch 117(i), the output of switch 151 is connected to the input of the receiver 118(i).

Therefore, the signal output from the transmitting part 115(1) of the reference branch passes through the coupler 122(1) and the switch 152, is input into the frequency converter 141, and the signal output from the frequency converter 141 passes through the switches 153, 154, 151, 117, and (i), and is input into the receiver 118(i).

This means that the signal from the transmitting part 115(1) can be received by each of the receivers 118 without passing through the additional antenna 128 and the antenna elements 111. In addition, because the frequency of the signal is changed to f2 by the frequency converter 141, the receiver 118 can detect as-is the input signal.

In step S 173, the signal (amplitude and phase values) Y(i) of this branch is measured from the received output of the receiver 118(i) of the ith branch.

By repeating the processing in steps S 173 to S 178, the signal output from the transmitting part 115(1) of the reference branch is received by the receiver 118(i) of each of the branches by passing through the path not transiting the antenna (111, 128) of each of the branches, and the signals Y(1) to Y(N) are measured.

In the first process, because the counter i is 1, the processing advances to S 174 to S 176. The signal Y(1) obtained by the first processing is stored as the signal of the reference branch.

In addition, in the processing of the second time and thereafter, because the counter i is not 1, the processing advances from step S 174 to S 177B. In step S 177, the calibration value P2(0) is found by the calculation of the following equation:

$$P2(i)=Y(i)/Y(1) \tag{131}$$

When the processing for all of the branches has finished, the calibration values P2(i) are found separately for the respective second to Nth branch. In this example, because the first branch is serving as the reference, naturally the calibration value P2(i) of the first branch is 1.

The amplitude and phase values Y(i) measured in step S 173B in FIG. 24 are represented by the following equation:

$$Y(i)=T(1) \cdot Q1 \cdot R(i) \tag{132}$$

where

T(1): amplitude and phase values of the transmitting part 115(1),

Q1: the amplitude and phase of the frequency converter 141, and

R(i): the amplitude and phase of the receiver 118(i).

In this embodiment, because the transmitting part 115(1) and the frequency counter 141 are used in common for measuring all of the, these components are in common. Therefore, by rearranging the Equation 131, the following equation is obtained:

$$\begin{aligned}
P2(i) &= Y(i)/Y(1) \\
&= (T(1) \cdot Q1 \cdot R(i))/(T(1) \cdot Q1 \cdot R(1)) \\
&= R(i)/R(1)
\end{aligned} \tag{133}$$

This means that the component R(i) of the amplitude and the receiver 118(i) of the ith branch are found for each of the branches as the ratio to the reference branch (1).

Therefore, when receiving at each of the branches, the amplitude and phase values of each of the receivers 118(i) are multiplied by the calibration values P2(i) obtained by the calibration control procedure in FIG. 24, and thereby the error in the amplitude and phase values in the reception system, excluding the antenna and power source, can be compensated.

Eighth Embodiment

Figure 25:
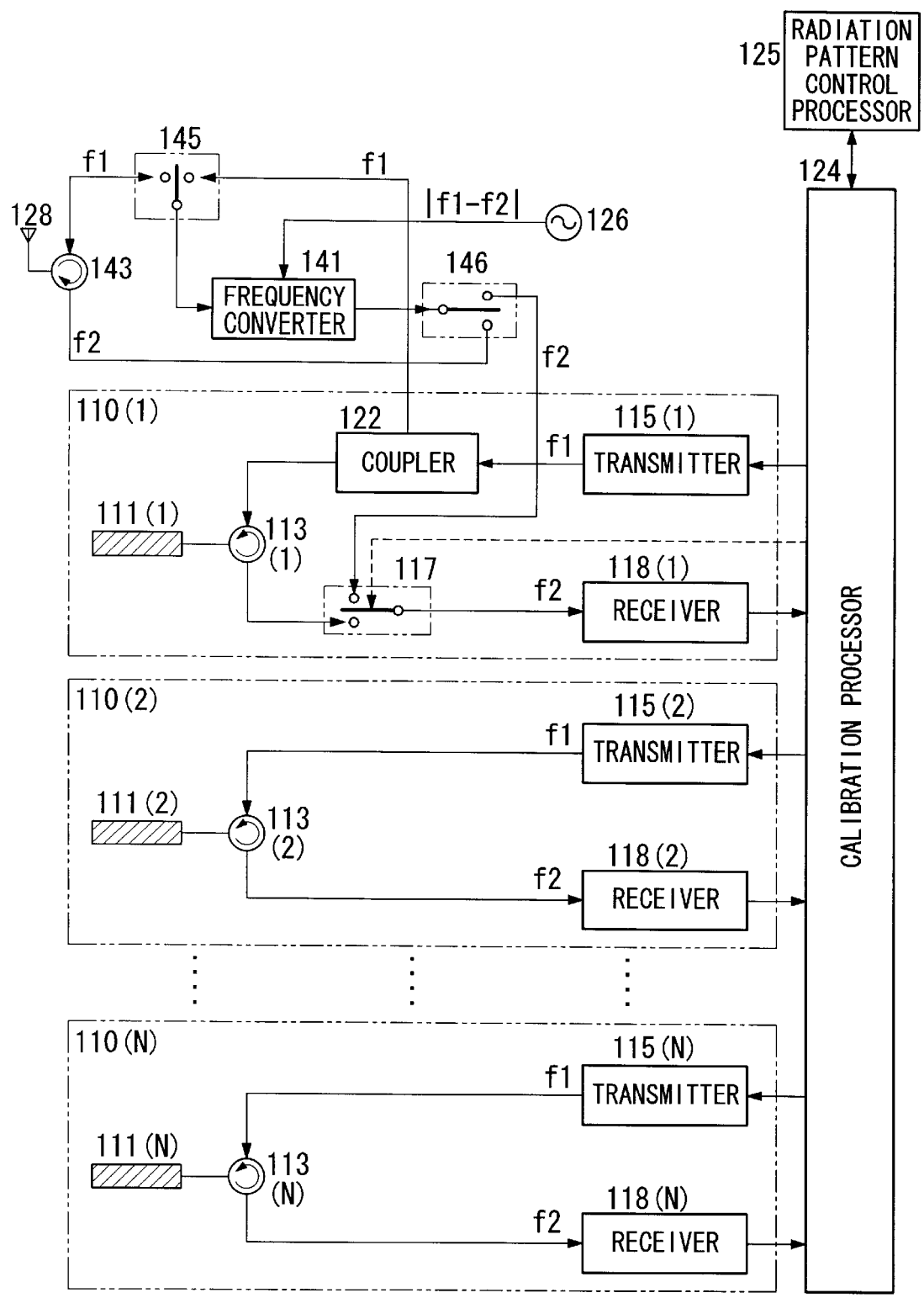
FIG. 25 is a block diagram showing the structure of the adaptive array antenna transceiver apparatus according to the eighth embodiment.

The eighth embodiment of the adaptive array antenna transceiver apparatus of the present invention is shown in FIG. 25. This embodiment is a modification of the sixth embodiment. In FIG. 25, elements corresponding to those in FIG. 19 are denoted by identical reference numerals. The modified parts are explained in the following.

Referring to FIG. 25, the switch 145 is connected to the output of the frequency converter 141, and the output of the frequency converter 141 is connected to the switch 146. The switches 145 and 146 are structured so as to be capable of electric switching, and the state thereof is switched by the control of the calibration processor 124.

The switch 145 selectively inputs into the frequency converter 141 either one of the signal (having the frequency f1) input from the circulator 143 or the signal (having the frequency f2) input from the coupler 122. In addition, the switch 146 selectively inputs the signal (having the frequency f2) output by the frequency converter 141 into either the input of the circulator 143 or the input of the switch 117.

By switching switches 145 and 146, the frequency converter 141 can be used in frequency conversion of the signal for transmission, and can be used in the frequency conversion of the signal for reception. Thereby, the frequency converter 142 is unnecessary.

In this embodiment, in the case that the signal transmitted by the transmitting part 115(1) by the additional antenna 128, by controlling the switch 145, the output of the coupler 122 is connected to the input of the frequency converter 141, and by controlling the switch 146, the output of the frequency converter 1431 is connected to the input of the circulator 143.

In addition, in the case that the signal from the additional antenna 128 is received, by controlling the switch 145, the output of the circulator 143 is connected to the input of the frequency converter 141, and by controlling switch 146, the output of the frequency converter 141 is connected to the input of the switch 117. Other control is identical to that in the sixth embodiment.

Ninth Embodiment

Figure 26:
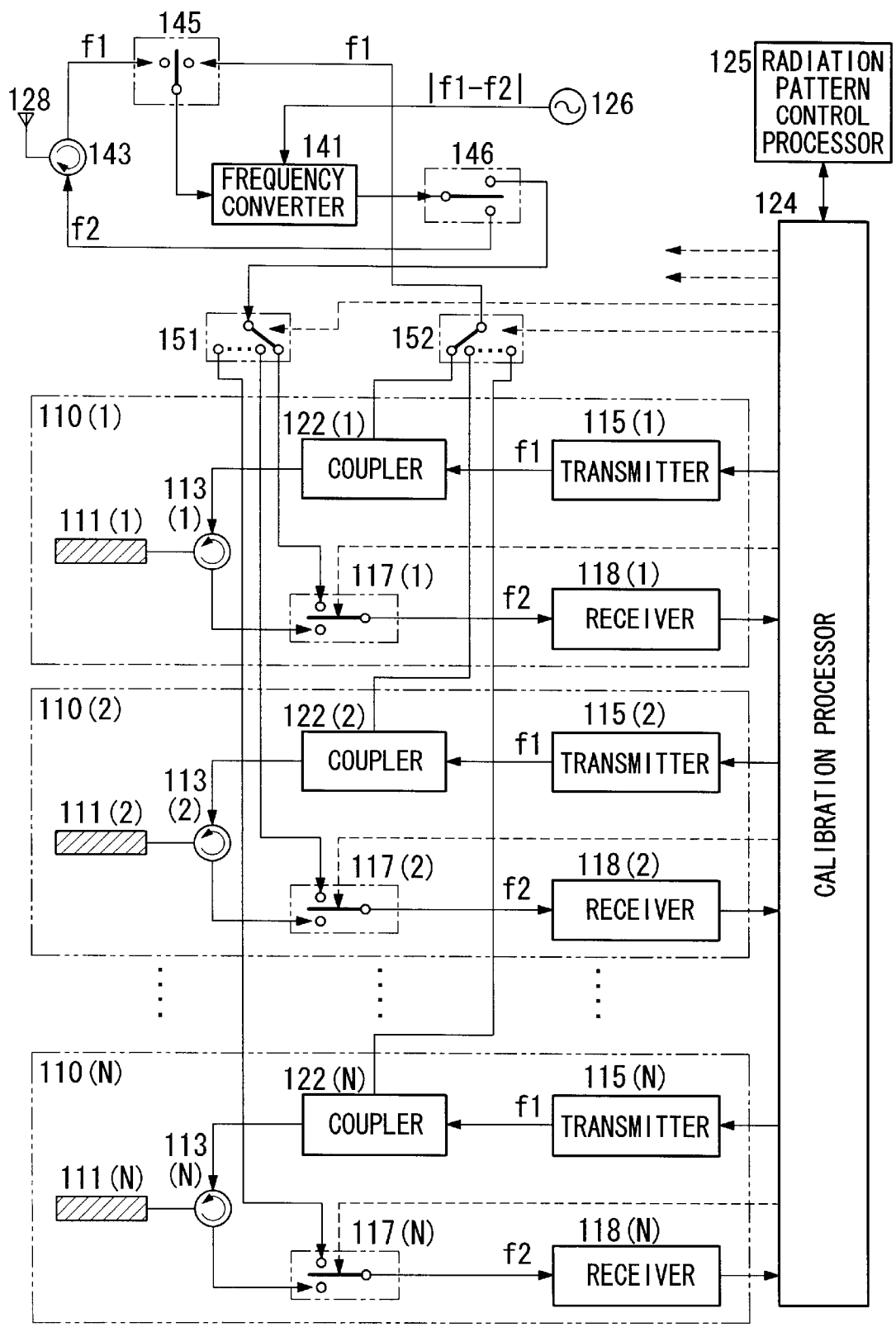
FIG. 26 is a block diagram showing the structure of the adaptive array antenna transceiver apparatus according to the ninth embodiment.

The ninth embodiment of the adaptive array antenna transceiver apparatus of the present invention is shown in FIG. 26. This embodiment is a modification of the seventh embodiment. In FIG. 26, the elements corresponding to those in FIG. 22 are denoted by identical reference numerals. The modified parts are explained in the following.

Referring to FIG. 26, the switch 145 is connected to the output of the frequency converter 141, and the switch 146 is connected to the output of the frequency converter 141. The switches 145 and 146 are structured so as to be capable of electric switching, and the state thereof is switched by the control of the calibration processor 124.

The switch 145 selectively inputs into the frequency converter 141 either the signal (having the frequency f1) input from the circulator 142 or the signal (having a frequency f1) input from the switch 162. In addition, the switch 146 selectively inputs the signal (having a frequency f2) output from the frequency converter 141 into either the input of the circulator 143 or the input of the switch 151.

By switching the switches 145 and 146, the frequency converter 141 can be used for frequency conversion of the signal for transmission and can be used for frequency conversion of the reception signal. Thereby, the frequency converter 142 is unnecessary.

In this embodiment, in the case that the signal transmitted by the transmitting part 115(1) is frequency converted, by controlling switch 145, the output of the switch 152 is connected to the input of the frequency converter 141, and in the case that the signal from the additional antenna 128 is received, by controlling the switch 145, the output of the circulator 143 is connected to the input of the frequency converter 141.

In addition, in the case that calibration including the antenna is implemented, by controlling the switch 146, the output of the frequency converter 141 and the input of the switch 151 are connected. Other control is identical to that of the seventh embodiment.

Tenth Embodiment

The tenth embodiment of the adaptive array antenna transceiver apparatus of the present invention will be explained referring to FIG. 27 to FIG. 30.

Figure 27:
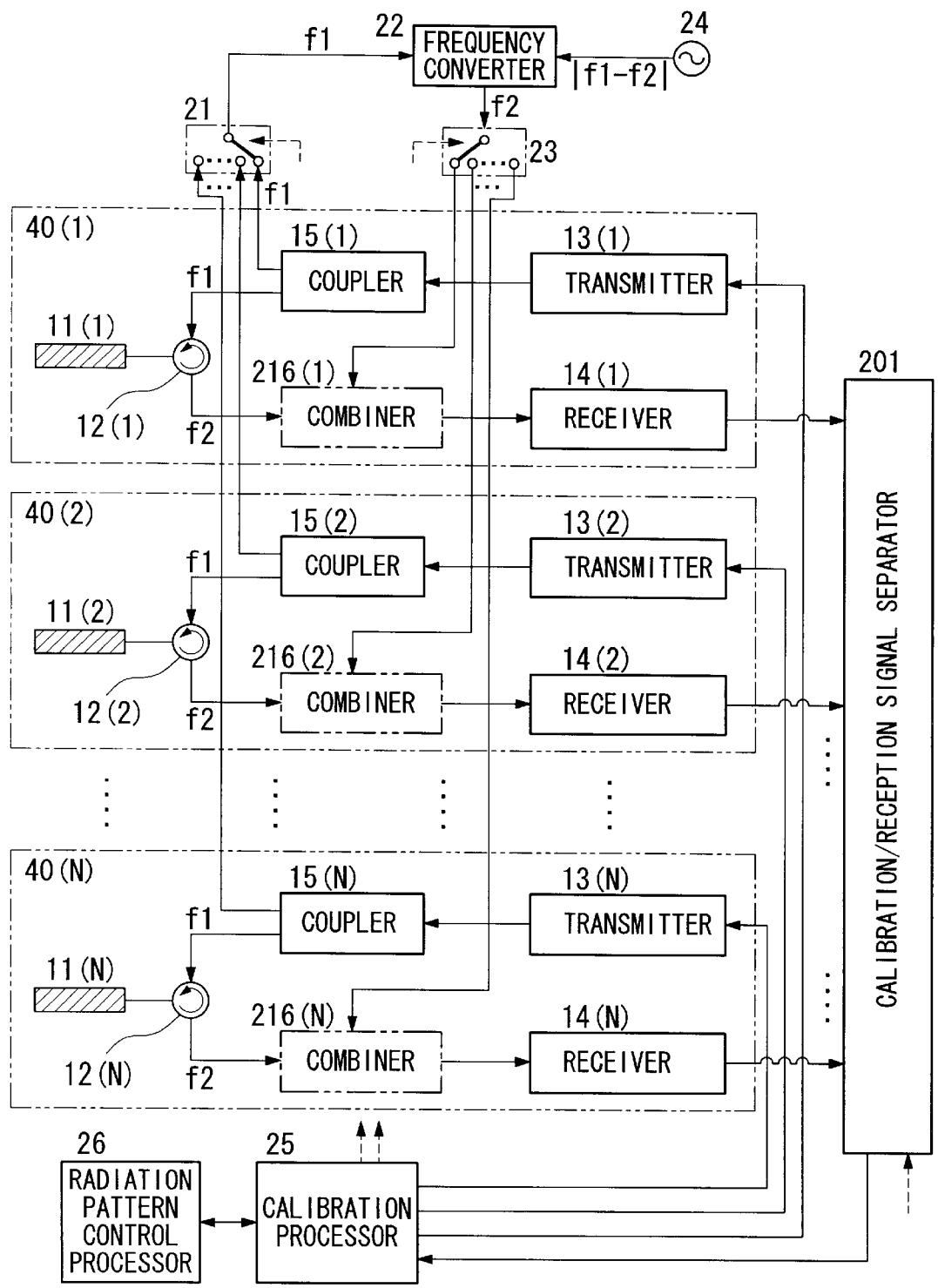
FIG. 27 is a block diagram showing the structure of the adaptive array antenna transceiver apparatus according to the tenth embodiment.
Figure 28:
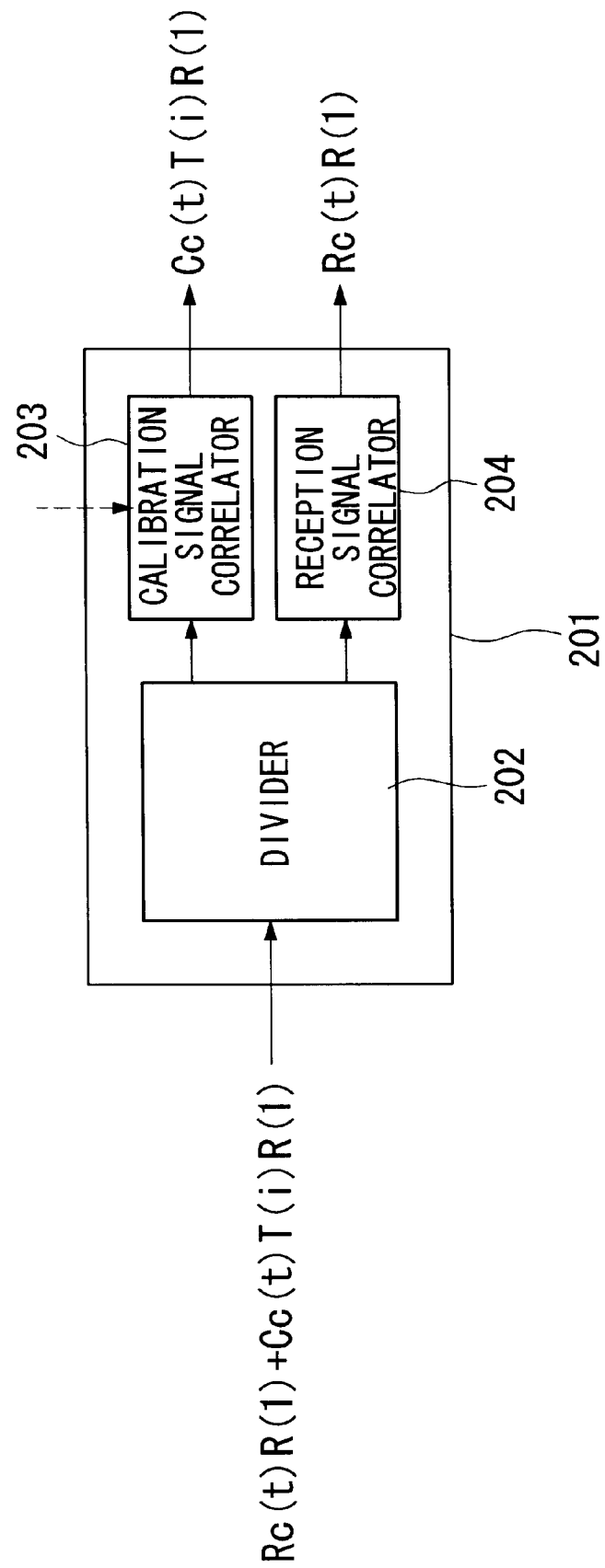
FIG. 28 is a block diagram showing the structure of the calibration/reception signal separator.
Figure 29:
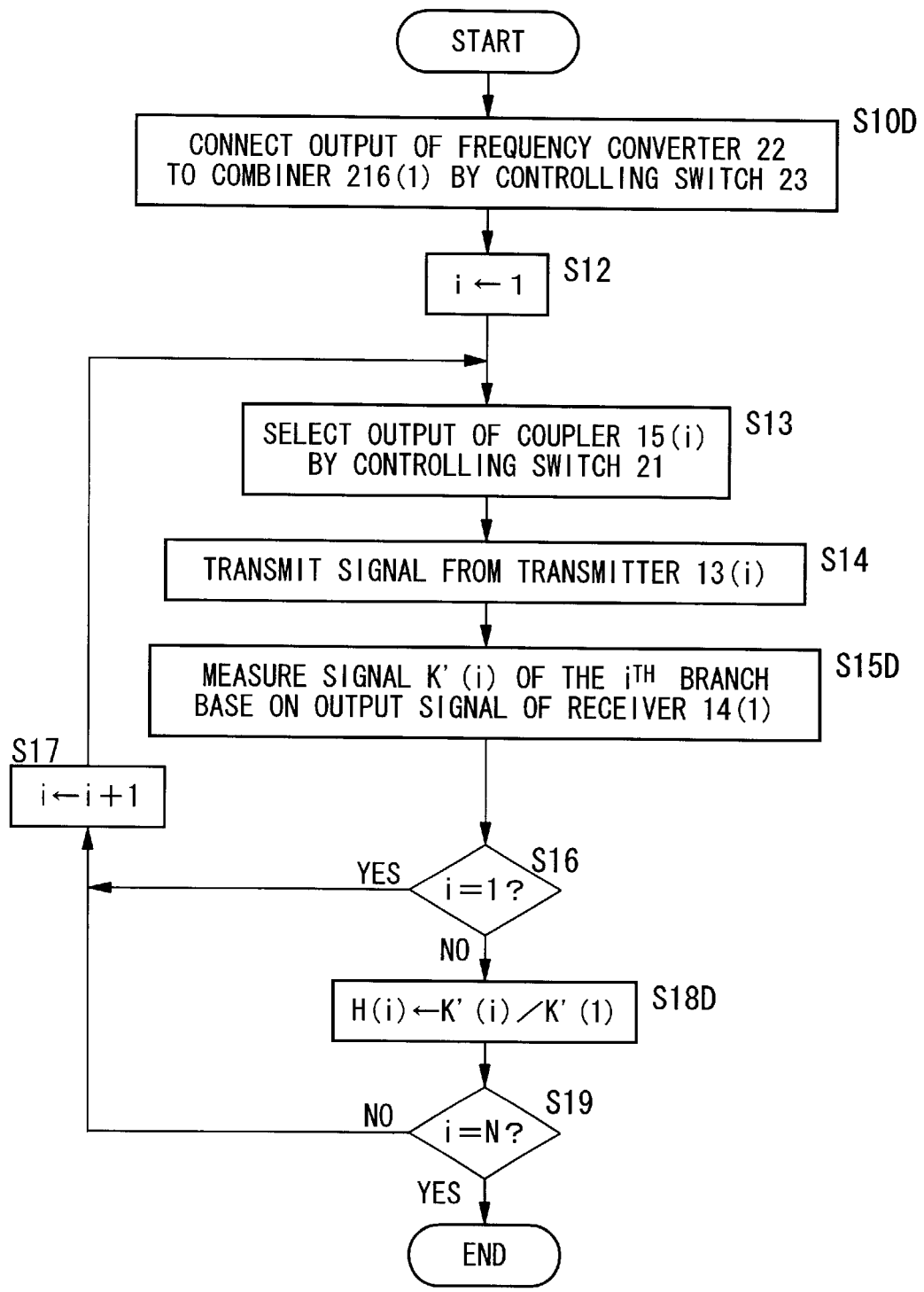
FIG. 29 is a processing chart showing the calibration control processing of the receiver according to the tenth embodiment.
Figure 30:
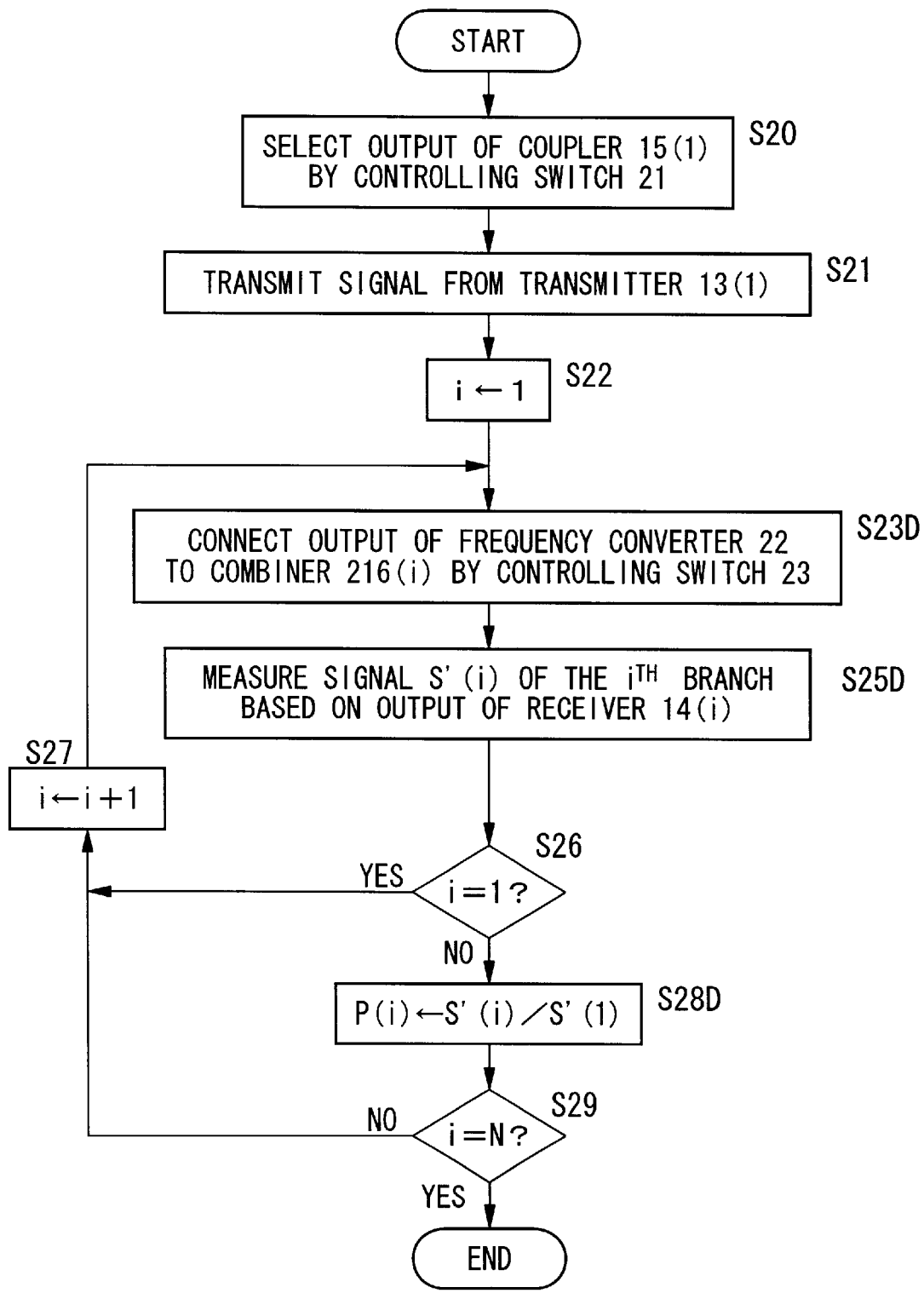
FIG. 30 is a processing chart showing the calibration control processing of the receiver according to the tenth embodiment.
Figure 31:
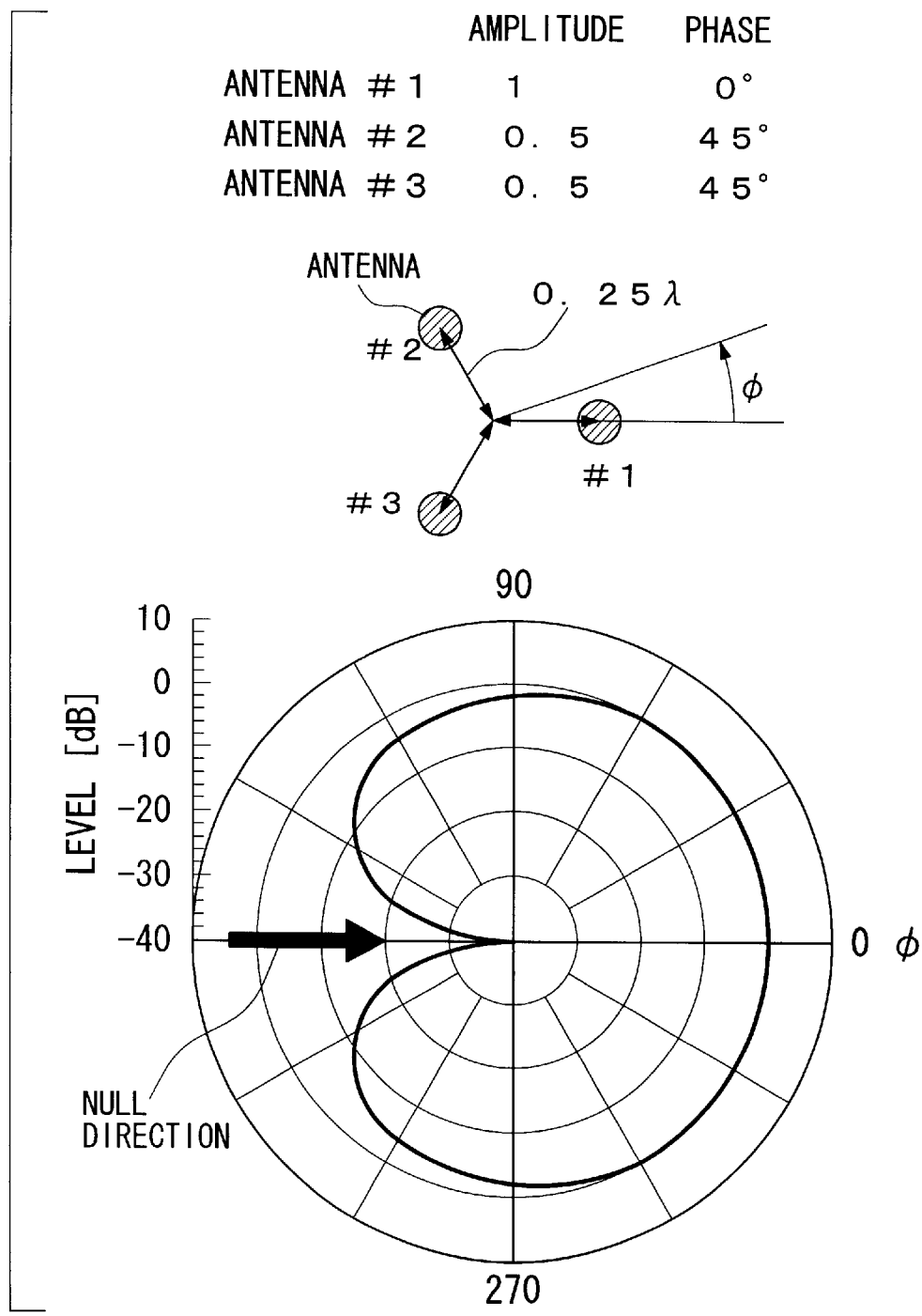
FIG. 31 is a graph showing the structure of the array antenna and the radiation pattern.
Figure 32:
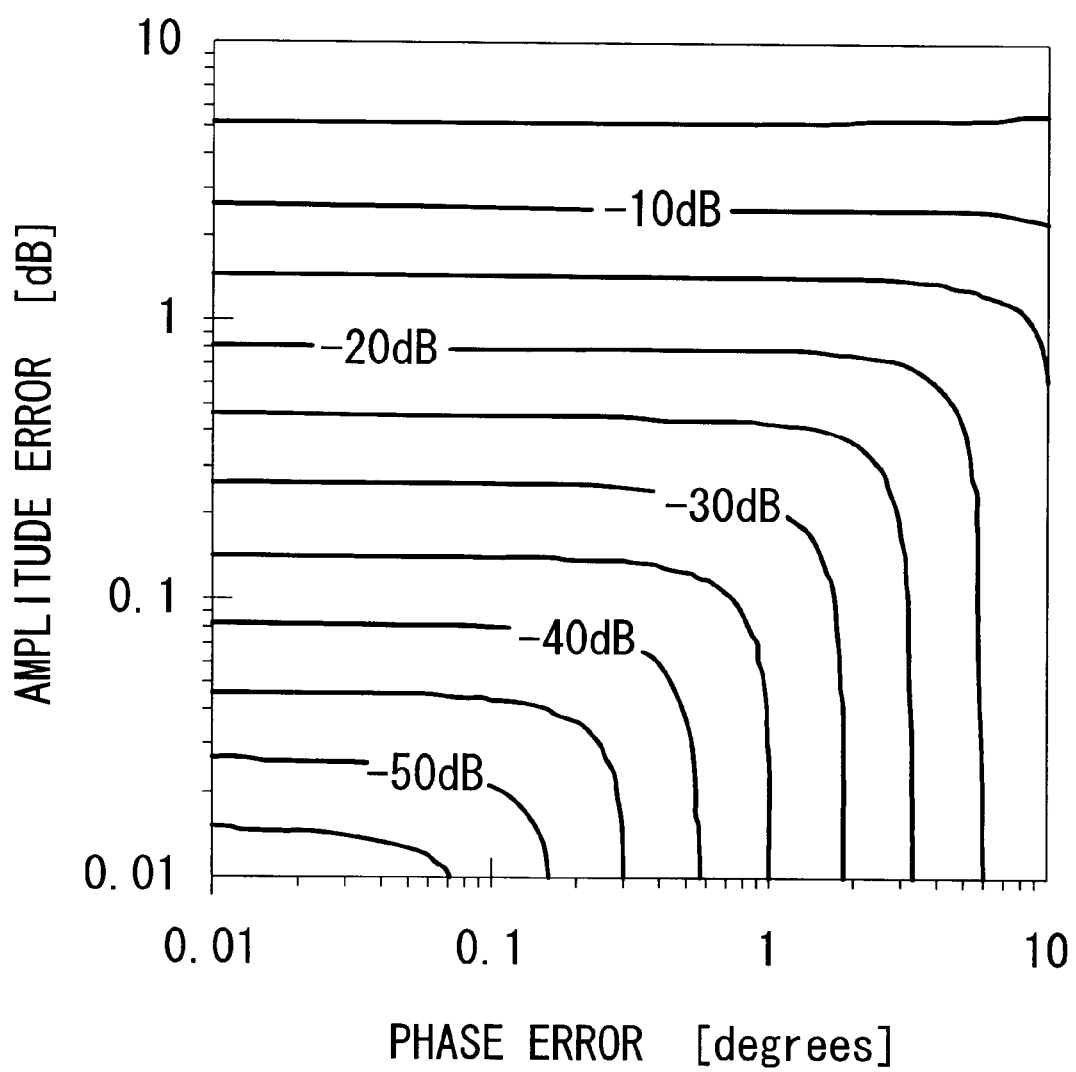
FIG. 32 is a graph showing the relationship between the amplitude and phase difference and the null depth.
Figure 33:
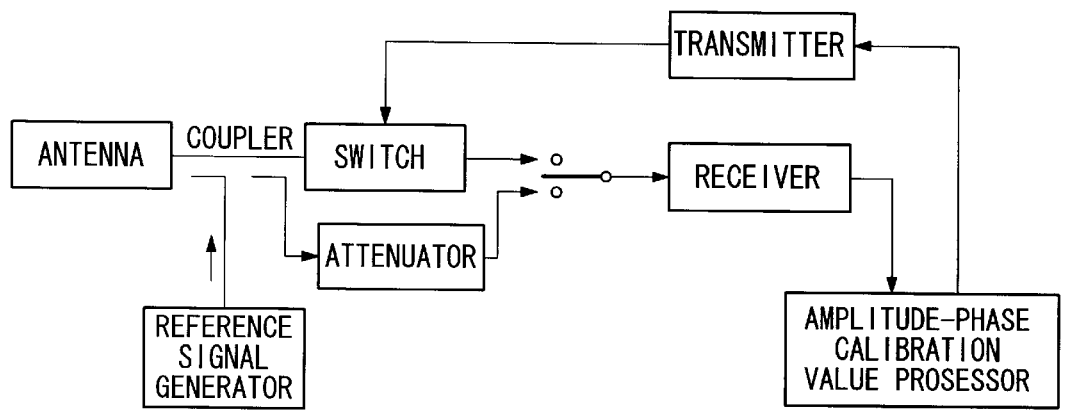
FIG. 33 is a block diagram showing a conventional calibration circuit (1).
Figure 34:
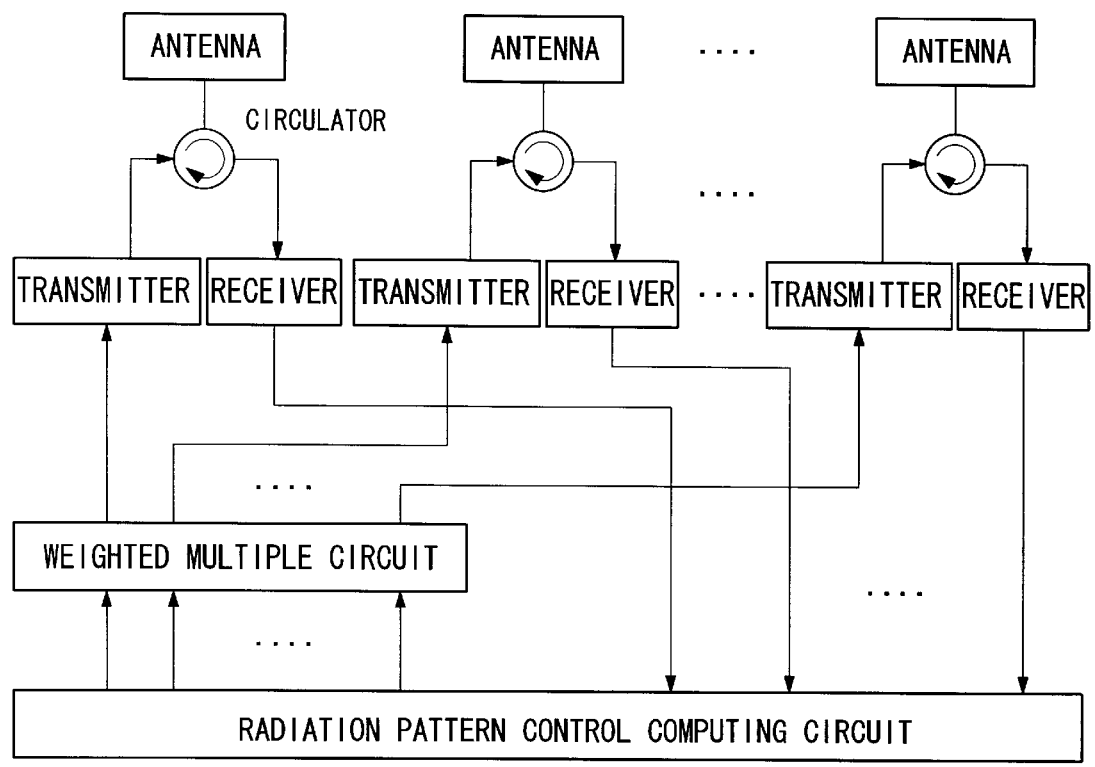
FIG. 34 is a block diagram showing the assembly of a conventional adaptive array antenna and an FFD system.
Figure 35A:
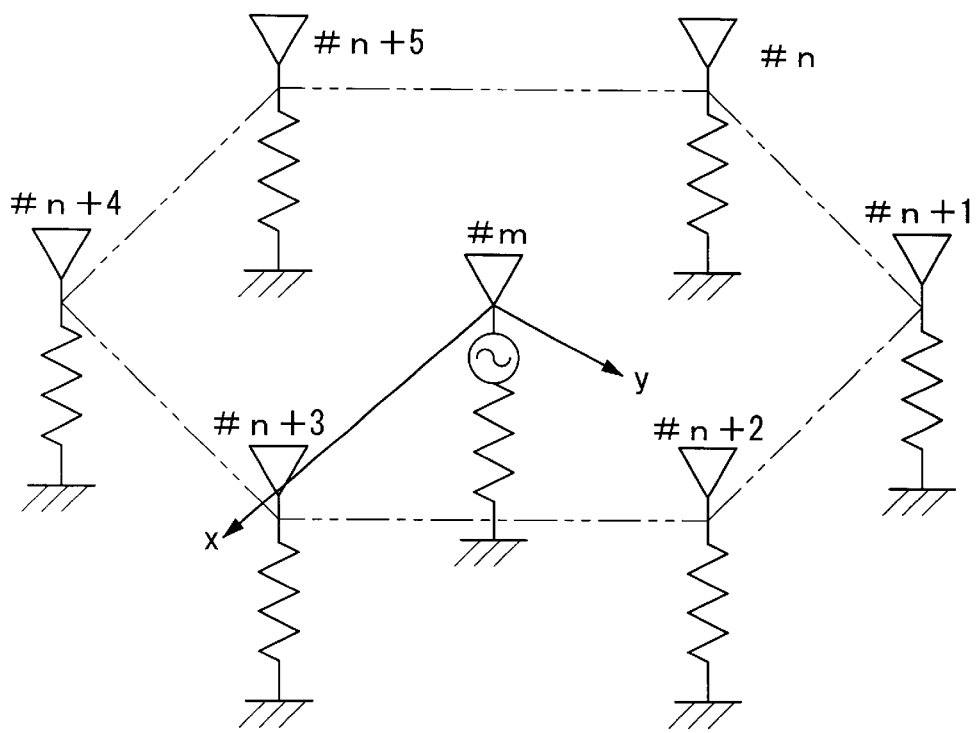
FIGS. 35A and B are block diagrams showing a conventional calibration circuit (2).
Figure 35B:
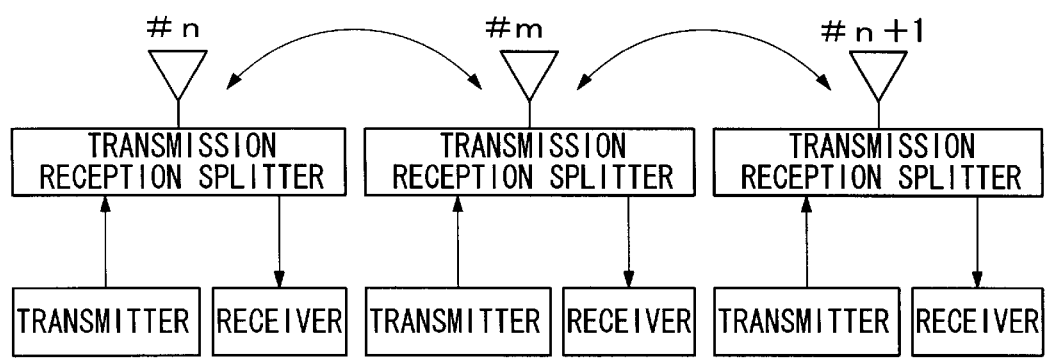

FIG. 27 is a block diagram showing the structure of the adaptive array antenna transceiver apparatus of this embodiment. FIG. 28 shows the structure of the calibration/reception signal separator 201 provided in the adaptive array antenna transceiver apparatus of this embodiment. FIG. 29 is a flowchart showing the calibration control procedure for the transmitter of this embodiment. FIG. 30 is a flowchart showing the calibration control procedure for the receiver of this embodiment.

This embodiment is a modification of the first embodiment, and in FIG. 27, FIG. 29, and FIG. 30, the elements and processing corresponding to those of FIG. 1 are denoted by identical reference numerals and step numbers.

The adaptive array antenna transceiver apparatus shown in this embodiment differs from the adaptive array antenna transceiver apparatus shown in the first embodiment on the point that it is structured so as to make possible the calibration of each of the branches even during communication.

Like FIG. 1, the antenna of FIG. 27 is structured by N antenna elements 11 disposed side by side. In this embodiment, the segments of the branches of the array antenna in which the elements are disposed are denoted by the numerical values in parenthesis added to the reference numeral of each of the elements. In addition, each of the arrows in FIG. 27 denotes the direction of the signals. Moreover, in the following explanation, in the case that the segmentation of the branches of each element is unnecessary, the parentheses and the numerical values in the parenthesis for each reference numeral is omitted.

In the example in FIG. 27, branch units 40 that include each of the antenna elements 11 are formed. Each branch unit 40 comprises an antenna element 11, a circulator 12, a transmitter 13, a receiver 14, a coupler 15, and a combiner 216.

The circulator 12 is provided so that an antenna element 11 can be used for both transmission and reception. The coupler 15 is provided in order to separate and extract a part of the signal output by the transmitter 13.

When carrying out transmission, the signals transmitted from each of the transmitters 13 pass through the coupler 15 and the circulator 12, and are radiated as wireless signals form the antenna elements 11. When carrying out reception, the signal received by the antenna elements 11 pass through the circulator 12 and the combiner 216, and are input into the receiver 14.

In this example, the frequency of the signal output by the transmitter 13, that is, the transmission frequency, is f1, and the reception frequency of the receiver 14 is f2, and thus the transmission frequency f1 and the reception frequency f2 are different.

In the adaptive array antenna transceiver apparatus of FIG. 27, a switch 21, a frequency converter 22, switch 23, signal generator 24, a calibration/reception signal separator 201, a calibration processor 25, and a radiation pattern control processor 26 are provided in addition to the N branch units 40.

In the following, the explanation centers on the points of difference between the present embodiment and the adaptive array antenna transceiver apparatus shown in FIG. 1.

The points of difference in the structure of the adaptive array antenna transceiver apparatus in FIG. 27 and the adaptive array antenna transceiver apparatus shown in FIG. 1 are that a combiner 216 is provided instead of the switch 16 in each of the branch units and that a calibration/reception signal separator 201 is also provided in the adaptive array antenna transceiver apparatus.

Here, the combiner 216 combines the reception signal from the antenna elements 11 and the signal from the switch 23, and outputs the combined signal to the receiver 14.

The calibration/reception signal separator 201 separates and outputs from the output signal of the receiver 14 the reception signal from the antenna elements 11 and the output signal of the receiver 14.

In addition, a part of the calibration processor 25 in the adaptive array antenna transceiver apparatus in FIG. 27 has connections, etc., that differ from those of the calibration processor 25 shown in FIG. 1. Specifically, the calibration processor in the present embodiment inputs the signal from the switch 23 separated by the calibration/reception signal separator 201 by controlling the connection state of the switches 21 and 23, and finds the calibration value for each of the branches of the array antenna.

Next, the calibration/reception signal separator 201 will be explained.

In a communication system, in order to establish position information and synchronism between the base station and terminal, for example, signals previously established are used. For example, in a CDMA (Code Division Multiple Access) system, by assigning respectively differing numbers to each of the base stations and terminals, both the base station and the terminal can carry out communication at a frequency identical to the system of other terminals, etc. Based on this principle, the calibration/reception signal separator 201 knows in advance the transmission signal sequence from the base station and the signals from the terminal, and by providing a correlator to extract only the calibration signal, the calibration can be extracted.

The structure of the calibration/reception signal separator 201 for carrying out the above is shown in FIG. 28. The calibration/reception signal separator 201 comprises a divider 202, a calibration signal correlator 204, and one or more reception signal correlators 204. The number of the calibration signal correlators 204 is determined depending on the number of terminals accommodated by the base station.

The divider 202 separates the signal from the receiver 14 designated by the calibration processor, and inputs it into the calibration signal correlator 203 and the reception signal correlator 204.

The calibration signal correlator 203 inputs in advance a transmission signal sequence (for example, a code using CDMA) for calibration from the calibration processor 25, and by finding the association correlation with the signal from the divider 202, the reception signal from the antenna element 11 is separated and output. Moreover, this output signal is a signal that includes the characteristics of the receiver 14. In addition, the output signal is also output to the radiation pattern control processor 26.

Next, the calibration control procedure shown in FIG. 2 will be explained. Moreover, in this example, the branch unit 10(1) has been assigned to serve as the reference branch, but any branch can serve as the reference. The calibration/reception signal separator 201 has a transmission signal sequence for calibration set in advance by the calibration processor 25.

In step S 10D, controlling the switch 23, the output of the frequency converter 22 is connected to the combiner 216(1) of the reference branch.

In the next step S 12, the value of the counter i is initialized. In addition, the processing in steps S 13 to S 19 is repeatedly executed depending on the value of the counter i.

In step S 13, the switch 21 is switched so that the output of the coupler 15(i) of the branch corresponding to the value of the counter i is selected.

In step S 14, the signal from the transmitter 13(1) of the branch corresponding to the value of the counter i is transmitted. Moreover, the signal from the transmitter 13(i) needs only to be transmitted during measurement.

Here, when the signal for calibration from the transmitter 13(i) is transmitted, the signal K(i) output by the receiver is given in the following equation:

$$K(i)=Rc(t)\cdot R(1)+Cc(t)\cdot T(i)\cdot Q\cdot R(1) \quad (201)$$

where:
- T(i): amplitude and phase values produced by the transmitters 13(i),
- Q: the amplitude and phase fluctuation component (frequency converter) due to temperature characteristics,
- R(1): the amplitude and phase values produced by the receiver 14(1),
- Rc(t): the reception signal in time t, and
- Cc(t): the transmission signal in time t.

In this case, the calibration signal correlator 203 shown in FIG. 28 outputs the signal K'(i) shown in the following equation:

$$K'(i)=Cc(t)\cdot T(i)\cdot Q\cdot R(1) \quad (202)$$

Thereby, in step S 15D, the ith signal K'(i) received by the receiver 14(1) of the reference branch is measured from the output signal of the calibration signal correlator 203 in the calibration/reception signal separator 201. The signal K'(i) is a value that includes the amplitude and phase information of the reception signal. Because the first time the value of the counter i is 1, passing from step S 15 to S 16, the processing advances to step S 17, the value of the counter i is incremented, and the processing returns to step S 13.

The second time and thereafter, because the value of the counter i is not 1, the processing passes from step S 15 to S 16 and advances to step S 18D. In step S 18D, the calibration value H(i) of the ith branch is found from the following equation:

$$H(i)=K'(i)/K'(1) \quad (203)$$

In the case that the processing for all N branches has finished, the processing passes from step S 18 to S 19, advances to step S 17, increments the value of the counter i, and returns to step S 13.

Therefore, when the calibration control procedure in FIG. 29 is executed, the calibration values H(i) are found separately for the respective second to Nth branches. In this example, because the first branch is the reference, naturally the calibration value H(1) of the first branch is 1.

Here, signal K'(i) is represented by the Equation 202, and thus by rearranging the Equation 203, the following equation can be obtained:

$$\begin{aligned}H(i) &= K'(i)/K'(1) \\ &= (Cc(t)\cdot T(i)\cdot Q\cdot R(1))/(Cc(t)\cdot T(1)\cdot Q\cdot R(1)) \\ &= T(i)/T(1)\end{aligned} \quad (204)$$

This means that the calibration value H(i) obtained by the calibration control in FIG. 29 is a relative value of the amplitude and phase values of the transmitters 13(i) with respect to the reference branch. In addition, the measured amplitude and phase values fluctuate due to the influence of the change in temperature characteristics over time, but the component Q thereof is cancelled in Equation 204, and thus the influence of the temperature characteristics do not appear in the calibration values H(i).

Therefore, when transmitting at each of the branches, by multiplying the amplitude and phase values of each of the transmitters 13(i) by the calibration values H(i) obtained by the calibration control procedure in FIG. 29, the error in the amplitude and phase values between branches in the transmitter 13 can be compensated.

Next, the calibration control procedure shown in FIG. 30 will be explained. Moreover, in this example, the branch unit 40(1) is assigned to serve as the reference, but another branch can serve as the reference.

In step S 20, by controlling the switch S 21, the output of the coupler 15(1) of the reference branch is selected.

In addition, in step S 21, the signal from the transmitter 13(1) of the reference branch is transmitted. Moreover, the transmitter 13(1) needs to transmit the signal only during measurement.

In step S 22, the value of the counter i is initialized to 1. The processing of steps S 23 to S 29 is executed repeatedly depending on the value of the counter 1.

In step 23D, by controlling the switch 23, the output of the frequency converter 22 is connected to the combiner 216($i$) of the branch depending on the value of the counter i.

Here, when the signal for calibration is transmitted from the transmitter 13(1), the signal S(i) output by the receiver 14($i$) is given by the following equation:

$$S(i)=Rc(t)\cdot R(i)+Cc(t)\cdot T(1)\cdot Q\cdot R(i) \qquad (205)$$

where:

T(1): amplitude and phase values produced by the transmitters 13(1),

Q: the amplitude and phase fluctuation component (frequency converter) due to temperature characteristics, R(i): the amplitude and phase values produced by the receiver 14(1), Rc(t): the reception signal in time t, and Cc(t): the transmission signal in time t.

In this case, the calibration signal correlator 203 shown in FIG. 28 outputs the signal S'(i) shown in the following equation:

$$S'(i)=Cc(t)\cdot T(1)\cdot Q\cdot R(i) \qquad (206)$$

Thereby, in step S 25D, the ith signal S'(i) received by the receiver 14($i$) of the reference branch is measured from the output signal of the calibration signal correlator 203 in the calibration/reception signal separator 201. The signal S'(i) is a value that includes the amplitude and phase information of the reception signal. Because the first time the value of the counter i is 1, passing from step S 25 to S 26, the processing advances to step S 27, the value of the counter i is incremented, and the processing returns to step S 23.

The second time and thereafter, because the value of the counter i is not 1, the processing passes from step S 25 to S 26 and advances to step S 18D. In step S 18D, the calibration value P(i) of the ith branch is found from the following equation:

$$P(i)=S'(i)/S'(1) \qquad (207)$$

In the case that the processing for all N branches has finished, the processing passes from step S 28 to S 29, advances to step S 27, increments the value of the counter i, and returns to step S 23.

Therefore, when the calibration control procedure in FIG. 30 is executed, the calibration values S'(i) are found separately for the respective second to Nth branches. In this example, because the first branch is the reference, naturally the calibration value P(1) of the first branch is 1.

Here, signal S'(i) is represented by the Equation (206), and thus by rearranging the Equation 207, the following equation can be obtained:

$$P(i) = S'(i)/S'(1) \qquad (208)$$
$$= (T(1)\cdot Q\cdot R(i))/(T(1)\cdot Q\cdot R(1))$$
$$= R(i)/R(1)$$

This means that the calibration value P(i) obtained by the calibration control in FIG. 30 is a relative value of the amplitude and phase values of the receivers 14(i) with respect to the reference branch. In addition, the measured amplitude and phase values fluctuate due to the influence of the changes in temperature characteristics over time, but the component Q thereof is cancelled in Equation 208, and thus the influence of the temperature characteristics does not appear in the calibration values P(i).

Therefore, when receiving at each of the branches, by multiplying the amplitude and phase values of each of the receivers 14($i$) by the calibration value P(i) obtained by the calibration control procedure in FIG. 30, the error in the amplitude and phase values between branches in the receiver 14 can be compensated.

The fluctuation component Q of the amplitude and phase values due to temperature characteristics in Equation 202 and Equation 206 include in practice the fluctuation component in the transmitter 13 of each of the branches, the fluctuation component in the receiver 14, and the fluctuation component in the frequency converter 22 to be used in calibration. Therefore, the characteristics of the frequency converter 22 change with respect to temperature changes that accompany the passage of time, but because the frequency converter 22 is used in common when measuring the amplitude and phase values of any of the branches in the calibration processing, the fluctuation component Q of the amplitude and phase values of the single frequency converter 22 does not influence the calibration values.

Moreover, the modifications that allow carrying out calibration during reception as shown in the present embodiment can be applied to the second through first embodiments. The points of modification in the structure for applying this are simply stated below.

Specifically, in the adaptive array antenna transceiver apparatus of the second embodiment, carrying out calibration even during reception can be carried out by the following modifications.

In each of the branch units 30, the reception signal from the antenna element 11 and the signal from the switch 38, and the signal from the antenna 11 and the signal from the frequency converter 22 are combined, and the combiners that output the combined signal to the receiver 14 are respectively provided instead of the switches 16.

A calibration/reception signal separator is further provided for the output signal of the receiver 14 wherein during calibration of the transmitter 35, the reception signal from the antenna element and the signal from the switch 38 are separated and extracted, and during the calibration of the receiver 14, the reception signal from the antenna element 11 and the signal from the frequency converter 22 are separated and extracted.

During calibration of the transmitter 35, the calibration processor 25B controls the connection state of switch 38, inputs the signal from the switch 38 that has been separated by the calibration/reception signal separator, and finds the calibration value of each of the transmitters 35. In addition, during calibration of the receiver, the calibration processor 25B controls the connection state of the switch 21, inputs the signal from the frequency converts separated by the calibration/reception signal separator, and finds the calibration value for each of the receivers 14.

In the adaptive array antenna transceiver apparatus shown in the third embodiment, carrying out calibration even during reception can be carried out by the following modifications.

In each of the branch units 40, a combiner that combines the reception signal from the antenna element 11 and the signal from the switch 42 included in this branch, and the reception signal from the antenna 111 and the signal from the switch 42 included in the adjacent branch, and the inputs that output the combined signal into the receiver 14 is provided instead of the switches 16.

A calibration/reception signal separator is further provided for output signal of the receiver 14 wherein the reception signal from the antenna element 11 and the signal from the switch 42 included in the relevant branch are separated and extracted, or the reception signal from the antenna element 11 and the signal from the switch 42 included in the adjacent branch is separated and output.

The calibration processor 25 controls the connection state of the switches 41 and 42, inputs the signal from the switch 42 included in the relevant branch which has been split by the calibration/reception signal separator and the signal from the switch included in the adjacent branch separated by the calibration/reception signal separator, and the calibration value for each of the branches of the array antenna are found.

In the adaptive array antenna transceiver apparatus shown in the fourth embodiment, carrying out calibration even during reception can be carried out by the following modifications.

In each of the branch units 110, a combiner that combines the signal from the circulator 113 and the reception signal output by the frequency converter 116 and outputs the combined signal to the receiver 118 is provided instead of the switch 117.

A calibration/reception signal separator that separates and outputs the reception signal from the circulator 113, and the reception signal output from the frequency converter 117 is provided for the output of the receiver 118.

The calibration processor 124 inputs the reception signal output by the frequency converter 116 separated by the calibration/reception signal separator by controlling the connection state of the switch 113, and finds the calibration value of each of the branches of the array antenna.

In the adaptive array antenna transceiver apparatus shown in the fifth embodiment, carrying out calibration even during reception can be carried out by the following modifications:

A combiner that combines the reception signal from the circulator 113 and the signal output by the frequency converter 116, or combines the reception signal from the circulator 113 and the signal from the transmitter output by the switch 134, and inputs the combined signal into the receiver 118 is provided for each of the branch units 110 instead of the switch 118.

A calibration/reception signal separator that separates and outputs the reception signal from the circulator 113 and the signal output by the frequency converter 116, and separates and extracts the reception signal from the circulator 113 and the signal from the transmitter output by the switch 134 is further provided to the output of the receiver 118.

The calibration processor 124 inputs the signal output by the frequency converter 16 separated by the calibration/reception signal separator, or the signal from the transmitter output by the switch 34 separated by the calibration reception signal separator by controlling the switches 112, 133, and 134, and finding the calibration value for each of the branches of the array antenna.

In the adaptive array antenna transceiver apparatus shown in the six and eighth embodiments, carrying out calibration of the transmitter 15 even during reception can be carried out by the following modifications:

In the branch unit 110(1), a combiner that combines the signal from the circulator 113 and the signal from the frequency converter 142, and outputs the combined signal to the receiver 118(1) is provided instead of switch 117(1).

A calibration/reception signal separator that separates and outputs the signal from the circulator 113 and the signal from the frequency converter 142 is further provided for the output of the receiver 118(1).

The calibration processor 124 inputs the signal from the frequency converter 142 separated by the calibration/reception signal separator, and finds the calibration value of the transmitting part 115 of each of the branches.

In the adaptive array antenna transceiver apparatus shown in the seventh and ninth embodiments, carrying out the calibration of the transmitter even during reception can be carried out by the following modifications.

A combiner that combines the signal from the circulator 113 and the signal from the switch 151, and outputs the combined signal to the receiver 118 is provided on each of the branch units 110 instead of switch 117.

The calibration/reception signal separator that separates and outputs the signal from the circulator 131 and the signal from the switch 151 is further provided to the output of the receiver 118.

The calibration processor 124 inputs the signal from the switch 151 separated by the calibration/reception signal separator by controlling the switches 151 to 153, and finds the calibration value for each of the branches of the antenna.

As described in the above for first through tenth embodiments, when the present invention is used, even in a system such as an FDD in which the frequencies of the transmission and reception are different, the amplitude and phase values of the transmitter and receiver between each of the branches can be calibrated separately, and the error in amplitude and phase between each of the branches produced by environmental fluctuations due to differences in the setting positions and changes in the temperature characteristics of the base stations can be compensated.

In addition, in the case of the structure such as that shown in FIG. 7, because providing switches (21, 23) having a high number of terminals is not necessary, in the case that the number of elements (N) of an array antenna is high, manufacture is simple.

In addition, by using an additional antenna, even in a system such as an FDD having transmission and reception frequencies that differ, the calibration of the amplitude and phase values of the transmitting part 115 and reception part between each of the branches can be carried out separately, including even the antenna. Thereby, for example, the error in the amplitude and phase between each of the branches produced by environmental fluctuation because of differences in the setting positions of the base stations and changes in the temperature characteristics during communication can be compensated.

What is claimed is:

1. An adaptive array antenna transceiver apparatus comprising a plurality of antenna elements, transmitters and receivers in the same number as the antenna elements of said array antenna, a common-use device connecting said transmitters and receivers to each of said antenna elements, and a radiation pattern control processor that controls the radiation pattern of said array antenna by synthesizing the output of the plurality of receivers by weighting the amplitude and phase with respect to a signal input from each respective antenna element into said plurality of receivers, and at the same time the reception frequency of said receivers is different from the transmitting frequency of said transmitters, which provides:

a local signal generator that outputs a signal having a frequency that corresponds to the difference between the reception frequency of said receivers and the transmitting frequency of said transmitters;

a dividing device that separates and extracts a part of the signals from the output of said plurality of transmitters;

a first switch that selects the signal output from any one of said plurality of transmitters;

a frequency converter that converts the frequency of the signal selected by said first switch by using the signal output by said local signal generator;

a second switch that inputs signals output by said frequency converter and selectively outputs them to any one of the plurality of paths corresponding to said plurality of receivers;

a third switch that selectively inputs a reception signal from a said antenna elements or a signal from said second switch into each of said receivers; and a calibration control circuit that controls the connection state of said first switch, second switch, and third switch, inputs the amplitude and phase values obtained at said receivers, and finds the calibration value of each of the branches of said array antenna.

2. An adaptive array antenna transceiver apparatus according to claim 1, wherein the calibration control circuit selects in sequence the signals output from the respective plurality of transmitters by the first switch, and at the same time, controls the second switch and the third switch, inputs the signal that has been frequency converted by the frequency converter into the receiver of the particular branch assigned in advance to serve as a reference, and calculates, as the calibration value of the transmission system of each of the branches, a amplitude and phase ration between the plurality of values measured at the transceiver of each branches and the values measured at the transceiver of the particular branch assigned in advance to serve as the reference.

3. An adaptive array antenna transceiver apparatus according to claim 1, wherein the calibration circuit selects a signal output by the transmitter of a particular branch assigned in advance to serve as a reference, and at the same time, by controlling the second switch and the third switch, the signals that have been frequency converted by the frequency converter are input in sequence into the receiver of each of the branches, and calculates, as the calibration value of the reception system of each of the branches, a amplitude and phase ration between the plurality of values measured at the receiver of each branches and the values measured at the receiver of the particular branch assigned in advance to serve as the reference.

4. An adaptive array antenna transceiver apparatus according to claim 1, wherein:

A combiner that combines the reception signals from said antenna elements and the signals form said second switch, and outputs this signal to said receiver, is provided instead of said third switch;

a calibration reception signal separation circuit that separates/outputs the received signal from said antenna element and the signal from said second switch for the output signal of said receiver is further provided; and wherein:

said calibration circuit controls the connection state of said first switch and second switch, inputs the signal of the second switch separated by said calibration/reception signal separation circuit, and finds the calibration value of each of the branches of said array antenna.

5. An adaptive array antenna transceiver apparatus comprising a plurality of antenna elements, transmitters and receivers in the same number as the antenna elements of said array antenna, common-use devices connecting said transmitters and receivers to each of said antenna elements, and a radiation pattern control calculating circuit that controls the radiation pattern of said array antenna by synthesizing the output of the plurality of receivers by weighting the amplitude and phase with respect to the signals input from each of the antenna elements to said plurality of receivers, and at the same time the reception frequency of the receivers is different from the transmitting frequency of the signal applied to the antenna elements from the transmitter, which provides:

a local signal generator that outputs a signal having a frequency that corresponds to the difference between said reception frequency and said transmitting frequency;

a first frequency converter that converts the frequency of the signal having the same frequency as said reception frequency output from each of said plurality of transmitters using a signal output by said local signal generator;

a first dividing device that separates and extracts a part of the signals from the output of said plurality of transmitters after conversion by said first frequency converter;

a second dividing device that separates and extracts a part of a signal from the output of one of said transmitters before conversion by said first frequency converter, a first switch that selects one signal input by any one of said plurality of transmitters into said first dividing device;

a second frequency converter that converts the frequency of the signal selected by said first switch by using the signal output by said local signal generator;

a second switch that inputs signals output by said second dividing device and selectively outputs them to any one of the plurality of paths corresponding to said plurality of receivers;

a third switch that selectively inputs into each of said receivers a reception signal from said antenna elements, a signal from said second switch, and a signal from said second frequency converter; and a calibration control circuit that controls the connection state of said first switch, said second switch, and said third switch, inputs the amplitude and phase values obtained at said receivers, and finds the calibration value of each of the branches of said array antenna.

6. An adaptive array antenna transceiver apparatus according to claim 5, wherein the calibration control circuit selects in sequence signals output from each of said plurality of transmitters using said first switch, and at the same time, controls said second switch and said third switch, inputs into the receiver of a particular branch assigned in advance to serve as a reference signal a signal that has been frequency converted by the second frequency converter, and calculates as the calibration value of the transmitter system of each of the branches the ratio of the plurality of the amplitude and phase values measured for the respective signals from the transmitters of each of the branches to the amplitude and phase values measured for the signal from the transmitter of a particular branch assigned in advance to serve as a reference.

7. An adaptive array antenna transceiver apparatus according to claim 5, wherein the calibration control circuit extracts the signals output by the transmitter of a particular branch assigned in advance to serve as the reference using said second dividing device, inputs these in sequence to the receivers of each of the branches via said second switch and said third switch, and calculates as the calibration value of the reception system of each of the branches the ratio of the plurality of amplitude and phase values measured at the respective receivers of each of the branches and the amplitude and phase values measured at the receiver of the particular branch assigned in advance to serve as the reference.

8. An adaptive array antenna transceiver apparatus according to claim 5, wherein:
a combiner that combines the received signal from said antenna elements and the signal from said second switch, or the received signal from said antenna elements and the signal from the said second frequency converter, and outputs this signal to said receiver is provided instead of said third switch;
a calibration/reception signal separation circuit separates/outputs the reception signal from said antenna elements and the signal from said second switch, or separates/outputs the reception signal from said antenna elements and the signal from said second frequency converter for the output signal of said receiver is further provided; and wherein
said calibration control circuit controls the connection state of said first switch and second switch, inputs the signal from the second switch separated by said calibration/reception signal separating circuit or the signal from the second frequency converter separated by said calibration/reception signal separating circuit, and finds the calibration value of said of the branches of said array antenna.

9. An adaptive array antenna transceiver apparatus comprising a plurality of antenna elements, transmitters and receivers in the same number as the antenna elements of said array antenna, a common-use device connecting said transmitters and receivers to each of said antenna elements, and a radiation pattern control processor that controls the radiation pattern of said array antenna by synthesizing the output of the plurality of receivers by weighting the amplitude and phase with respect to a signal input from each respective antenna element into said plurality of receivers, and at the same time the reception frequency of said receivers is different from the transmitting frequency of said transmitters, which provides:
a local signal generator that outputs a signal having a frequency that corresponds to the difference between the reception frequency of said receivers and the transmitting frequency of said transmitters;
a dividing device that separates and extracts a part of the signals from the output of said plurality of transmitters;
a plurality of first switches that inputs and selects any one of the output signal of said respective dividing devices form the two branches adjacent to each other for the arrangement of branches assigned in advanced of said array antenna;
a frequency converter that converts the frequency of the signal selected by said first switch by using the signal output by said local signal generator;
a second switch that inputs signals output by said frequency converter and selectively outputs them to any one of the plurality of paths corresponding to said two branches adjacent to each other for the respective plurality of branches of said array antenna;
a third switch that selects and inputs into one of said receivers a reception signal from said antenna elements or the relevant branch and a signal from said second switch included in the adjacent branch for the respective plurality of branches of said array antenna; and
a calibration control circuit that controls the connection state of said first switch, second switch, and third switch, inputs the amplitude and phase values obtained at said receivers, and finds the calibration value of each of the branches of said array antenna.

10. An adaptive array antenna transceiver apparatus according to claim 9, wherein the calibration control circuit alternately selects by said first switch the signals output by the transmitters of two adjacent branches at each of the adjacent branches, and at the same time, controls said second switch and said third switch, inputs the signal that has been frequency converted by the frequency converter into one of the receivers assigned in advance among the two branches, finds as the first ratio the ratio of the respectively measured amplitude and phase values for the signals from the transmitters of the two branches, and at the same time, for branches other than the branch assigned in advance to serve as the reference, the first ratio found at the relevant branch is calibrated using the first ratio found at the other branches, and the calibration value of the transmitting system of each of the branches is calculated.

11. An adaptive array antenna transceiver apparatus according to claim 9, wherein the calibration control circuit selects the signal output by the one transmitter assigned in advance among two adjacent branches for each adjacent branch by said first switch, and at the same time, controls said second switch and said third switch, alternately inputs the signal that has been frequency converted by said frequency converter into each of the receivers of the two adjacent branches, and finds as a first ratio the ratio of a plurality of amplitude and phase values respectively measured at the receivers of two adjacent branches, and at the same time, for branches other than that assigned in advance to serve as the reference, the first ratio found at the relevant branch is calibrated using said first ratio found at the other branches, and the calibration value of the receiving system of each of the branches is calculated.

12. An adaptive array antenna transceiver apparatus according to claim 9, wherein:
a combiner that combines the received signal from said antenna elements and the signal from said second switch, or the received signal from said antenna elements and the signal from the said second switch included in the adjacent branch, and outputs this signal to said receiver is provided instead of said third switch;
a calibration/reception signal separation circuit separates/outputs the reception signal from said antenna elements and the signal from said second switch included in the adjacent branch, or separates/outputs the reception signal from said antenna elements and the signal from said second switch included in the adjacent branch for the output signal of said receiver is further provided; and wherein
said calibration control circuit controls the connection state of said first switch and second switch, inputs the signal from the second switch included in the relevant branch separated by said calibration/reception signal separating circuit or the signal from the second switch included in the adjacent branch separated by said calibration/reception signal separating circuit, and finds the calibration value of each of the branches of said array antenna.

13. An adaptive array antenna transceiver apparatus comprising N antenna elements, N is an integral number and shows three or more; N transmitters and receivers; a common-use device that connects said transmitters and receivers to each of the antenna elements; and a radiation pattern control processor that controls the radiation pattern of said array antenna by synthesizing the output of the plurality of receivers by weighting the amplitude and phase with respect to a signal input from each of the respective antenna elements into said plurality of receivers, and at the same time, the reception frequency of said array antenna to be used in communication and the transmitting frequency are different, which provides:

N transmitters for which the frequency of the transmitted signal is identical to the reception frequency of said array antenna;

a first frequency converter that converts the frequency of signals transmitted by each of said N transmitters to the transmitted frequency of said array antenna;

N dividing devices that extract a signal from the output of each of said N transmitters before conversion by said first frequency converter;

N receivers for which the frequency of the reception signal is identical to the reception frequency of said array antenna;

a second frequency converter that converts a signal having a frequency identical to the transmitted frequency of said array antenna to a frequency identical to the reception frequency of said array antenna;

N first common-use devices provided between the output of said first frequency converter, the input of the receiver, and each of said antenna elements;

N second common-use devices provided between the output of said dividing device, the input of said second frequency converter, and each of said antenna elements;

at least one additional antenna that can be connected to any one of said N transmitters or N receivers;

a first switch provided on each antenna element that connects either one of said antenna elements or the additional antenna to either one of said first common-use device or said second common-use device;

a second switch provided on each receiver and connected to the input of said receivers and selectively inputs into said receivers either one of the reception signals from said first common-use device or the reception signals output by said second frequency converter;

a third switch that connects said additional antenna to any one of the first switches; and a calibration control circuit that controls the first switch, second switch, and third switch, and at the same time, finds the calibration value of the amplitude and phase between branches of the array antenna based on the amplitude and phase values obtained from each of said receivers.

14. An adaptive array antenna transceiver apparatus according to claim 13, wherein the calibration control circuit:

controls the first switch, second switch, and third switch, and selects from among said N transmitters the first transmitter or the second transmitter respectively included in branches of two antenna elements that have equal distances from said additional antenna, and at the same time, selects from among said N receivers one calibration receiver included in a branch differing from that of said first transmitter and second transmitter, connects the third switch to one calibration receiver included in a branch differing from that of said first transmitter and second transmitter;

transmits the signal that is the signal output by said first transmitter and frequency converted by said first frequency converter from the antenna element of the branch included in the first transmitter;

inputs the output that is the signal from said first transmitter received by said additional antenna and frequency converted by said second frequency converter into the said calibration receiver, and detects a first measured value obtained at said calibration receiver;

transmits the signal that is the signal output from the second transmitter and frequency converted by said first frequency converter from the antenna element included in the second transmitter;

inputs the output that is the signal from said second transmitter and received by said additional antenna and frequency converted by said second frequency converter into said calibration receiver and detects the second measured value obtained at said calibration receiver;

calculates the ratio of said second measured value and said first measured value to serve as the first calibration value;

finds the first calibration value for the respective plurality of branches based on the first measured value and the second measured value measured by respectively switching in sequence the selection of the first transmitter an the second transmitter; and calibrates the first calibration value of the relevant branch using the first calibration value obtained at the other branches for branches other than the reference branch assigned in advance, and calculates the first calibration value as a relative value with respect to the reference branch.

15. An adaptive array antenna transceiver apparatus according to claim 13, wherein the calibration control circuit;

controls said first switch, second switch, and third switch, and selects from among said N transmitters the first transmitter or the second transmitter respectively included in branches of two antenna elements that have equal distances from said additional antenna, and at the same time, selects from among N transmitters one calibration transmitter included in a branch different from that of said first receiver and second receiver;

transmits the signal output by said calibration transmitter from said additional antenna via said dividing device, the second common-use device, the first switch, and the third switch;

inputs the signal from said calibration transmitter received by the antenna element of the branches included in said first receiver into said first receiver and detects the first measured value obtained at said first receiver;

inputs the signal from said calibration transmitter received by the antenna element of the branch included in said second receiver into said second receiver and detects a second measured value obtained at said second receiver;

calculates the ratio of said second measurement value and first measurement value as a first calibration value;

finds the first calibration values of the respective plurality of branches based on the first measured value and the second measured value respectively measured by switching in sequence the selection of said first receiver and second receiver; and calibrates the fist calibration value of the relevant branch using the first calibration value obtained at the other branches, and calculates the first calibration value as a relative value with respect to the reference branch.

16. An adaptive array antenna transceiver apparatus according to claim 13, wherein said N antenna elements are disposed at an equal distance on one straight line, and at the same time, said additional antenna is disposed at a position at the middle of two antenna elements.

17. An adaptive array antenna transceiver apparatus according to claim 13, wherein N antenna elements are disposed at equal distances on a circle, and at the same time, said additional antenna at the center position of said circle.

18. An adaptive array antenna transceiver apparatus according to claim 13, wherein:

a combiner that combines the received signal from said first common-use device and the received signal output by said second frequency converter, and outputs this signal to said receiver is provided instead of said second switch;

a calibration/reception signal separation circuit separates/outputs the reception signal from said first common-use device and the received signal output by said second frequency converter is further provided; and wherein said calibration control circuit controls the connection state of said first switch, inputs the received signal output by said second frequency converter separated by said calibration/reception signal separating circuit, and finds the calibration value of each of the branches of said array antenna.

19. An adaptive array antenna transceiver apparatus comprising N antenna elements, N is an integral number and shows two or more; N transmitters and receivers; a common-use device that connects said respective transmitters and receivers to each of the antenna elements; and a radiation pattern control processor that controls the radiation pattern of the array antenna by synthesizing the output of the plurality of receivers by weighting the amplitude and phase with respect to a signal input from each of the respective antenna elements into said plurality of receivers, and at the same time, the reception frequency of array antenna to be used in communication and the transmitting frequency are different, which provides:

N transmitters for which the frequency of the transmitted signal is identical to the reception frequency of said array antenna;

a first frequency converter that converts the frequency of signals transmitted by each of said N transmitters to the transmission frequency of said array antenna;

N first dividing devices that extract a signal from the output of each of said N transmitters before conversion by said first frequency converter;

N second dividing devices that extract a signal output from said first frequency converter after conversion at each of the branches of the array antenna;

N receivers for which the frequency of the reception signal is identical to the reception frequency of said array antenna;

a second frequency converter that converts a signal having a frequency identical to the transmitted frequency of said array antenna to a frequency identical to the reception frequency of said array antenna;

N first common-use devices provided between the output of said first frequency converter, the input of said receiver, and each of said antenna elements;

N second common-use device provided between the output of the dividing device, the input of the second frequency converter, and each of said antenna elements;

at least one additional antenna that can be connected to any one of said N transmitters or the N receivers;

a first switch provided on each of the antenna elements that connects either one of said antenna elements or additional antenna to either one of said first common-use device or second common-use device;

a second switch that connects the output of the first dividing device included in the reference branch assigned in advance to the input of the receiver in any one branch;

a third switch that connects any one of the outputs of said N second dividing devices included in each of the branches to the input of the second frequency converter included in said reference branch;

a fourth switch that connects either the output of said third switch or the second common-use device included in said reference branch to the input of the second frequency converter included in said reference branch;

a fifth switch that, in each of the branches, selects any one of the reception signals from the said common-use device, the signal output by said second frequency converter, or the signal from the transmitter output by said second switch, and applies it to the input of said receiver;

a sixth switch that connects said additional antenna to any one of the first switches; and a calibration control circuit that controls said first switch, second switch, third switch, fourth switch, fifth switch, and sixth switch, and at the same time, finds the amplitude and phase calibration values between branches based on the amplitude and phase values obtained from each of said receivers.

20. An adaptive array antenna transceiver apparatus according to claim 19, wherein:

a combiner that combines the received signal from said first common-use device and the signal from said second frequency converter, or the received signal from said first common-use device and the signal from the transmitter output by said second switch, and outputs this signal to said receiver is provided instead of said fifth switch;

a calibration/reception signal separation circuit separates/outputs the reception signal from said first common-use device and the signal output by said second frequency converter, or separates/outputs the reception signal from said first common-use device and the signal from transmitter output by said second switch is further provided; and wherein:

said calibration control circuit controls the connection state of said first switch, second switch, and third switch, inputs the signal from the second frequency converter separated by said calibration/reception signal separating circuit or the signal from the transmitter output by said second switch separated by said calibration/reception signal separating circuit, and finds the calibration value of each of the branches of said array antenna.

21. An adaptive array antenna transceiver apparatus comprising N antenna elements, N is an integral number and shows two or more; N transmitters and receivers, a first common-use device that respectively connects said transmitter and receiver to each of the antenna elements, and a radiation pattern control processor that controls the radiation pattern of said array antenna by synthesizing the output of the plurality of receivers by weighting the amplitude and phase with respect to a signal input from each respective antenna element to said plurality of receivers, and at the same time, the reception frequency and the transmitted frequency of said array antenna used in communication are different, and the frequency of the signal output by each of said transmitters is f1 and the reception frequency of each of said receivers is f2, which provides:

at least one additional antenna disposed at a position such that the distances between at least two antenna elements of said array antenna are equal;

a second common-use device connected to said additional antenna;

at least one first frequency converter that converts the signal having a frequency of f1 output from one transmitter to the frequency f2 and outputs it into said second common-use device, and at the same time, converts the signal having a frequency of f1 input from said second common-use device to a frequency f2 and outputs it;

at least one dividing device that inputs into said frequency converter the signal extracted from at least one output of said N transmitters;

at least one first switch that connects the input of at least one of said N receivers to any one of said first common-use devices and said frequency transformers; and a calibration control circuit that controls said first switch, and finds the amplitude and phase calibration values between branches of the array antenna based on the amplitude and phase values obtained from each of said receivers.

22. An adaptive array antenna transceiver apparatus according to claim 21, wherein:

a second switch that connects said dividing devices to the respective output of said N transmitters, connects said first switch to the respective inputs of said N receivers, and selectively connects any one of the dividing devices connected to said N transmitters to the input of said frequency converter; and a third switch that selectively connects the output of said frequency converter to any one of the first switches connected to said N receivers are provided.

23. An adaptive array antenna transceiver apparatus according to claim 21, wherein the calibration control circuit:

controls the first switch and connects the output of said frequency converter to the input of the one receiver assigned to the selected calibration receiver from among said N receivers;

selects in sequence one of said N transmitters to be a calibration transmitter and outputs the signal from the selected calibration transmitter;

inputs the signal output from said calibration transmitter and transmitted via said first common-use device and said antenna element connected thereto to said calibration receiver via said additional antenna, the second common-use device, the frequency converter, and the first switch;

and finds the amplitude and phase calibration values between branches of the array antenna based on the measured values detected at said calibration receiver for the signal output from the calibration transmitter of the respective branch.

24. An adaptive array antenna apparatus according to claim 21, wherein said calibration control circuit:

controls said first switch and connects the input of the receiver connected thereto to said first common-use device;

assigns one of said N transmitters to be a calibration transmitter and outputs the signal from said calibration transmitter;

selects in sequence one of said N receivers to be the calibration receiver, inputs a signal output from said calibration transmitter and transmitted from said additional antenna after passing through said dividing device, a frequency converter, and a second common-use device, into said calibration receiver via the antenna elements of the branches and first common-use device included in said calibration receiver; and finds the amplitude and phase calibration values between branches of the array antenna based on the measured values detected at the calibration receivers of the respective branches.

25. An adaptive array antenna transceiver apparatus according to claim 22, wherein the calibration control circuit:

controls said first switch and connects the output of said frequency converter to the input of the one receiver among said N receivers assigned to be the calibration receiver;

selects in sequence as a calibration transmitter one of said N transmitters and output the signal from the selected calibration transmitter;

splits the signal output from said calibration transmitter by said dividing device and inputs the result into the frequency converter via said second switch and applies the signal output by said frequency converter to the input of the calibration receiver via said third switch and first switch; and finds the amplitude and phase calibration values between the branches of the array antenna based on the measured values detected by said calibration receiver for the signal output from the calibration transmitter for the respective branches.

26. An adaptive array antenna transceiver apparatus according to claim 22, wherein the calibration control circuit:

assigns one of said N transmitters to be the calibration transmitter and outputs a signal from said calibration transmitter;

selects in sequence one of said N receivers to be the calibration receiver;

splits signals output from the calibration transmitter by said dividing device, applies them to the input of the frequency converter via said second switch, and applies the signal output from said frequency converter to the input of the calibration receiver via said third switch and said first switch; and finds the amplitude and phase calibration values between branches of the array antenna based on the measured values detected at the calibration receivers of the respective branches.

27. An adaptive array antenna transceiver apparatus according to claim 21, further provides a first frequency converter in which the signal having the frequency f1 output from one transmitter is converted to a signal having the frequency f2, and a second frequency converter in which a signal having a frequency f1 input from said second common-use device is converted to a signal having a frequency f2.

28. An adaptive array antenna transceiver apparatus according to claim 21, wherein the N antenna elements are disposed on one straight line, and in addition, said additional antenna is disposed at a position at the middle of two antenna elements.

29. An adaptive array antenna transceiver apparatus according to claim 21, wherein said N antenna elements are disposed at equal intervals on one circle, and at the same time, said additional antenna is disposed at the center position of said circle.

30. An adaptive array antenna transceiver apparatus according to claim 21, wherein:

- a combiner that combines a signal from said first common-use device and a signal from said frequency converter, and outputs this signal to said receiver, is provided instead of said first switch;
- a calibration/reception signal separator circuit that separates/outputs a signal from said first common-use device and signals from said frequency converter for the output of said receiver is further provided; and
- said calibration control circuit that inputs a signal from said frequency converter separated by each of said calibration/reception signal separator circuits, and finds the calibration value of each of the branches of said array antenna.

* * * * *